(12) United States Patent
Chow et al.

(10) Patent No.: US 7,788,553 B2
(45) Date of Patent: Aug. 31, 2010

(54) MASS PRODUCTION TESTING OF USB FLASH CARDS WITH VARIOUS FLASH MEMORY CELLS

(75) Inventors: David Q. Chow, San Jose, CA (US); Abraham C. Ma, Fremont, CA (US); Edward W. Lee, Mountain View, CA (US); Ming-Shiang Shen, Taipei (TW)

(73) Assignee: Super Talent Electronics, Inc., San Jose, CA (US)

( * ) Notice: Subject to any disclaimer, the term of this patent is extended or adjusted under 35 U.S.C. 154(b) by 46 days.

(21) Appl. No.: 11/871,117

(22) Filed: Oct. 11, 2007

(65) Prior Publication Data

US 2008/0177922 A1 Jul. 24, 2008

Related U.S. Application Data

(63) Continuation-in-part of application No. 11/626,347, filed on Jan. 23, 2007, now Pat. No. 7,702,984, and a continuation-in-part of application No. 11/466,759, filed on Aug. 23, 2006, now Pat. No. 7,702,831, which is a continuation-in-part of application No. 10/789,333, filed on Feb. 26, 2004, now Pat. No. 7,318,117, application No. 11/871,117, which is a continuation-in-part of application No. 11/737,336, filed on Apr. 19, 2007, now Pat. No. 7,333,364, application No. 11/871,117, which is a continuation-in-part of application No. 11/864,696, filed on Sep. 28, 2007, which is a continuation-in-part of application No. 11/624,667, filed on Jan. 18, 2007, and a continuation-in-part of application No. 11/674,645, filed on Feb. 13, 2007, now Pat. No. 7,620,769, and a continuation-in-part of application No. 11/742,270, filed on Apr. 30, 2007, now Pat. No. 7,660,941, and a continuation-in-part of application No. 10/854,004, filed on May 25, 2004, which is a continuation-in-part of application No. 10/708,172, filed on Feb. 12, 2004, now Pat. No. 7,021,971, application No. 11/871,117, which is a continuation-in-part of application No. 11/866,927, filed on Oct. 3, 2007.

(51) Int. Cl.
*G11C 29/00* (2006.01)
*G01R 31/28* (2006.01)
*G11C 16/04* (2006.01)

(52) U.S. Cl. .................. 714/718; 714/736; 365/185.33

(58) Field of Classification Search ................ 715/718, 715/724, 735, 736, 819, 701, 799; 365/185.33, 365/200, 201
See application file for complete search history.

(56) References Cited

U.S. PATENT DOCUMENTS 5,623,552 A    4/1997 Lane (Continued)

*Primary Examiner*—Phung M Chung
(74) *Attorney, Agent, or Firm*—Blakely Sokoloff Taylor & Zafman LLP

(57) ABSTRACT

A high volume testing/formatting process is provided for Universal Serial Bus-based (USB-based) electronic data flash cards (USB devices) that meets the increasing demand for USB electronic data flash cards (USB devices). A test host is simultaneously coupled to the multiple USB devices (e.g., using a multi-port card reader or a probe fixture), a controller endpoint value is read from each of the USB devices and verified with a known good value, and then testing/formatting is performed on each of the USB devices by writing predetermined data into each USB device in a pipelined manner, then reading out and testing the predetermined data. In one embodiment, the test host implements a special USB driver that blocks standard USB registration procedures upon detecting the plurality of USB devices. Control and/or boot code data are written onto the flash memory device (i.e., instead of being provided on a controller ROM).

19 Claims, 34 Drawing Sheets

U.S. PATENT DOCUMENTS

| | | |
|---|---|---|
| 5,907,856 A | 5/1999 | Estakhri et al. |
| 5,959,541 A | 9/1999 | DiMaria et al. |
| 6,000,006 A | 12/1999 | Bruce et al. |
| 6,012,636 A | 1/2000 | Smith |
| 6,069,920 A | 5/2000 | Schulz et al. |
| 6,081,858 A | 6/2000 | Abudayyeh et al. |
| 6,125,192 A | 9/2000 | Bjorn et al. |
| 6,193,152 B1 | 2/2001 | Fernando et al. |
| 6,202,138 B1 | 3/2001 | Estakhri et al. |
| 6,230,233 B1 | 5/2001 | Lofgren et al. |
| 6,275,894 B1 | 8/2001 | Kuo et al. |
| 6,321,478 B1 | 11/2001 | Klebes |
| 6,547,130 B1 | 4/2003 | Shen |
| 6,636,929 B1 | 10/2003 | Frantz et al. |
| 6,718,407 B2 | 4/2004 | Martwick |
| 6,880,024 B2 | 4/2005 | Chen et al. |
| 7,103,765 B2 | 9/2006 | Chen |
| 7,249,978 B1 | 7/2007 | Ni |
| 7,257,714 B1 | 8/2007 | Shen |
| 7,440,287 B1 * | 10/2008 | Ni et al. ................ 361/752 |
| 2001/0043174 A1 | 11/2001 | Jacobsen et al. |
| 2002/0166023 A1 | 11/2002 | Nolan et al. |
| 2003/0046510 A1 | 3/2003 | North |
| 2003/0163656 A1 | 8/2003 | Ganton |
| 2004/0148482 A1 | 7/2004 | Grundy et al. |
| 2004/0255054 A1 | 12/2004 | Pua et al. |
| 2005/0102444 A1 | 5/2005 | Cruz |
| 2005/0120146 A1 | 6/2005 | Chen et al. |
| 2005/0160213 A1 | 7/2005 | Chen |
| 2005/0193161 A1 | 9/2005 | Lee et al. |
| 2005/0246243 A1 | 11/2005 | Adams et al. |
| 2005/0268082 A1 | 12/2005 | Poisner |
| 2006/0065743 A1 | 3/2006 | Fruhauf |
| 2006/0075174 A1 | 4/2006 | Vuong |
| 2006/0106962 A1 | 5/2006 | Woodbridge et al. |
| 2006/0161725 A1 | 7/2006 | Lee et al. |
| 2006/0206702 A1 | 9/2006 | Fausak |
| 2006/0242395 A1 | 10/2006 | Fausak |
| 2007/0094489 A1 | 4/2007 | Ota et al. |
| 2007/0112067 A1 | 5/2007 | Oh et al. |
| 2007/0113267 A1 | 5/2007 | Iwanski et al. |
| 2007/0130436 A1 | 6/2007 | Shen |

\* cited by examiner

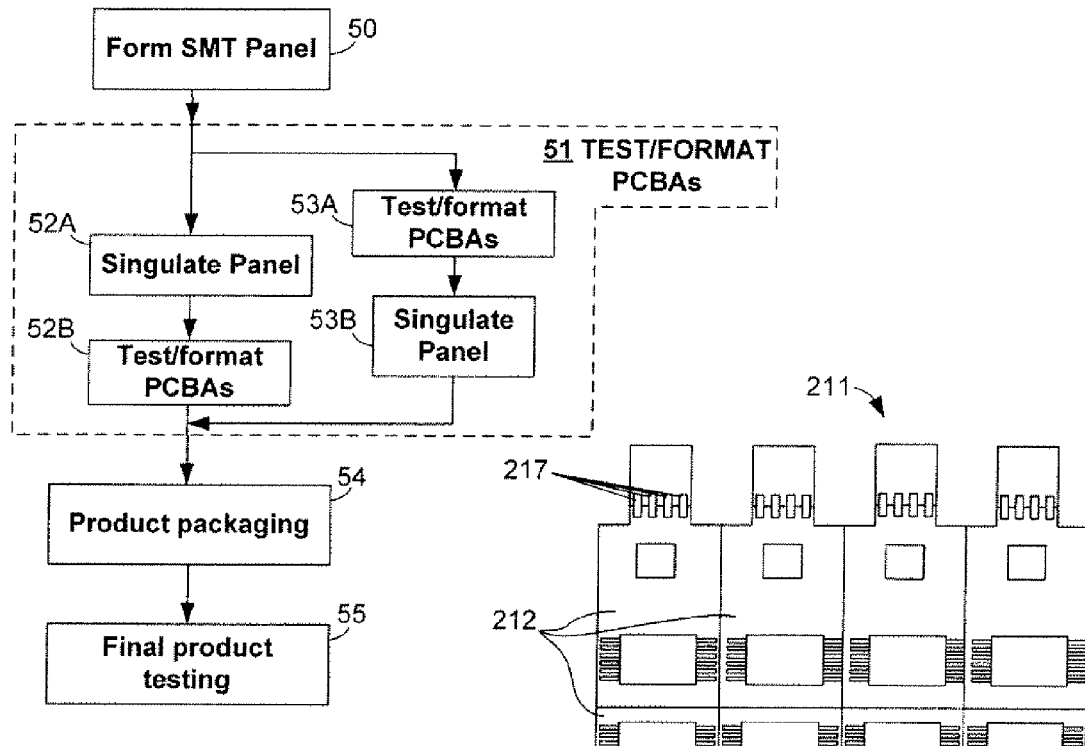
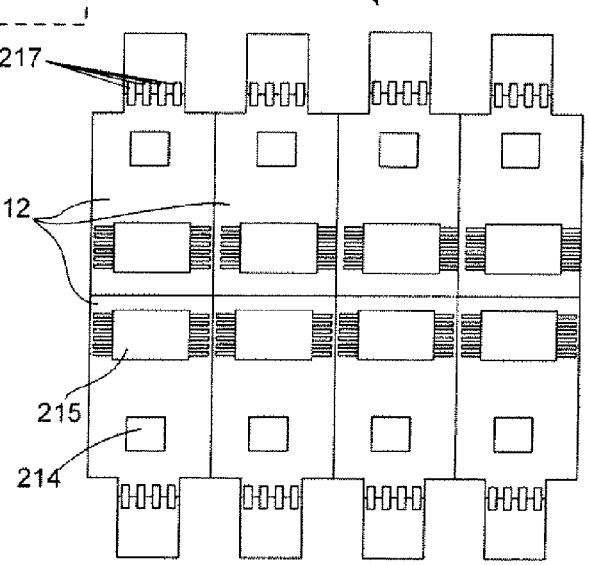
FIG. 2
FIG. 3(A)
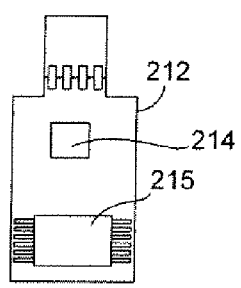
FIG. 3(B)
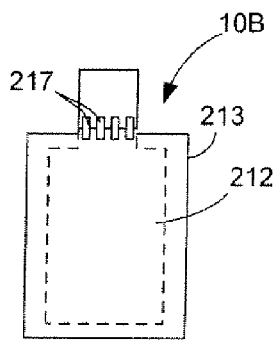
FIG. 3(C)

FIG. 8 System Address structure of flash memory

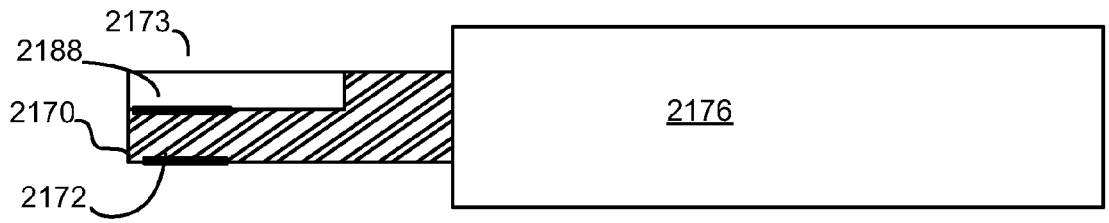
FIG. 21A
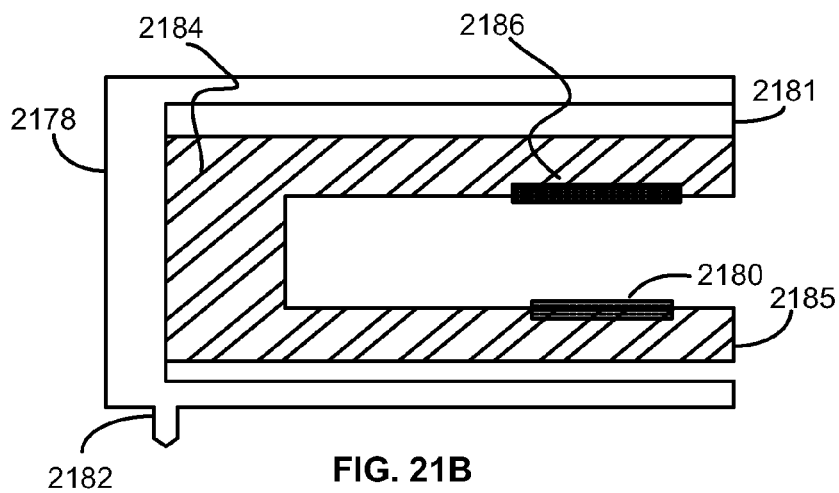
FIG. 21B
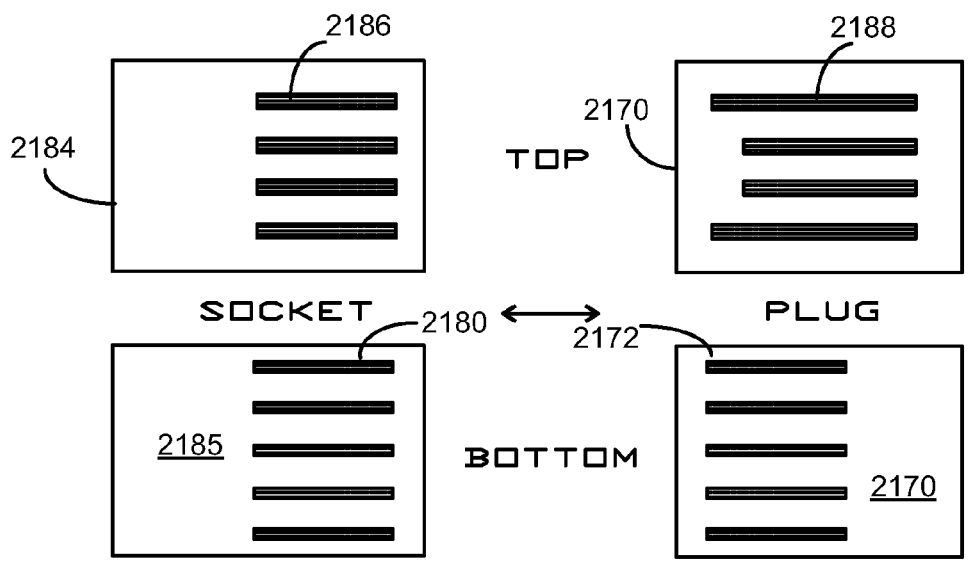
FIG. 21C                    FIG. 21D

MASS PRODUCTION TESTING OF USB FLASH CARDS WITH VARIOUS FLASH MEMORY CELLS

RELATED APPLICATIONS

This application is a continuation-in-part (CIP) of U.S. patent application Ser. No. 11/626,347, filed Jan. 23, 2007, now U.S. Pat. No. 7,702,984, entitled "High Volume Testing for USB Electronic Data Flash Cards", and "Flash Memory Controller For Electronic Data Flash Card", U.S. application Ser. No. 11/466,759, filed on Aug. 23, 2006 now U.S. Pat. No. 7,702,831, which is a CIP of "System and Method for Controlling Flash Memory", U.S. application Ser. No. 10/789,333, filed on Feb. 26, 2004, now U.S. Pat. No. 7,318,117.

This application is also a CIP of U.S. patent application Ser. No. 11/737,336, filed Apr. 19, 2007, entitled "Cell-Downgrading and Reference-Voltage Adjustment for a Multi-bit-cell Flash Memory", now U.S. Pat. No. 7,333,364.

This application is also a CIP of U.S. patent application Ser. No. 11/864,696, filed Sep. 28, 2007, entitled "Backward Compatible Extended USB Plug And Receptacle With Dual Personality", which is a CIP of U.S. patent application for "Electronic Data Storage Medium With Fingerprint Verification Capability", U.S. application Ser. No. 11/624,667, filed on Jan. 18, 2007, and a CIP of U.S. patent application for "Recycling Partially-Stale Flash Blocks Using a Sliding Window for Multi-Level-Cell (MLC) Flash Memory," U.S. application Ser. No. 11/674,645, filed on Feb. 13, 2007 now U.S. Pat. No. 7,620,769; and a CIP of U.S. patent application for "Two-Level RAM Lookup Table for Block and Page Allocation and Wear-Leveling in Limited Write Flash-Memories," U.S. patent application Ser. No. 11/742,270, filed Apr. 30, 2007, now U.S. Pat. No. 7,660,941; and a CIP of U.S. Patent application for "Extended Secure-Digital Card Devices and Hosts," U.S. patent application Ser. No. 10/854,004, filed May 25, 2004, which is a CIP of U.S. patent application Ser. No. 10/708,172, filed on Feb. 12, 2004, now U.S. Pat. No. 7,021,971.

This application is also a CIP of U.S. patent application Ser. No. 11/866,927, filed Oct. 3, 2007, entitled "Extended USB Plug, USB PCBA and MLC USB Flash Drive with Dual-Personality".

The disclosure of the above-identified applications and patents is incorporated by reference herein in its entirety.

FIELD OF THE INVENTION

The present invention relates to an electronic data flash card, and more particularly to a system and method for testing USB electronic data flash cards during their manufacture.

BACKGROUND OF THE INVENTION

Confidential data files are often stored in floppy disks or are delivered via networks that require passwords or that use encryption coding for security. Confidential documents are sent by adding safety seals and impressions during delivery. However, confidential data files and documents are exposed to the danger that the passwords, encryption codes, safety seals and impressions may be broken (deciphered), thereby resulting in unauthorized access to the confidential information.

As flash memory technology becomes more advanced, flash memory is replacing traditional magnetic disks as storage media for mobile systems. Flash memory has significant advantages over floppy disks or magnetic hard disks such as having high-G resistance and low power dissipation. Because of the smaller physical size of flash memory, they are also more conducive to mobile systems. Accordingly, the flash memory trend has been growing because of its compatibility with portable (mobile) systems and low-power feature.

USB electronic data flash cards are portable, low power devices that utilize Universal Serial Bus (USB) technology to interface between a host computer and a flash memory device of the flash card. USB electronic data flash cards take many forms, such as pen drive storage devices, MP3 players, and digital cameras. In each instance, the USB electronic data flash card typically includes a flash memory device, a processor, and USB interface circuitry.

Due to their rapidly increasing popularity, the manufacturing volume of USB electronic data flash cards (or USB flash cards) continues to grow. With increasing production volume, a problem faced by the manufacturer is how to efficiently and reliably test the USB flash cards before shipping to the end users. Conventional testing methods utilize a personal computer (PC) to test the USB flash cards for low cost reasons, also for compatibility and reliability reasons (i.e., so that the end user, who typically utilizes the USB flash card in conjunction with a PC, will be able to reliably use the USB flash card immediately after purchase). A problem with such conventional testing methods utilizing PC is that normal PC Windows™ (or MAC™) operating systems only support a few USB devices at a time, and a significant amount of time is required to manually plug in each USB flash card, for the operating system to detect and test the USB flash cards, and then to manually unplug each USB flash card. As such, conventional testing methods cannot keep up with the increasing manufacturing volume.

What is needed is a high volume testing method that meets the increasing demand for USB electronic data flash cards.

SUMMARY OF THE INVENTION

The present invention is generally directed to an electronic data flash card including a flash memory device, an optional fingerprint sensor, an input-output interface circuit and a processing unit. The electronic data flash card is adapted to be accessed by a host (external) computer such as a personal computer, notebook computer or other electronic host device. As an electronic data flash card is easier to carry and durable for ruggedness, personal data can be stored inside the flash memory device in an encrypted form such that it can only be accessed, for example, by way of the optional fingerprint sensor associated with card body to make sure unauthorized person cannot misuse the card.

The present invention is also directed to a high volume testing/formatting process for Universal Serial Bus-based (USB-based) electronic data flash cards (USB devices) that meets the increasing demand for USB electronic data flash cards (USB devices). In particular, a system and method is provided for high volume formatting/testing of USB devices in which a test host is simultaneously coupled to the multiple USB devices (e.g., using a multi-port card reader or a probe fixture), a controller endpoint value is read from each of the USB devices and verified with a known good value, and then formatting is performed on each of the USB devices in a "pipelined" manner by writing predetermined data into each USB device. The USB devices are then tested by reading out and testing the predetermined data. In one embodiment, the test host implements a special USB driver that blocks standard USB registration procedures upon detecting the plurality of USB devices. By bypassing conventional USB registration procedures and verifying the controller endpoint values before testing/formatting, the present invention facilitates the efficient and high volume testing/formatting of USB devices by eliminating the time consuming and unnecessary registration process. In addition, by writing data into the USB devices in a "pipelined" manner, the present invention facilitates high volume formatting/testing of USB devices that greatly reduces production time.

In accordance with an aspect of the present invention, each USB device is modified to minimize controller ROM size by storing selected control code data, boot code data, device information and configuration information on the flash memory device. Because much of this code and information is required and accessed during the conventional USB registration process (i.e., because the conventional USB registration process presumes this code and information is available in controller ROM), bypassing the conventional USB registration process provides a further function of avoiding system failure or long delays as the host system waits for this code and information when an un-formatted USB device (with blank flash memory device) is coupled to the test host.

In accordance with another aspect of the present invention, the purpose of the testing/formatting process includes checking that all chips are correctly soldered, that current consumption levels meet specifications, and that each component device (e.g., the controller and flash memory devices) is compatible with the testing/formatting program being implemented by the test host system. The formatting process serves to load all entry point values needed for correct controller operation, erase the flash memory and build up redundant bad_block_list files for future bad block management, and to provide low level formatting that that facilitates OS recognition.

In accordance with an embodiment of the present invention, the controller endpoint values read during the initial stages of the testing/formatting process include at least one of a configuration descriptor value, a mass storage class code value, a vendor identification value, and a product identification value. When the controller endpoint value read from each USB device matches the known good value stored in the test host, a flag displayed on the test host monitor is asserted to indicate success (e.g., the flag changes from red to green).

In accordance with another embodiment, the testing/formatting process includes one or more of scanning bad block data stored in the flash memory device and verifying that reserved storage capacity of each flash memory device is equal to a predetermined amount (e.g., a specified percentage of the total memory capacity), writing at least two copies of the bad block data into the flash memory device, writing control code data and/or boot code data into the flash memory device, writing customer-provided data into the flash memory device, and writing updated serial number, date code, and product version code values into the flash memory device.

BRIEF DESCRIPTION OF THE DRAWINGS

These and other features, aspects and advantages of the present invention will become better understood with regard to the following description, appended claims, and accompanying drawings, where:

FIG. 2 is a flow diagram showing a generalized method for high volume manufacturing of USB devices according to an embodiment of the present invention.

FIG. 3(A) is a plan view showing an exemplary surface mount technology (SMT) panel produced in accordance with an embodiment of the present invention.

FIG. 3(B) is a plan view showing a printed circuit board assembly (PCBA) separated from the panel of FIG. 3(A).

FIG. 3(C) is a plan view showing the PCBA of FIG. 3(B) after packaging.

FIGS. 21A-21G show one embodiment of extended USB connectors and sockets having metal contact pins on both top and bottom surfaces of the pin substrates.

DETAILED DESCRIPTION

The present invention relates to an improvement in methods for producing electronic data flash cards. Although the present invention is described below with specific reference to USB electronic data flash cards, the present novel aspects of the present invention can be used in the manufacture of a wide range of flash card types, including but not limited to PCI Express, Secure Digital (SD), Memory Stick (MS), Compact Flash (CF), IDE and SATA flash memory cards.

FIGS. 21A-21G show one embodiment of extended USB connectors and sockets having metal contact pins on both top and bottom surfaces of the pin substrates.

FIGS. 22A-22I show a second embodiment of extended USB connectors and sockets having metal contact pins on just one of the surfaces of the pin substrates.

Figure 1A:
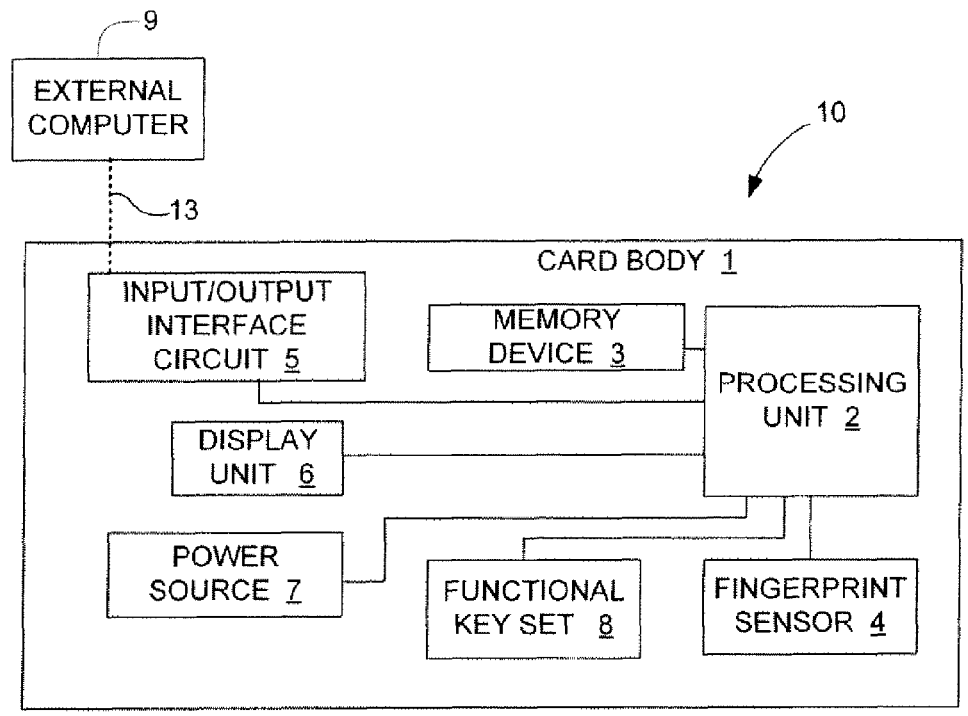
FIG. 1(A) is a block diagram showing an electronic data flash card and host system according to an embodiment of the present invention.

Referring to FIG. 1(A), according to an embodiment of the present invention, an electronic data flash card 10 is adapted to be accessed by an external (host) computer 9 either via an interface bus 13 or a card reader (not shown) or other interface mechanism (not shown), and includes a card body 1, a processing unit 2, one or more flash memory devices 3, an optional fingerprint sensor (security device) 4, an input/output interface circuit 5, an optional display unit 6, an optional power source (e.g., battery) 7, and an optional function key set 8.

Flash memory device 3 is mounted on the card body 1, and stores in a known manner therein a data file, a reference password, and fingerprint reference data obtained by scanning a fingerprint of a person authorized to access the data file. The data file can be a picture file or a text file. As set forth below, the flash memory device 3 also includes boot code data and control code data.

The fingerprint sensor 4 is mounted on the card body 1, and is adapted to scan a fingerprint of a user of electronic data flash card 10 to generate fingerprint scan data. One example of the fingerprint sensor 4 that can be used in the present invention is that disclosed in a co-owned U.S. Pat. No. 6,547,130, entitled "INTEGRATED CIRCUIT CARD WITH FINGERPRINT VERIFICATION CAPABILITY", the entire disclosure of which is incorporated herein by reference. The fingerprint sensor described in the above patent includes an array of scan cells that defines a fingerprint scanning area. The fingerprint scan data includes a plurality of scan line data obtained by scanning corresponding lines of array of scan cells. The lines of array of scan cells are scanned in a row direction as well as column direction of said array. Each of the scan cells generates a first logic signal upon detection of a ridge in the fingerprint of the holder of card body, and a second logic signal upon detection of a valley in the fingerprint of the holder of card body.

The input/output interface circuit 5 is mounted on the card body 1, and can be activated so as to establish communication with the host computer 9 by way of an appropriate socket via an interface bus 13 or a card reader. In one embodiment, input/output interface circuit 5 includes circuits and control logic associated with one of a Universal Serial Bus (USB), PCMCIA and RS232 interface structure that is connectable to an associated socket connected to or mounted on the host computer 9. In another embodiment, the input/output interface circuit 5 may include one of a Secure Digital (SD) interface circuit, a Multi-Media Card (MMC) interface circuit, a Compact Flash (CF) interface circuit, a Memory Stick (MS) interface circuit, a PCI-Express interface circuit, a Integrated Drive Electronics (IDE) interface circuit, and a Serial Advanced Technology Attachment (SATA) interface circuit, which interface with the host computer 9 via an interface bus 13 or a card reader.

The processing unit 2 is mounted on the card body 1, and is connected to the memory device 3, the fingerprint sensor 4 and the input/output interface circuit 5 by way of associated conductive traces or wires disposed on card body 1. In one embodiment, processing unit 2 is one of an 8051, 8052, 80286 microprocessor available, for example, from Intel Corporation. In other embodiments, processing unit 2 includes a RISC, ARM, MIPS or other digital signal processor. In accordance with an aspect of the present invention, processing unit 2 is controlled by a program stored at least partially in flash memory device 3 such that processing unit 2 is operable selectively in: (1) a programming mode, where the processing unit 2 activates the input/output interface circuit 5 to receive the data file, the boot code data, the control code data, and optional fingerprint reference data from the host computer 9, and to store the data in the flash memory device 3 (as an option, in a compressed format to increase storage capacity of the memory device 3); (2) a reset mode in which the boot code data and the control code data are read from the flash memory device and utilized to configure and control the operation of the processing unit 2; (3) a data retrieving mode, where the processing unit 2 reads the fingerprint scan data from the fingerprint sensor 4, compares the fingerprint scan data with at least a segment of the fingerprint reference data in the flash memory device 3 to verify if the user of the electronic data flash card 10 is authorized to access the data file stored in the flash memory device 3, and activates the input/output interface circuit 5 to transmit the data file to the host computer 9 upon verifying that the user is authorized to access the data file stored in the flash memory device 3; (4) a code updating mode in which the boot code data and the control code data are updated in the memory device 3; and (5) a data resetting mode, where the data file and the fingerprint reference data are erased from the memory device 3. In operation, host computer 9 sends write and read requests to electronic data flash card 10 via a card reader or interface bus 13 and input/output interface circuit 5 to the processing unit 2, which in turn utilizes a flash memory controller (not shown) to read from or write to the associated one or more flash memory device 3. In one embodiment, the processing unit 2 automatically initiates the data resetting mode operation upon detecting that a preset time period has elapsed since storage of the data file and the fingerprint reference data in the memory device 3.

8051, 8052 and 80286 are microprocessors developed by Intel Corporation, using complex instruction set. 8051 and 8052 have 8-bit data bus, whereas 80286 has 16-bit data bus. RISC, ARM and MIPS are microprocessors using the architecture of reduced instruction set. 8051 and 8052 are widely used in low cost application. 80286 can be used for higher speed/performance applications. RISC, ARM and MIPS are higher cost microprocessors better suited to more complex applications such as advanced ECC (Error Correction Code) and data encryption.

The optional power source 7 is mounted on the card body 1, and is connected to the processing unit 2 and other associated units on card body 1 for supplying needed electrical power thereto.

The optional function key set 8, which is mounted on the card body 1, is connected to the processing unit 2, and is operable so as to initiate operation of processing unit 2 in a selected one of the programming, reset, data retrieving, code updating, and data resetting modes. The function key set 8 is operable to provide an input password to the processing unit 2. The processing unit 2 compares the input password with the reference password stored in the flash memory device 3, and initiates authorized operation of electronic data flash card 10 upon verifying that the input password corresponds with the reference password.

The optional display unit 6 is mounted on the card body 1, and is connected to and controlled by the processing unit 2 for showing the data file exchanged with the host computer 9 and for displaying the operating status of the electronic data flash card 10.

The following are some of the advantages of the present invention: first, the electronic data flash card has a small volume but a large storage capability, thereby resulting in convenience during data transfer; and second, because everyone has a unique fingerprint, the electronic data flash card only permits authorized persons to access the data files stored therein, thereby resulting in enhanced security.

Additional features and advantages of the present invention are set forth below.

Figure 1B:
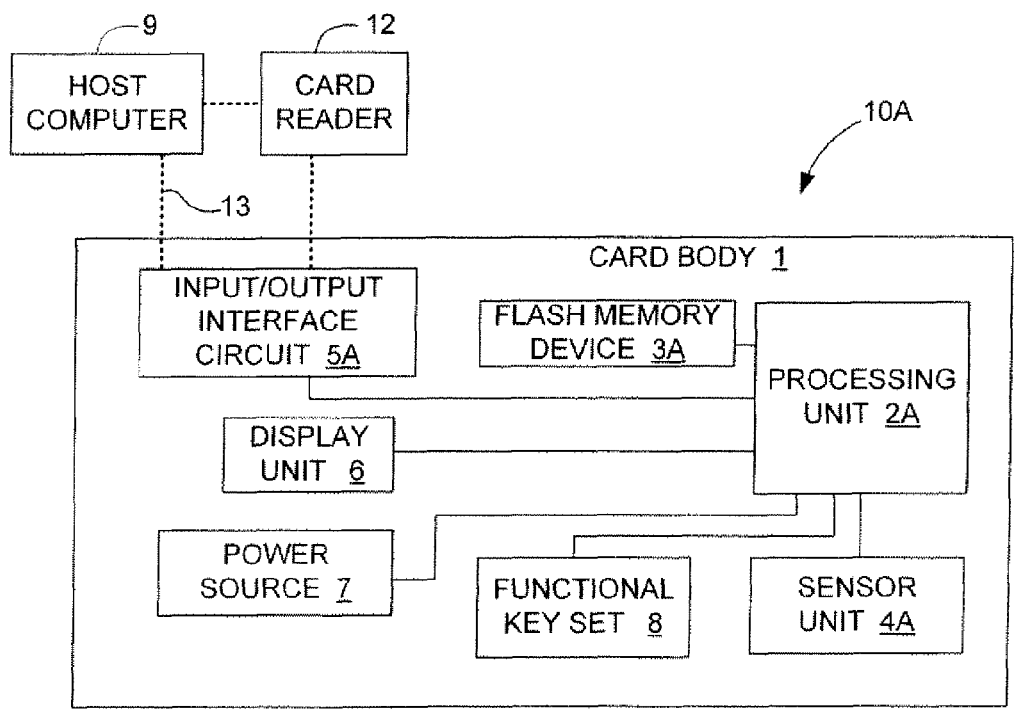
FIG. 1(B) is a block diagram showing an electronic data flash card and host system according to another embodiment of the present invention.

FIG. 1(B) is a block diagram of an electronic data flash card 10A in accordance with an alternative embodiment of the present invention in which a generalized sensor unit 4A is provided in place of the fingerprint sensor described above. Exemplary sensor units include retina (eye) scanners or voice recognition devices that are capable of detecting a physical characteristic of an authorized user, and operates in a manner similar to that described above with reference to fingerprint sensor 4.

Figure 1C:
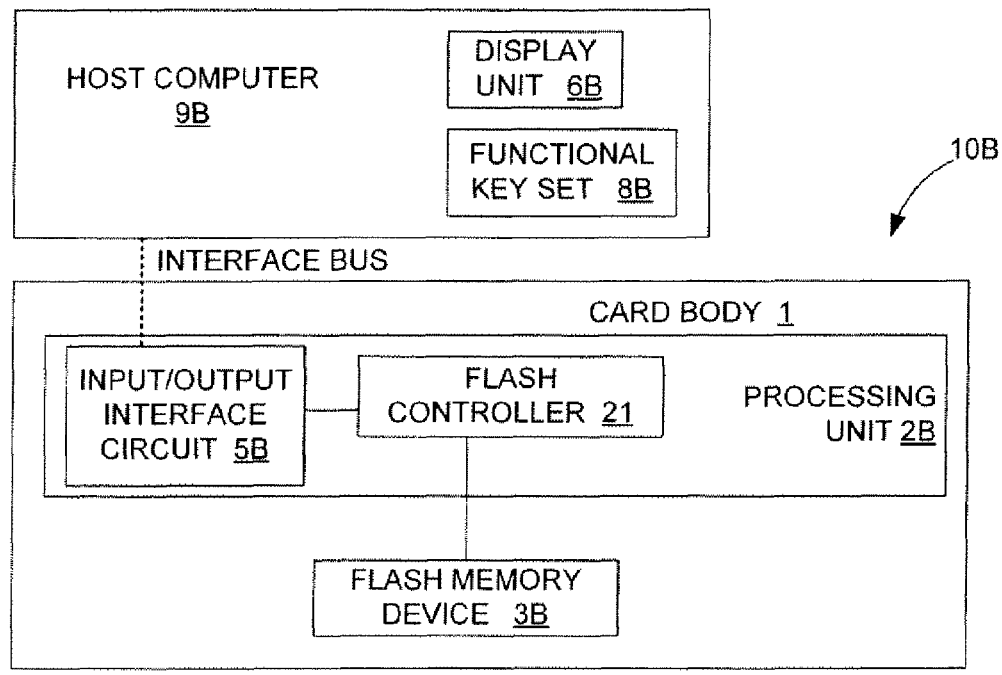
FIG. 1(C) is a block diagram showing an electronic data flash card and host system according to another embodiment of the present invention.

FIG. 1(C) is a block diagram of an electronic data flash card 10B in accordance with yet another alternative embodiment of the present invention. Electronic data flash card 10B omits the fingerprint sensor and the associated user identification process. The electronic data flash card 10B also includes a highly integrated processing unit 2B including an input/output interface circuit 5B and a flash memory controller 21 for integration cost reduction reasons. Input/output interface circuit 5B includes a transceiver block, a serial interface engine block, data buffers, registers and interrupt logic. Input/output interface circuit 5B is coupled to an internal bus to allow for the various elements of input/output interface circuit 5B to communicate with the elements of flash memory controller 21. Flash memory controller 21 includes a microprocessor unit, a ROM, a RAM, flash memory controller logic, error correction code logic, and general purpose input/output (GPIO) logic. In one embodiment, the GPIO logic is coupled to a plurality of LEDs for status indication such as power good, read/write flash activity, etc., and other I/O devices. Flash memory controller 21 is coupled to one or more flash memory devices 3B.

In this embodiment, host computer 9B includes a function key set 8B, is connected to the processing unit 2B via an interface bus or a card reader when electronic data flash card 10B is in operation. Function key set 8B is used to selectively set electronic data flash card 10B in one of the programming, reset, data retrieving, code updating, and data resetting modes. The function key set 8B is also operable to provide an input password to the host computer 9B. The processing unit 2B compares the input password with the reference password stored in the flash memory device 3B, and initiates authorized operation of electronic data flash card 10B upon verifying that the input password corresponds with the reference password.

Also in this embodiment, a host computer 9B includes display unit 6B, is connected to the processing unit 2B when electronic data flash card 10B is in operation via an interface bus or a card reader. Display unit 6B is used for showing the data file exchanged with the host computer 9B, and for showing the operating status of the electronic data flash card 10B.

In accordance with an embodiment of the present invention, processing unit 2 includes a flash memory type algorithm for detection if a flash memory type is supported by the flash memory controller logic. Advance of flash memory technology has also created a greater variety of flash memory types for reasons of performance, cost and capacity. Due to the potential shortage, cost reason, the need for sourcing flexibility of flash memories, and the fact that unique control is required to access each different flash memory type, it is important to implement a processing unit with intelligent algorithm to detect and access the different flash memory types. The typical flash memory contains ID code which identifies the flash memory type, the manufacturer, and the features/parameters of the flash memory such as page size, block size, organization, capacity, etc. The intelligent algorithm controls processing unit 2 at reset to read the ID of flash memory 3, and to compare the ID against the table of flash memory types that are supported by the flash memory controller. If the flash memory 3 is not supported, the flash memory controller will not be able to access the flash memory 3, and the incompatibility can be indicated by LED via the output port of the flash memory controller. If the flash memory 3 is supported, the flash memory controller will be configured in the manner set forth below before the flash memory controller begins accessing the flash memory 3. Flash memory controllers with such intelligent algorithms are disclosed, for example, in co-pending U.S. patent application Ser. No. 11/466,759, entitled FLASH MEMORY CONTROLLER FOR ELECTRONIC DATA FLASH CARD, which is incorporated herein by reference in its entirety.

The electronic data flash card is a flash memory system uses flash memories for data storage. Typically the system architecture of flash memory system includes flash memory controller having processor, ROM and RAM, in which the boot code and control code are residing in the ROM as ROM code. Upon power up, the processor fetches the boot code for execution, the boot code initializes the system components and loads the control code into RAM. Once the control code is loaded into the RAM, it takes control of the system. The control code includes drivers to perform basic tasks such as controlling and allocating memory, prioritizing the processing of instructions, controlling input and output ports etc. The control code also includes the flash type detection algorithm and the flash memory parameters data.

The ROM is a read only memory, after the flash memory controller design is done and moved into production, the software code in ROM is frozen and cannot be changed to support new flash types released to the market in the later time. In such a situation, a new flash memory controller has to be developed to support new flash memories from time to time, which is costly and time consuming.

Figure 1D:
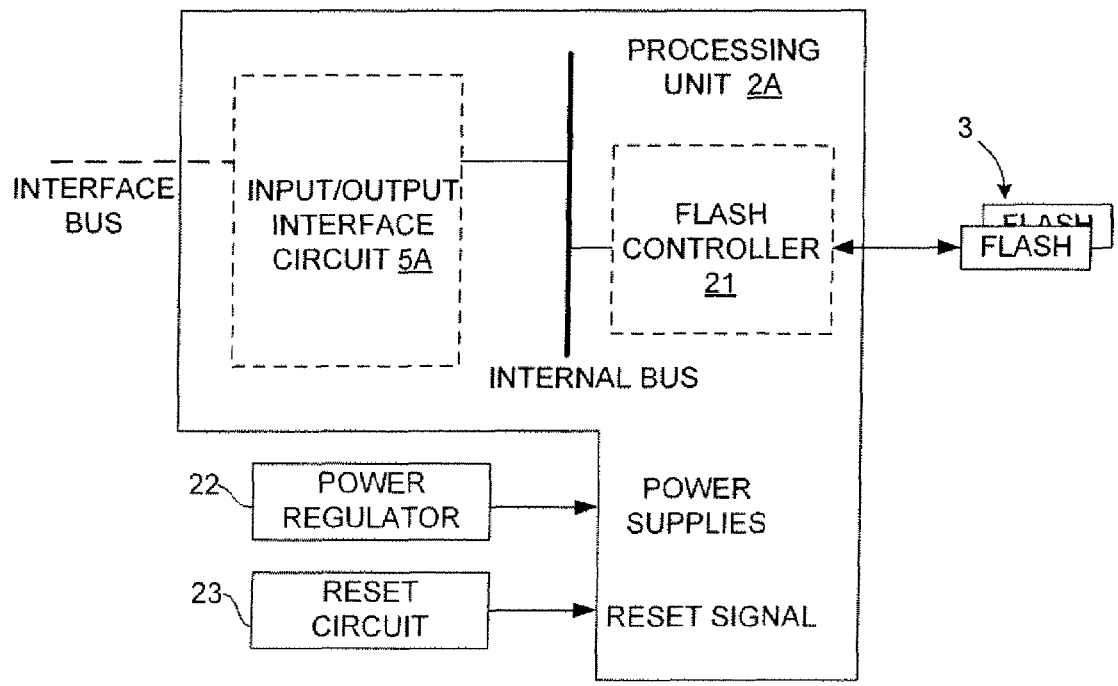
FIG. 1(D) is a block diagram of a processing unit utilized in an electronic data flash card in accordance with another embodiment of the present invention.

FIG. 1(D) shows processing unit 2A of FIG. 1(B) in additional detail. Electronic data flash card 10A includes a power regulator 22 for providing one or more power supplies. The power supplies provide different voltages to processing unit 2A and other associated units of electronic data flash card 10A according to the power requirements. Capacitors (not shown) may be required for power stability. Electronic data flash card 10A includes a reset circuit 23 for providing a reset signal to processing unit 2A. Upon power up, reset circuit 23 asserts reset signal to all units. After internal voltages reach a stable level, the reset signal is then de-asserted, and resisters and capacitors (not shown) are provided for adequate reset timing adjustment. Electronic data flash card 10A also includes a quartz crystal oscillator (not shown) to provide the fundamental frequency to a PLL within processing unit 2A.

In accordance with an embodiment of the present invention, input/output interface circuit 5A, reset circuit 23, and power regulator 22 are integrated or partially integrated within processing unit 2A. The high integration substantially reduces the overall space needed, the complexity, and the cost of manufacturing. Compactness and reduced cost are key factors to removable devices such as the electronic data flash cards described herein. Modern IC (Integrated Circuits) packaging can integrate discrete IC components with different technology and material into one IC package. For example, the input/output interface circuit is analog and digital mixed circuitry, which can be integrated into one MCP (Multi-Chip Package) with the processing unit. The reset circuit and power regulator are analog circuitry, which can also be integrated into the MCP with the processing unit. The nature of mixed signal IC technology allows the hybrid integration of both analog and digital circuitry. Therefore, higher integration can be incorporated into the same chip/die for the processing unit which includes input/output interface circuit, flash memory controller, reset circuit and power regulator.

In accordance with another aspect of the present invention, an electronic data flash card includes boot code and the control code stored in the flash memory instead of in the flash memory controller ROM. As a result, the boot code and control code can be updated in the field without having to change the flash memory controller. A flash card including boot code and control code stored in flash memory is disclosed, for example, in co-pending U.S. patent application Ser. No. 11/611,811, entitled FLASH MEMORY CONTROLLER FOR ELECTRONIC DATA FLASH CARD, filed Dec. 13, 2006, which is incorporated herein by reference in its entirety.

FIG. 2 is a flow chart showing a generalized method for manufacturing USB devices according to an embodiment of the present invention, and FIGS. 3(A) to 3(C) are simplified plan views showing USB devices during various stages of the manufacturing process. Referring to block 50 of FIG. 2, the manufacturing method begins by mounting all components of the USB device (e.g., flash memory, controller, and all passive components such as resistors and capacitors) on panels that include multiple printed circuit boards (PCBs), e.g., using surface mount technology (SMT). FIG. 3(A) shows an exemplary SMT panel 211 including multiple PCB assemblies 212 that are connected along respective edges in a manner that facilitates efficient assembly of various SMT components including, for example, controller chip 214, flash chip 215, and other devices omitted for clarity. PCB assemblies 212 include wiring traces that facilitate electrical connections between the various SMT components, and between controller chip 214 and four USB pins 217 (i.e., VDD, D+, D− and GND) according to known practices.

Figure 4A:
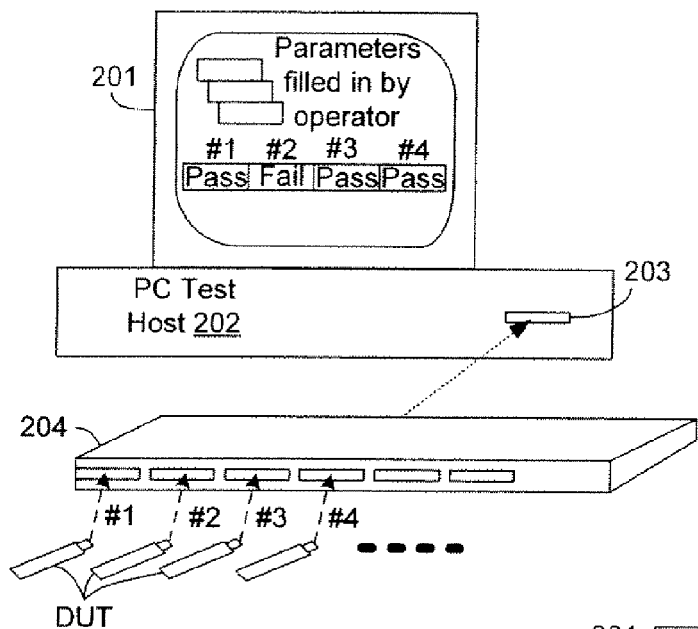
FIGS. 4(A) and 4(B) are simplified perspective views showing test host systems utilized in accordance with alternative embodiments of the present invention.
Figure 4B:
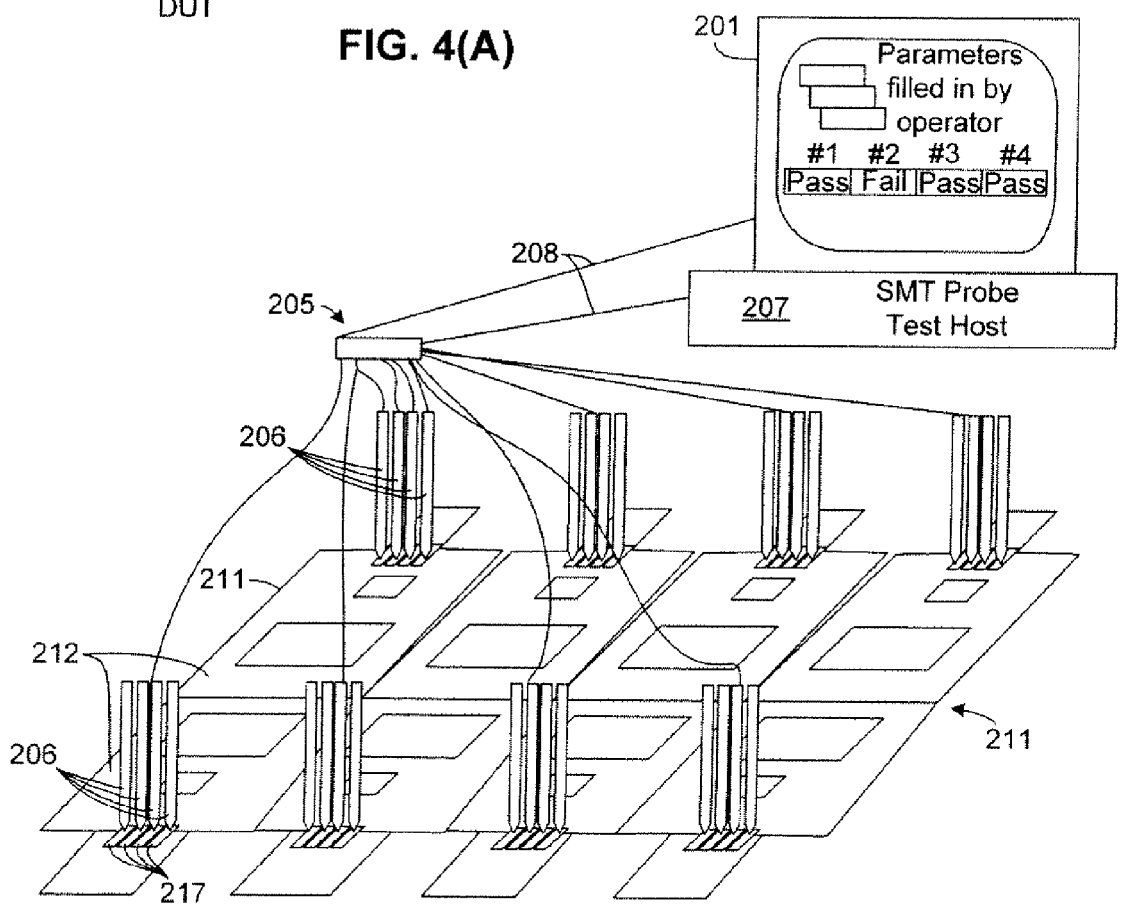
Figure 5A:
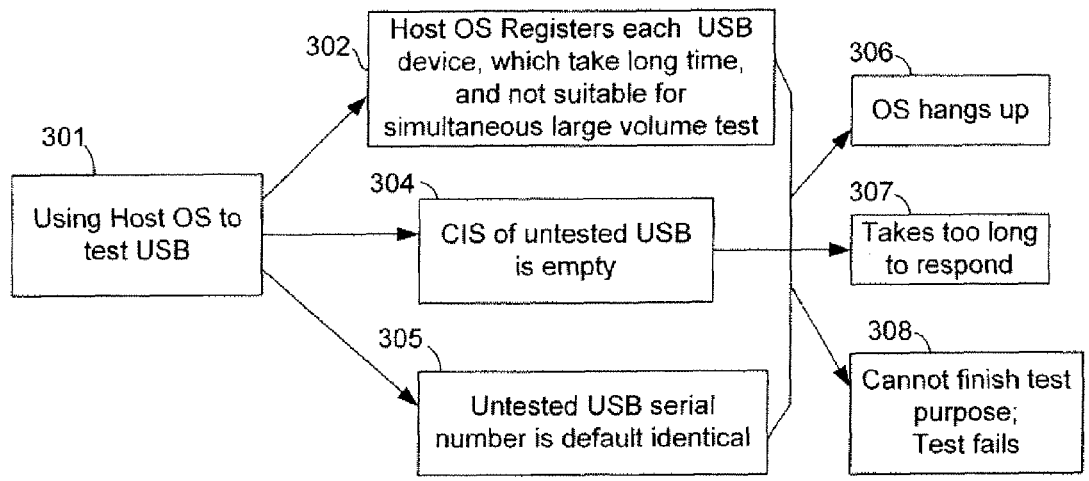
FIGS. 5(A) and 5(B) are simplified flow diagrams showing conventional and novel methods for testing and formatting USB devices, respectively.
Figure 5B:
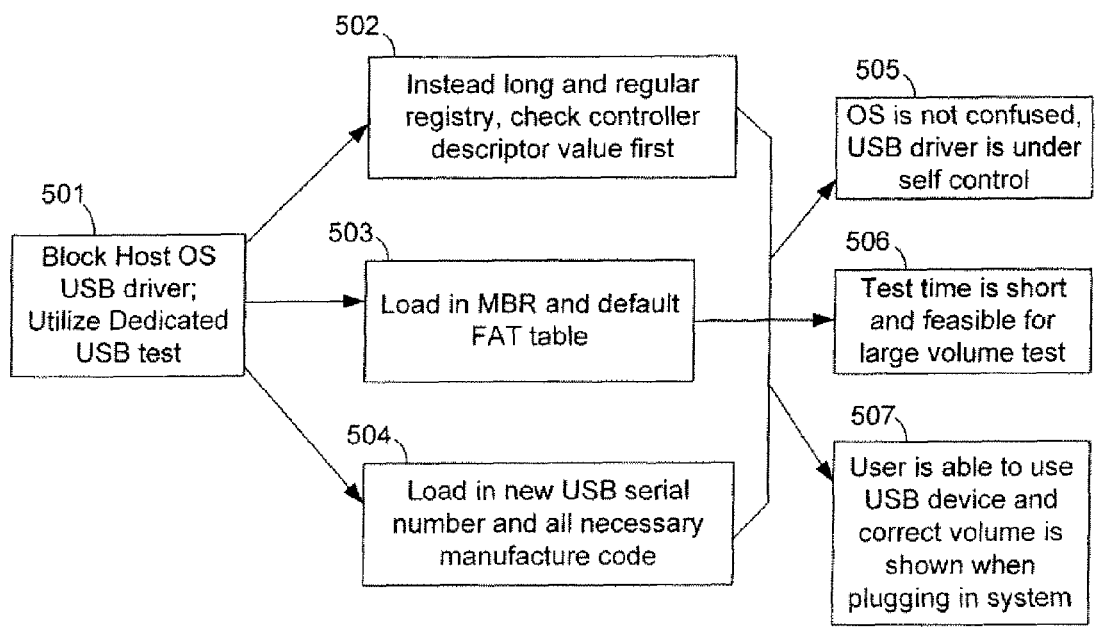

Referring again to FIG. 2, testing/formatting of the respective PCB assemblies 212 is then performed according to the present invention using the process described in additional detail below. In one embodiment, panel 211 (see FIG. 3(A)) is subjected to singulation (block 52A), whereby the individual PCBAs 212 are cut or otherwise separated from each other, and then the individual (singulated) PCB assemblies (PCBAs) 212 (see FIG. 3(B)) are subjected to the test/format procedure (block 52B). In an alternative embodiment, PCBAs 212 are subjected to testing while still connected to panel 211 (block 53A), and then the tested/formatted PCBAs 212 are singulated (block 53B). Testing/formatting PCBAs 212 while still attached to panel 211 is presently preferred by the inventors in that this alternative allows multiple PCBAs 212 to be maintained in a fixed relationship for testing by a single fixture, thus avoiding the additional processing time needed to handle individual PCBAs 212 (e.g., to insert PCBAs 212 piece by piece into a test fixture). Referring again to FIG. 2, each PCBA 212 that successfully completes testing/formatting is subjected to product packaging (block 54) whereby a housing is molded or mounted over the components of each PCBA 212, thereby completing USB device 10B for final testing (block 55) and shipping preparation. Note that the final test performed in block 55 differs from the testing/formatting performed in blocks 52B and 53A in that, because all initial contents are downloaded into each packaged device 10B, the final test performed in block 55 involves a simple plug-in test to check, e.g., device capacity to make sure an end user's expectations are satisfied. FIGS. 4(A) and 4(B) are perspective views showing exemplary systems for testing/formatting USB devices in accordance with the present invention. FIG. 4(A) shows a first system for testing individual (singulated) PCBAs (alternatively referred to below as Devices Under Test (DUTs)) in accordance with block 52B of FIG. 2. The first system includes a PC test host (e.g., a general purpose personal computer (PC)) 202, a monitor 201, a USB multiple card reader 204, and other necessary peripheral IO devices such as a keyboard and mouse (not shown). In one embodiment, all test parameters are shown on monitor 201 for monitoring test status, where color flags are used to distinguish test Pass/Fail. Some parameters utilized during the test may be keyed in by an operator, as indicated on monitor 201. USB card reader 204 includes multiple (e.g., sixteen or more) USB sockets (receptacles), where each socket has an assigned number (e.g., #1, #2, etc.) corresponding to flags displayed on monitor 201. Card reader 204 is connected to test host 202 by normal USB cables that are connected to a standard USB socket 203 of test host 202. As each DUT is plugged into a corresponding port of multiple card reader 204, which couples the DUT to test host 202 by way of USB port 203. Detection of each plugged-in DUT causes a corresponding flag displayed on monitor 201 to reflect the detection (e.g., the corresponding flag changes from red to green upon detection). FIG. 4(B) shows a second system that utilizes a probing fixture to test pre-assembled PCBAs 212 that are still connected to panel 211. The second system includes a SMT probe test host (e.g., a general purpose personal computer (PC)) 207, monitor 201, a probe fixture 205, and other necessary peripheral IO devices. Probe fixture 205 includes multiple test probes 206 are grouped and arranged to contact USB pins 217 of each PCBA 212 when fixture 205 is lowered onto a panel 211. Probes 206 provide the four signal paths that are used to format/test each device of panel 211. A congregate cable 208 is used to connect fixture 205 to test host 207. FIG. 5(A) is a simplified flow diagram showing a conventional method for testing and formatting a conventional USB device using a conventional USB test system that utilizes a conventional host operating system (OS) USB driver (block 301). As indicated in block 302, upon connecting a conventional USB DUT to the host system, the host OS registers the conventional USB DUT using pre-established USB protocols. The pre-established USB protocols are based on the assumption that certain device information (e.g., device identifications and serial numbers which may be identical before test) are stored in predetermined locations on a read-only memory (ROM) device on the controller that is provided on the DUT. In addition, the pre-established USB protocols require that the registration process be performed on one DUT at a time (i.e., the registration process must be completed for one DUT before beginning the registration process on another DUT), if one fails, whole chain of DUTs will be held until operator re-installs the process. As indicated in block 302, a problem with utilizing these pre-established USB protocols is that they take a significant amount of time to register each DUT, and to store the registration information on the host OS registry bank (and eventually stored on the host's hard disk), and they are not suitable for simultaneously testing/formatting a large number of DUTs. Additional problems with the conventional pre-established USB protocols are that they are not compatible with the novel USB device described herein (i.e., where control code data and boot code data, along with component and device identification information, are stored in the flash memory device instead of in predetermined locations on a ROM). For example, as indicated in blocks 304 and 305, because untested/unformatted devices formed in accordance with the present invention do not include component identification serial numbers and product identification numbers, the conventional pre-established USB protocols may cause the host test system to hang up (block 306), and/or to take a long time to complete the test (block 307), and/or to simply fail to complete the formatting/testing process (block 308). FIG. 5(B) is a simplified flow diagram showing a method for testing and formatting the novel USB device of the present invention according to another embodiment of the present invention. As shown in block 501, new software is loaded into the test host that blocks the traditional OS USB registry driver, and implements a dedicated USB test. The purpose of blocking the conventional OS USB driver is to make the testing time shorter by eliminating the time consuming registration process that has the problems discussed above. The dedicated USB test bypasses the portions of the registration process that request information from the USB device (which is not yet written into the flash memory device), and instead initiates the testing/formatting process by directing the controller of the USB device to write at least one of boot code data, control code data, and device identification data into the flash device. In particular, as indicated in block 502, to avoid regular lengthy registration of USB devices, which number might be over sixteen devices at a time, the testing/formatting method software running on the test host system is modified to begin by reading controller hard-coded descriptor values and comparing these descriptor values with stored program parameters to verify that the DUT is ready to be formatted, and to provide the DUT with correct parameters for normal operation. Only a successful check will continue the software flow. Next, as indicated in block 503, master Boot Block (MBR), file allocation table (FAT) and initial system files are written into the flash device in order to make the USB device available for end customer usage. Traditional USB drivers will not perform this formatting process because conventional USB devices are programmed correctly for initial system operation using a ROM. This formatting step is crucial for manufacture software purpose, to facilitate later use. In addition, as shown in block 504, several values are written into the flash to meet USB specifications. The device serial number is one such value, and the device serial number written to each device is changed either sequentially or randomly by software from some starting number keyed in by the test operator. Other variables, like Product ID for example, also need to be changed by different product or volume capacity. Again, conventional OS USB registry drivers do not perform these value and variable writing functions, thus making volume USB testing unfeasible.

Figure 6:
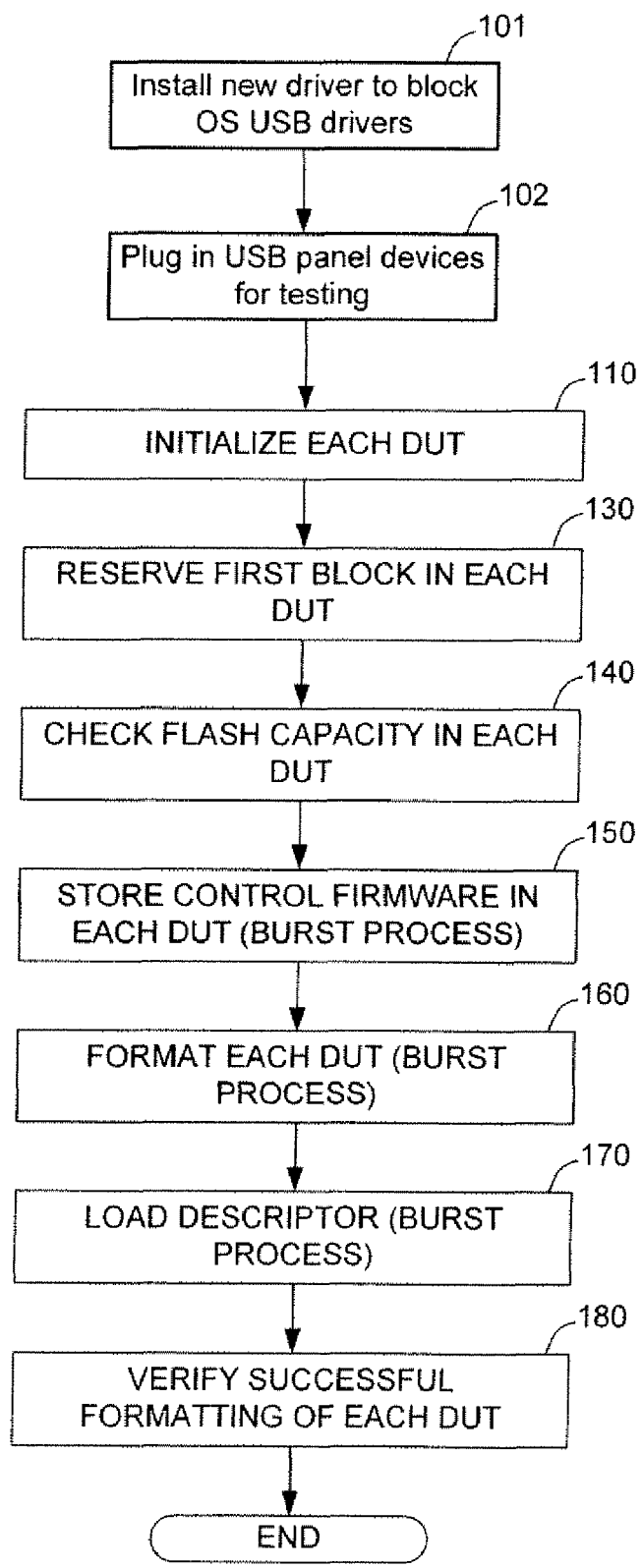
FIG. 6 is a flow diagram showing a simplified method for testing and formatting USB devices according to an embodiment of the present invention.

As indicated in block 505, 506 and 507, the present invention provides several benefits over conventional OS USB registry drivers for testing because the present invention utilizes specially-designed manufacture software, the time required to format/test a large volume of USB devices is minimized. In addition, partitions (or volumes, drive letters) can be customized to fit each different requirement according to known techniques. FIG. 6 is a simplified flow diagram showing a USB device manufacturing formatting/testing method according to a specific embodiment of the present invention. The method of FIG. 6 may be used for singulated devices or multiple devices connected to a panel to achieve a high speed "pipelined" formatting/testing procedure, instead of slow individual DUT testing (e.g., as shown in FIG. 3(A)).

As indicated in block 101, prior to beginning the formatting/testing process on a selected DUT (or group of DUTs), modified USB driver software is installed on the test host system that is operable to block the conventional OS USB driver section identified as "HCDI.sys". Software commands that can be used to prevent the execution of section "HCDI.sys" are known to those skilled in the art. In one embodiment, some minor files of the OS USB Bus Driver are replaced for this purpose, as is understood by those skilled in the art.

In block 102, one or more "brand new" (unformatted and untested) USB devices formed in accordance with the present invention are probed, plugged or otherwise coupled to a suitable test fixture (e.g., one of the fixtures shown in FIGS. 4(A) and 4(B)).

Figure 6A:
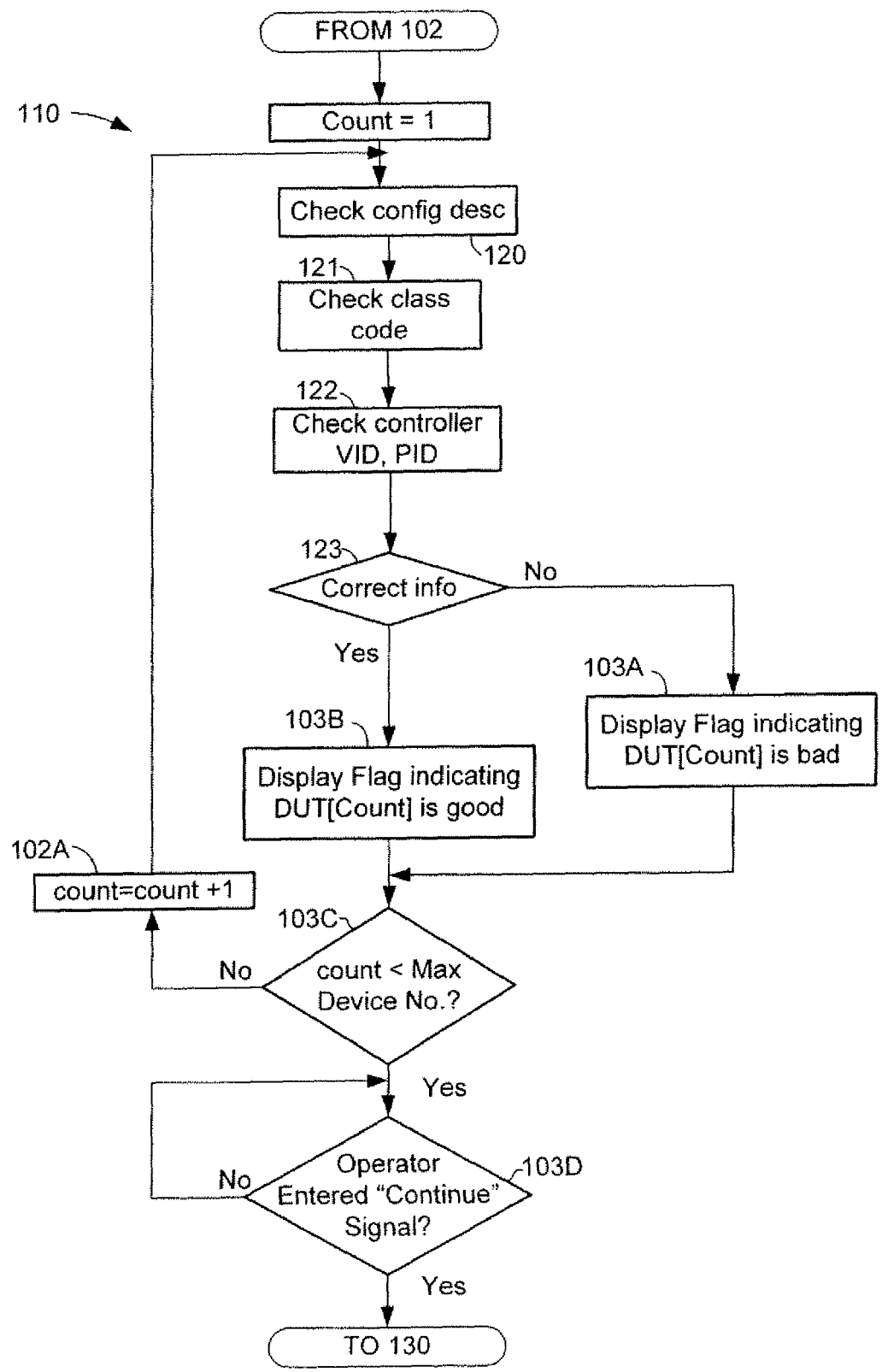
FIGS. 6(A), 6(B), 6(C), 6(D) and 6(E) are flow diagrams showing portions of the testing and formatting method of FIG. 6 in additional detail.

In block 110, an initial brief check of the multiple USB devices is then performed by checking contents in the controller hard-code values, which will identify most common errors. In particular, as shown in FIG. 6(A), once the USB devices are coupled, a count value is set at "1", and the host test software reads at least some hard-coded data stored in a first device (e.g., one or more of the configuration, interface, and endpoint descriptors that are hard coded in the controller ROM (block 120), mass storage class codes (block 121), and vendor identification (VID) and product identification (PID) values (block 122)), and compares the hard-coded data with predetermined known-good values to determine if an incorrect USB device is coupled to the test host. If an incorrect device is detected (NO branch in block 123), a warning signal is generated by way of a colored (e.g., red) display flag associated with the corresponding DUT (e.g., "DUT[1]" or "DUT[2]", generally referred to as "DUT[COUNT]"; block 103A), alerting an operator to remove the incorrect device. After the successful brief check of a selected device (YES branch in block 123), a color (e.g., yellow) display flag or other graphic signal is displayed on the host test system (block 103B). The device count value is then compared against a predetermined maximum device number corresponding to the number of devices that are currently under test (e.g., all devices connected to a panel) in block 103C. If the count value is less than the maximum device number, then the count is incremented (block 102A) and the brief check is repeated on another USB device coupled to the test system (i.e., blocks 120-123 and block 103 are repeated), until every device coupled to the host test system has been successfully briefly checked (YES branch in block 103C), at which point the count value is reset. As indicated in block 103D, once initialization of all of the DUTs is completed, the process is optionally paused and waits for a "continue" signal issued by an operator (e.g., pressing a space bar on the host system keyboard, or using a mouse to click a START icon on monitor display). This pause allows the operator time to visually check the display flags for all of the DUTs, and to replace any DUTs that are indicated as being defective (in this case, the initialization process will be repeated for the newly added DUT). By briefly checking at least some hard-coded data before testing and/or formatting the flash memory device, the method according to the present invention facilitates efficient and reliable processing of USB devices.

Figure 6B:
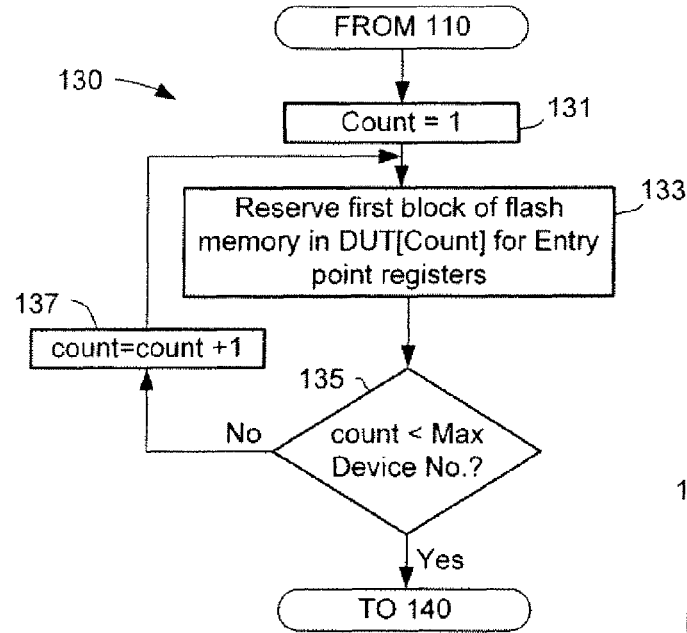

Referring again to FIG. 6, once the brief initial check of all USB devices is completed, the test host performs the actual testing and formatting of the flash memory device. This testing/formatting process begins by reserving the first block of flash memory for registering (storing) predetermined code entry points (block 130; FIG. 6). As shown in FIG. 6(B), in one embodiment, this reservation process is performed on each DUT in succession by setting a count value to "1" (block 131), selecting the current DUT (DUT[Count], reserving the first block of flash memory in the current DUT for entry point registers (block 133), and then incrementing the count value (blocks 135, 137) and repeating the reservation process for the next DUT until all of the DUTs have been processed ("Yes" branch in block 135). The code entry points that are eventually stored in the reserved space include an OS entry point, a firmware entry point, and a non-volatile register entry point. Note that the actual code entry point values are written (loaded) in associated fields of the reserved first block after the testing/formatting process is completed.

Figure 6C:
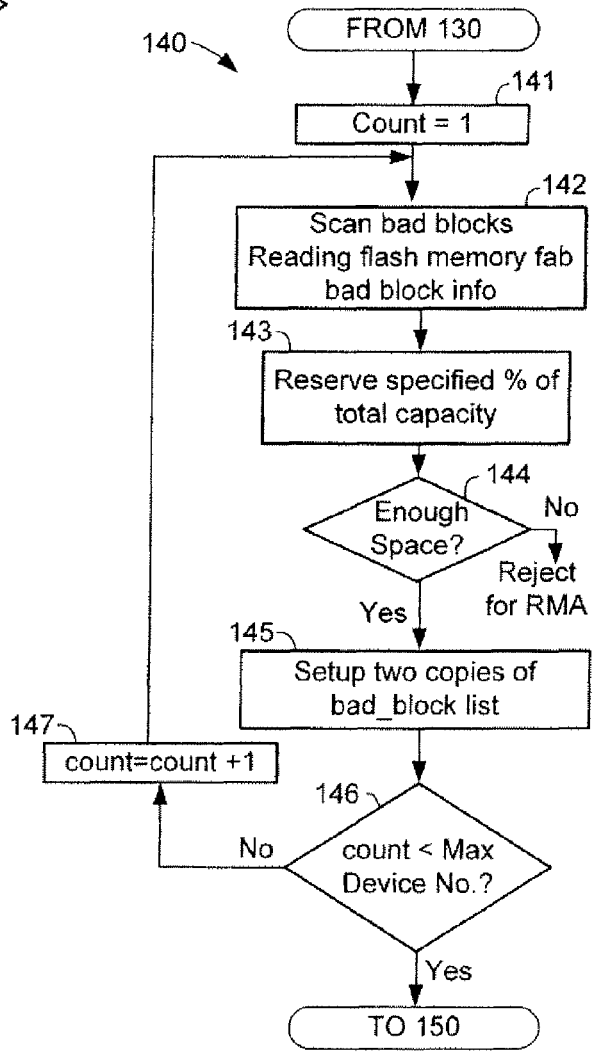

Next, the capacity of the flash memory provided on each USB device is checked (block 140; FIG. 6). FIG. 6(C) is a flow diagram showing the capacity check process of each DUT according to one embodiment. The process begins be setting the count value to "1" (block 141). The memory capacity check is then sequentially performed in each DUT by reading initial bad block information provided in the flash memory device (i.e., reading flags located in fixed locations of the flash memory device that are programmed by the flash memory device manufacturer or vendor; block 142). The bad block information generated from the scan is then used to determine whether the specified percentage of reserved memory is present (blocks 143 and 144), and the DUT is rejected if insufficient reserve memory is provided. A predetermined amount (e.g., 20%) of reserve memory (expressed as a specified percentage of the total "good" memory) is required according to test specifications for future bad block data relocation purposes (i.e., at some point when one or more flash cells of a good block fail, the data from that good block is copied and relocated in a reserved good memory block). Note that, for USB devices having an even number (two or more) flash memory chips, when a high percentage of bad blocks is detected, dual channel (parallel accessing two chips) operation is not suitable for mass volume production, only single channel (access) is recommended. By checking the flash memory reserve capacity of each USB device before formatting the flash memory, the present invention facilitates early identification and rejection of unsuitable USB devices, thereby reducing manufacturing costs by minimizing the total amount of time needed to program multiple USB devices. After an acceptable reserve capacity is verified (YES branch in block 144), two or more copies of the bad block identification data (bad_block_list) are stored in reserved areas of the flash memory for safety purposes (block 145). In one embodiment, the bad block data is stored in memory locations that are located after the memory locations reserved for the entry point data (e.g., the second and third memory blocks), and two additional memory blocks (e.g., the fourth and fifth memory blocks) are reserved for future expansion. Storing two copies of the bad block data provides redundancy that assures reliable long-term operation of the USB device. Upon completing the capacity check and bad block data storage process for the first DUT, the count value is incremented (block 147), and the capacity check and bad block data storage process is sequentially repeated in each DUT until all DUTs have been processed ("Yes" branch in block 146).

Next, in accordance with another aspect of the present invention, at least one of control code data (dynamic control firmware) and boot code data is written into selected memory blocks of the flash memory using a burst writing process (block 150, FIG. 6). The control firmware is generated by the manufacturer to facilitate later controller operation. Typically, conventional USB devices include two categories of ROM-based control code, static control code and dynamic control code. Static control code consists of an initial reset jump address plus basic flash erase/write/read operation state machine information that is designed to accommodate a wide range of flash memory types (e.g., the static control code includes relatively long write time delays that facilitate write operations to "worst case" (slowest) flash memory types). In accordance with the present invention, this static control code is stored in a ROM that is accessed by the controller at start-up. Dynamic control code includes timing adjustment control information for the particular flash memory type utilized by the DUT to both facilitate optimal flash memory performance (e.g., optimal write operation times), and to maintain field adjustability. In accordance with an aspect of the present invention, this dynamic control firmware is stored in selected blocks of the flash memory in order to reduce controller die size and to facilitate field adjustability. After the dynamic control firmware is written into the flash memory, a control bit of the DUT is reset to move control of the DUT processor from the static control code to the dynamic firmware code. To facilitate this move to the dynamic firmware, the static "jump start" firmware provided in the ROM includes an entry point address of the dynamic control code for further execution access.

Figure 6D:
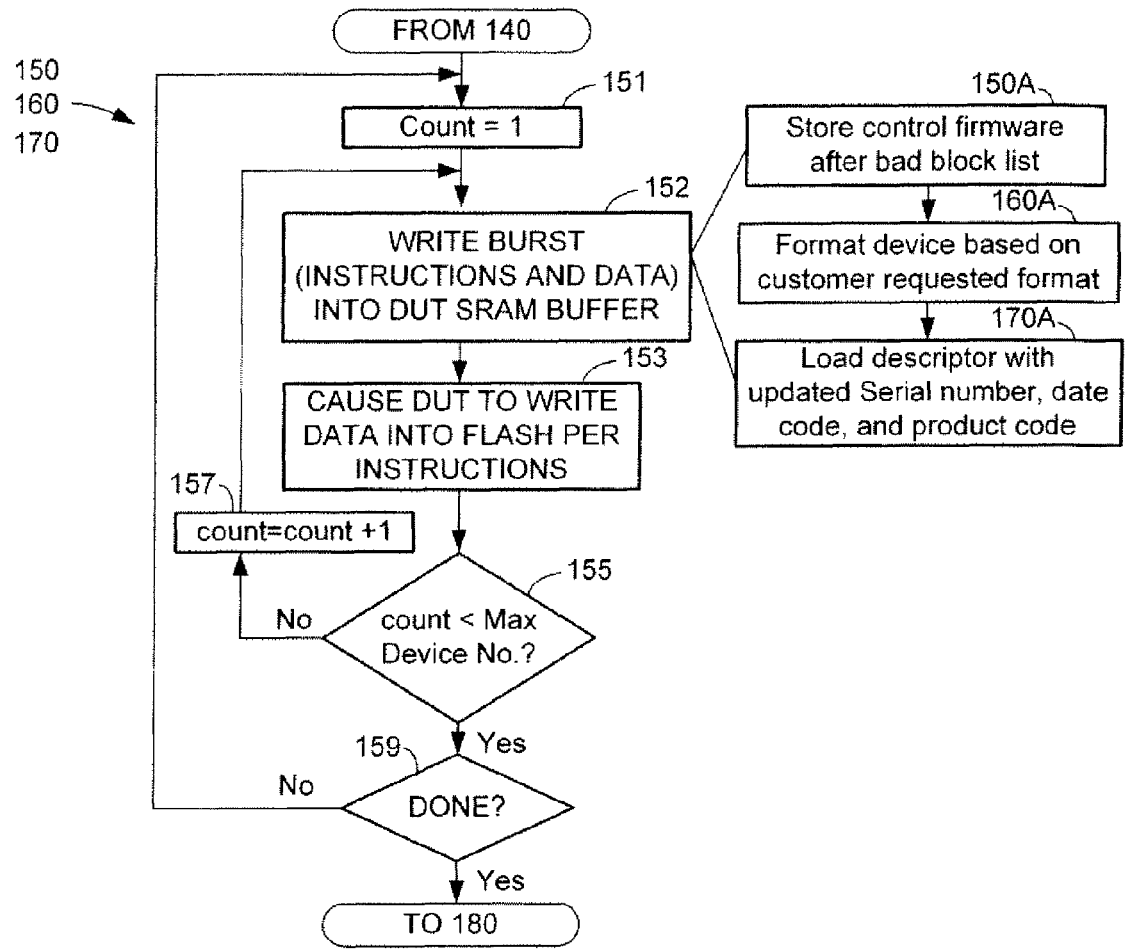

FIG. 6(D) is a simplified flow diagram illustrating a burst writing process for writing the control firmware into each DUT in a "pipelined" manner that minimizes processing time. A count value associated with a current DUT is initialized (block 151), and then one page (or block) of instructions and/or data are written into the SRAM (volatile) buffer of the first DUT (block 152). As indicated to the right of block 152, the page of instructions and/or data include writing the control firmware in the block immediately following the bad block list. After one page is written, the host system instructs the DUT to write the instructions/data from the SRAM buffer into the flash memory cells (block 153). Note that at this stage of the formatting/testing process the dynamic control code is not yet written into the flash memory, so the writing process employed by the DUT is based on the slower static control code. In accordance with the present invention, in order to facilitate this writing process in a time efficient manner, once one page of instructions/data are written into the SRAM and the DUT is instructed to perform the write operation, the host system "moves on" to the next DUT (i.e., the count value is incremented in block 157, and then the host system writes the same instructions/data into the next sequential DUT). Eventually, the page of instructions/data is written into each of the DUTs (YES branch in block 155). At this point, the host system determines if all necessary instructions data have been written into each of the DUTs. If not, then the count number is re-initialized (block 151), and the write process is repeated to write the next page of instructions/data into the DUTs. Note that, when the second page of instructions/data is written into the first DUT (i.e., DUT[1]), the first DUT has completed the process of writing the first page of instructions/data from its SRAM buffer into the designated block of flash memory. Using this "pipelines" approach, the process of writing dynamic control code into each DUT is performed in a highly efficient manner that avoids long delays while the host system waits for each DUT to write information/data into its flash memory.

In addition to the control firmware, in one embodiment of the invention, one or more blocks of the flash memory are designated as non-volatile registers, and these non-volatile registers are used to store write-protected information, for example, volume partition numbers and user passwords, whose values cannot be lost as power is switch off after initial usage. This information is written into each DUT either during the burst writing process described above, or in a subsequent (i.e., second) burst writing process after the dynamic control code is written into each DUT. Note that, if a subsequent burst writing process is used, then the dynamic control code may be used to speed up the writing process.

Next, as indicated in block 160 (FIG. 6), low-level formatting of the flash memory based on customer-provided specification is performed. In one embodiment, this low-level formatting process includes writing Master Boot Block (MBR) information, file allocation table (FAT1/2) information, and initial root directory information into selected memory blocks of the flash memory. Without this information, the USB device is unusable by end customers. Note that, if an end customer obtains a USB device that has not been subjected to low-level formatting, the USB device will be unusable, and the end customer cannot perform this step themselves by utilizing OS provided format software. However, after low-level formatting is completed, the end customer is able to change FAT styles as they wish. The low-level-formatting information is written into each DUT either during the burst writing process described above (e.g., as indicated by block 160A in FIG. 6(D)), or in a subsequent burst writing process after the dynamic control code is written into each DUT.

Following low-level formatting, updated serial number, date code, and product version code values are written into the non-volatile registers (block 170; FIG. 6). The descriptor information is written into each DUT either during the burst writing process described above (e.g., as indicated by block 170A in FIG. 6(D)), or in a subsequent burst writing process after the dynamic control code is written into each DUT.

Figure 6E:
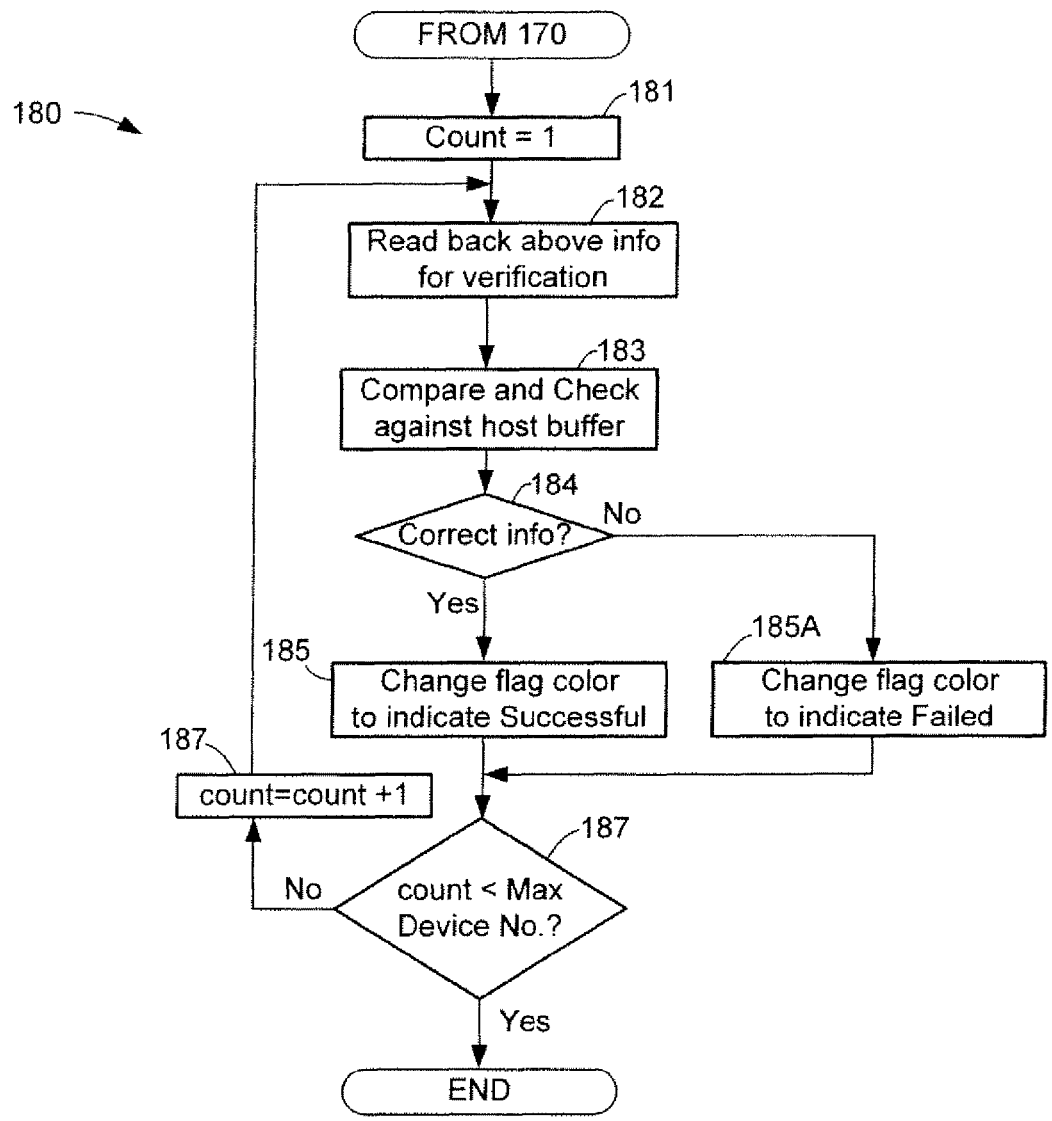

Next, all information written to the flash memory is read by the test host (block 180), and then compared against pre-stored values in a buffer of the test host for verification that the USB devices is properly formatted. A verification process in accordance with an embodiment of the present invention is shown in FIG. 6(E). A count value is set to "1" (block 181), and then the host system directs the current DUT to read back predetermined information from the flash memory (192). Note that the read-back process is performed using the dynamic control code previously written into the DUT. The information read from the DUT is then compared with the pre-stored data in the host system (block 183). If any of the data read from the USB device is incorrect (NO branch in block 184), a corresponding flag is displayed (e.g., a red flag) on the host test system monitor indicating to an operator that the USB device failed the testing/formatting process (block 185A). Conversely, if all of the data read from the current USB device is correct (YES branch in block 184), a corresponding flag is displayed (e.g., a green flag) on the host test system monitor indicating that the testing/formatting process is successful (block 185B). The device count value is then compared against the predetermined maximum device number corresponding to the number of devices that are currently under test (e.g., all devices connected to a panel) in block 187. If the count value is less than the maximum device number, then the device count is incremented by one (block 189), and the testing process is repeated on another USB device coupled to the test host until every device coupled to the host test system has been checked (Yes branch in block 187). Then the test host program terminates.

Figure 6F:
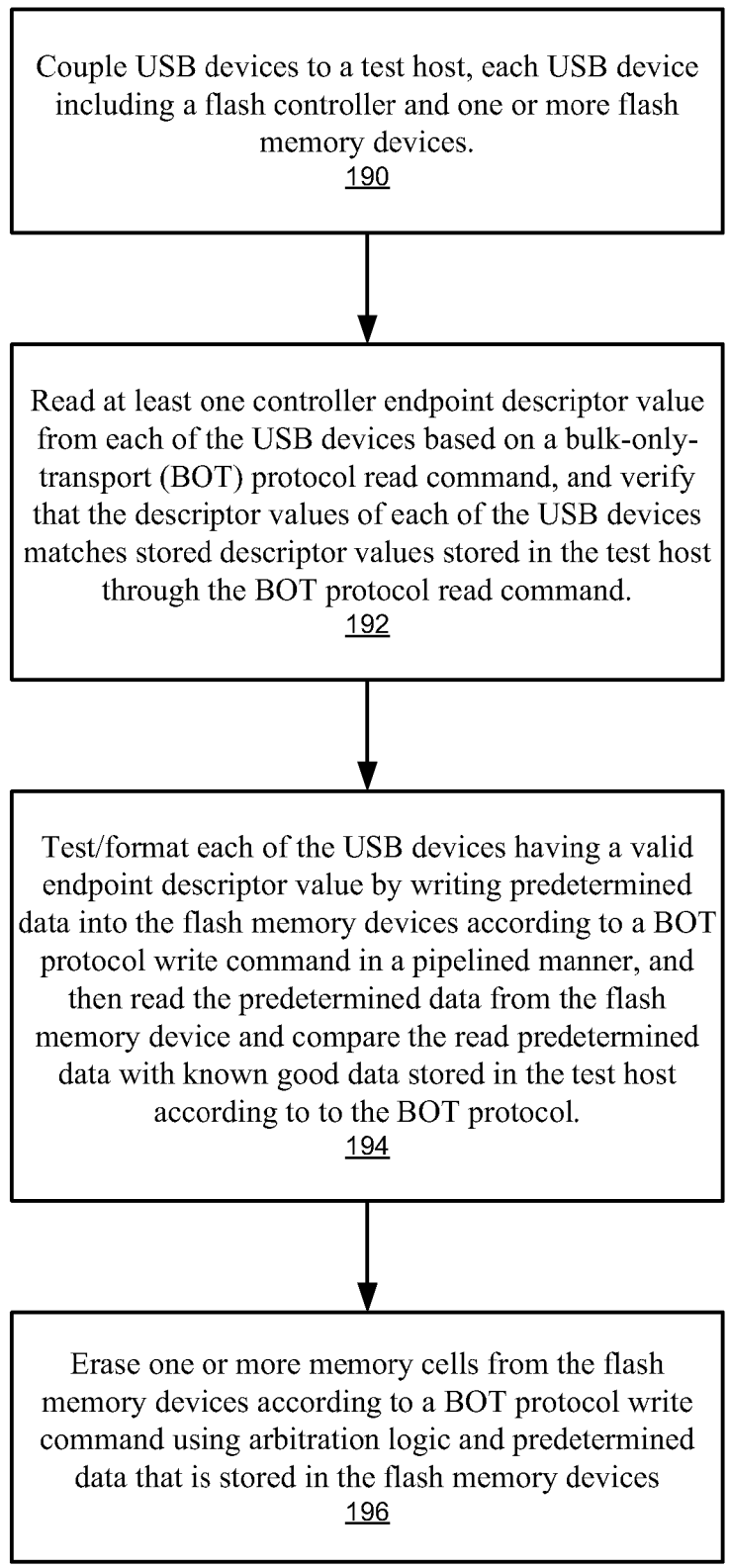
FIG. 6(F) is a flow diagram showing portions of the testing procedure using a bulk-only-transport protocol according to one embodiment.

FIG. 6(F) is a flow diagram illustrating a method for testing a flash memory device using a bulk-only-transport (BOT) protocol according to one embodiment. Referring to FIG. 6(F), at block 190, one or more USB devices are coupled to a testing host, where each USB device includes a flash memory controller and one or more flash memory devices. At block 192, at least one controller endpoint descriptor value is read from each USB device using a BOT protocol read command. The descriptor value is verified by matching the one stored locally in the testing host. At block 194, each USB device having a valid endpoint descriptor value is tested and/or formatted by writing predetermined data into the flash memory devices according to a BOT protocol write command. The predetermined data is then read back from the flash memory device and compared with the known good one stored in the testing host. At block 196, one or more memory cells are erased from the flash memory device using a BOT protocol write command using arbitration logic.

Figure 7:
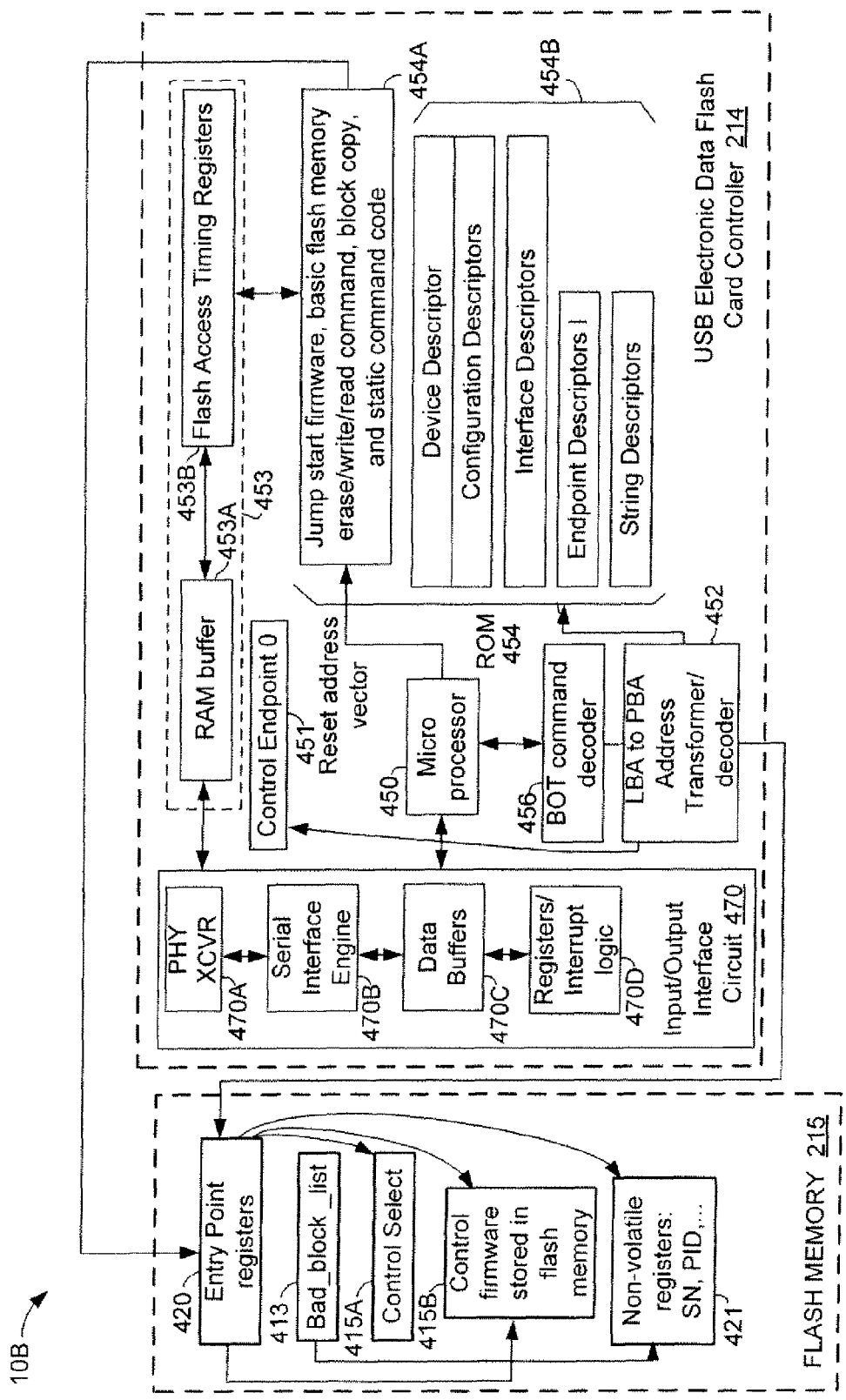
FIG. 7 is a simplified block diagram depicting an exemplary USB device produced in accordance with another embodiment of the present invention.

FIG. 7 is a simplified block diagram depicting an exemplary USB device 10B in accordance with a specific embodiment of the present invention. As set forth above, USB device 10B includes a flash card controller 214 and one or more flash memory devices 215.

Referring to the left side of FIG. 7, flash memory 215, which is depicted in a simplified form in FIG. 7 and described in additional detail below, includes entry point registers 420, bad block data 413, a control select bit 415A, control firmware 415B, and non-volatile registers 421. As indicated, communication between controller 214 and flash memory 215 is directed through entry point registers 420, which direct controller requests to control firmware 415B and non-volatile registers 421, depending on the function being performed.

Referring to the right side of FIG. 7, controller 214 includes a microprocessor 450, a control endpoint register 451, an address decoder 452, a static random-access memory (RAM) 453, a ROM 454, and an input/output interface circuit 470. Control endpoint register 451 supports a default address 0, which is required of every controller. Control endpoint register 451 is used to communicate with this device, even if later the address is changed. Static RAM 453 includes a RAM buffer 453A and flash access timing registers 453B. Buffer 453A includes sufficient memory to store at least one block of flash memory 215, and is used, for example, when implementing block copy operations (e.g., reading data from flash memory 215 and writing to RAM 453) to improve execution speed. Flash access timing registers 453B store command codes that are utilized by controller 214 during communications with flash memory 215. ROM 454 comprises hard-wired data (i.e., data that cannot be modified) that includes jump start firmware 454A, and various descriptors 454B. Jump start firmware 454A includes a reset address vector which causes microprocessor 450 to execute a far jump operation to entry point register 420 of flash memory device 215. Jump start firmware 454A register also includes most of the basic read/write/erase timing state machine information and block copy commands, because changing this code is not required. In addition, jump start firmware 454A includes the static command code that is written to flash access timing registers 453B and utilized as default timing, for example, during initial read/write operations from/to flash memory 215. Note, however, that the dynamic control code used to support different types of flash memory is stored in control firmware register 415B in flash device 215 to facilitate easier updating. Various descriptor values 454B, which are also hard-coded in ROM 454, are used when the test host requests specific information from USB device 10B. Failing to respond or responding with wrong values can cause rejection of USB device 10B by the test host, and also considered as being a controller failure. Detail descriptor values are provided, for example, in the USB mass-storage class specification. Controller 214 includes a Bulk-only-transport (BOT) command decoder 456 to facilitating communication with flash device 215 using BOT commands. LBA-to-PBA address transformer/decoder 452 is used for decoding logical addresses generated by BOT command decoder 456. Input/output interface circuit 470 includes a physical layer USB transceiver 470A for transmitting and receiving USB differential NRZI signals, a serial interface engine 470B for performing serial to parallel (receive mode) operations and parallel to serial (transmit mode) operations, a data buffer 470C for buffering incoming/outgoing data frames, since speed matching is different when dealing with SIE, and various registers and interrupt handling logic 470D for USB protocol handling.

Figure 8:
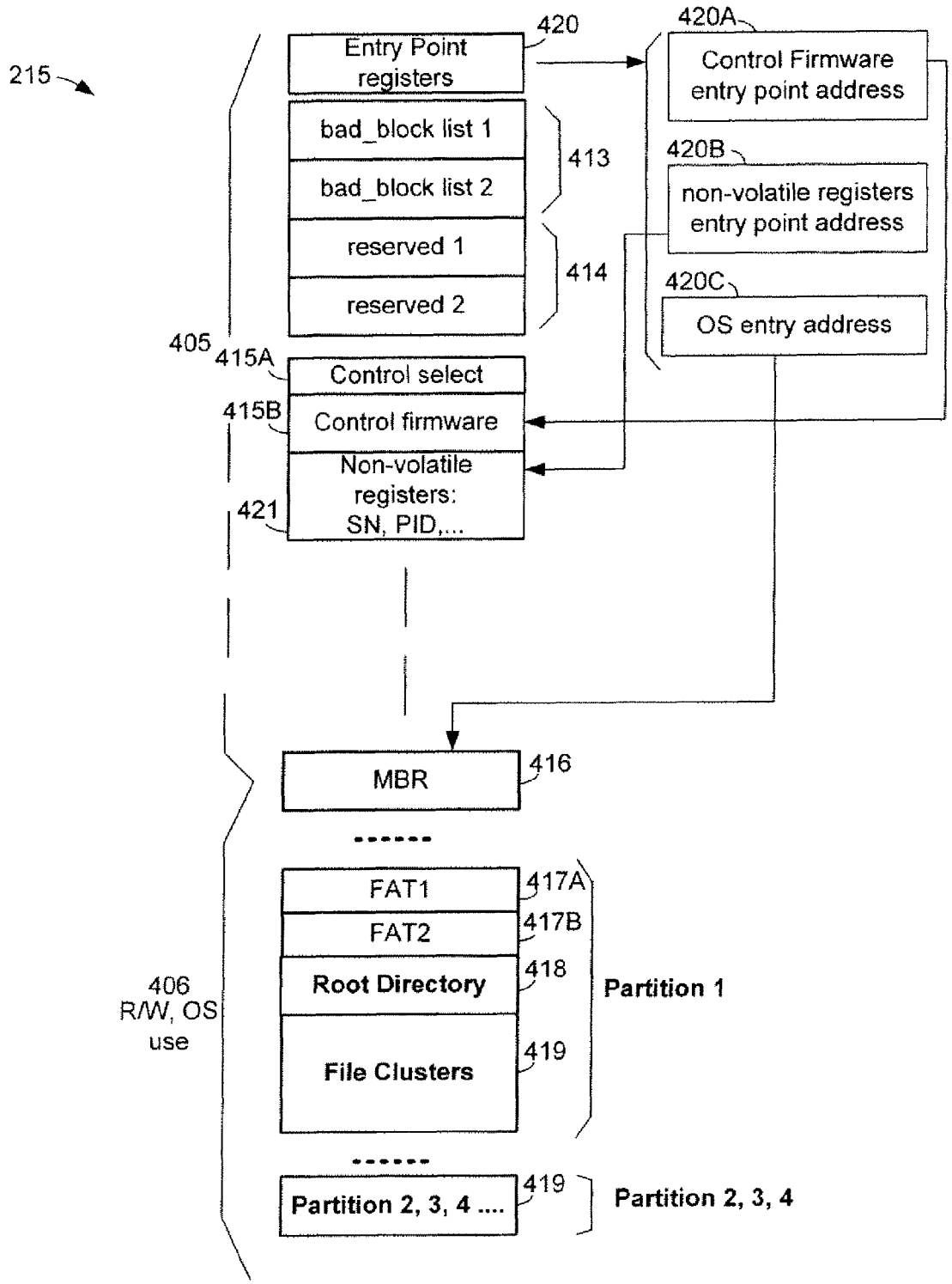
FIG. 8 is a simplified block diagram depicting the various address structures and partitions of a flash memory device utilized in a USB device according to an embodiment of the present invention.

FIG. 8 is a simplified block diagram depicting the various address structures and partitions of flash memory 215 after the testing/formatting process (described above) is completed. As indicated on the left side of FIG. 8, flash memory 215 is generally divided into read-only zone 405 and read/write zone 406.

Read-only zone 405 includes entry point registers 420, bad block list 413, reserved blocks 414, control firmware 415B, Master Boot Block 416, and non-volatile registers 421. As indicated on the right side of FIG. 8, entry point registers 420 include a control firmware entry point address 420A that stores the location of control firmware 415B, non-volatile registers entry point address 420B that store the locations of the various values stored in non-volatile registers 421, and an operating system (OS) entry address 420C which stores the location of MBR 416. Read-only zone 405 can only be updated by Manufacture test software, and cannot be altered by normal user host PC system. Control firmware 415B is executed by microprocessor 450 of controller 214 (see FIG. 7), and is read-only (i.e., cannot be updated by end users). Similarly, non-volatile registers 421 store several values that may be modified during the test/formatting process (e.g., product serial or ID number), but cannot be changed by an end user.

Read-write zone 406 includes memory blocks that are accessible to an end user. In one embodiment, read-write zone 406 includes a basic file structure so that files can be read/written by a host OS, and is divided into multiple partitions (e.g., Partition 1, 2, 3, 4). The first partition (Partition 1) includes file allocation tables FAT1 417A and FAT2 417B, a root directory 418, and file clusters 419.

In accordance with an embodiment of the present invention, when device 10B is initially powered up, the static command code is read from the jump start firmware 454A into flash accessing timing registers 453A. During the initialization step (block 110 of FIG. 6), controller 214 accesses flash device 215 using the default timing provided by the static command code to read, for example, the product identification data for flash memory 215. This product identification data is passed to the host system, which compares this data with a stored table to identify updated timing parameters (alternatively, the operator can provide the flash memory product identification to the host system prior to initializing the formatting process). The updated timing parameters are then written by the host system to the controller, which stores the updated timing parameters in flash access timing registers 453B. Once this process is completed, the controller utilizes the updated timing parameters to write the formatting information into flash device 215 in a highly efficient manner, thereby further reducing manufacturing time. Note that once formatting is completed, control select bit 415A is set in flash memory 215, and when device 10B is subsequently powered up, control select bit 415A causes controller 214 to write the dynamic control code from control firmware 415B into flash access timing registers 453B.

Figure 9:
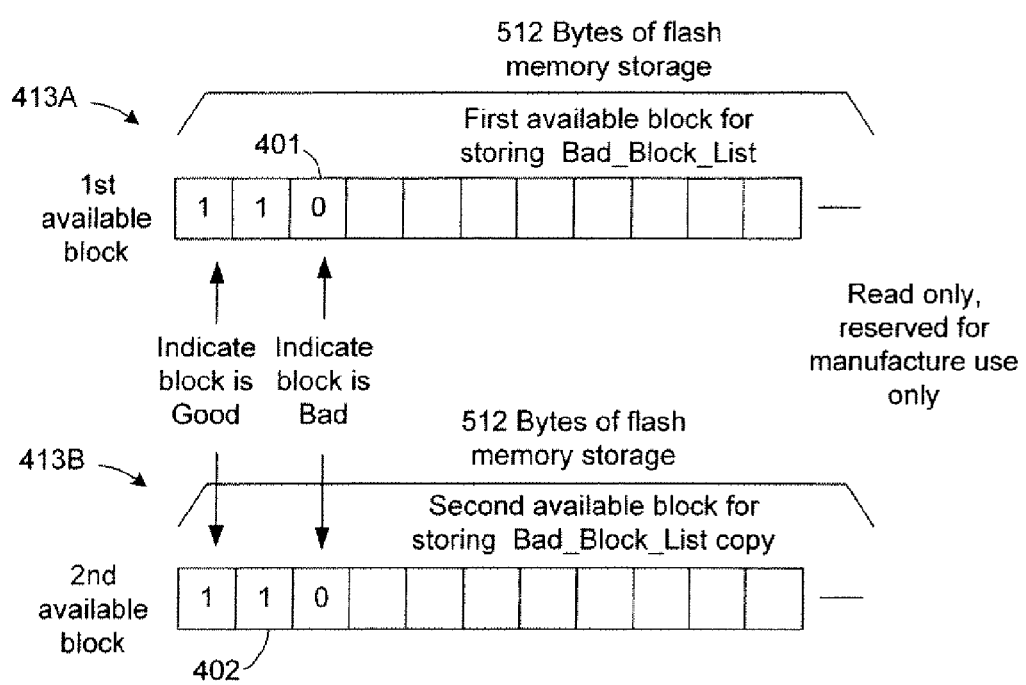
FIG. 9 is simplified diagram showing exemplary bad block list structures stored in a flash memory device of a USB device according to an embodiment of the present invention.

FIG. 9 is a diagram showing exemplary bad block list structures stored in flash memory 215 according to an embodiment of the present invention. In this embodiment, a binary "1" value indicates a good memory block 402, and a binary "0" indicates a bad memory block 401. Two copies of bad block data 413A and 413B are stored to guarantee accurate bad block data is available, even if one copy is subsequently corrupted. Another two blocks 414 (see FIG. 8) are reserved for future use, in case one of the bad-block-lists 413A or 413B becomes bad. During manufacture testing, all the bad block updating is governed by manufacture test software. A bad block occurring during normal operation will trigger an update of bad-block-lists 413A and 413B according to processes defined in control code firmware 415B. Since one more bit will be updated to "0" for every one more bad block found, there is never a need to erase all bits to "1" before updating the bad-block-lists 413A and 413B as is required for updating other flash data blocks. Therefore, reliability is much higher for the blocks dedicated for storage of bad block data.

Figure 10A:
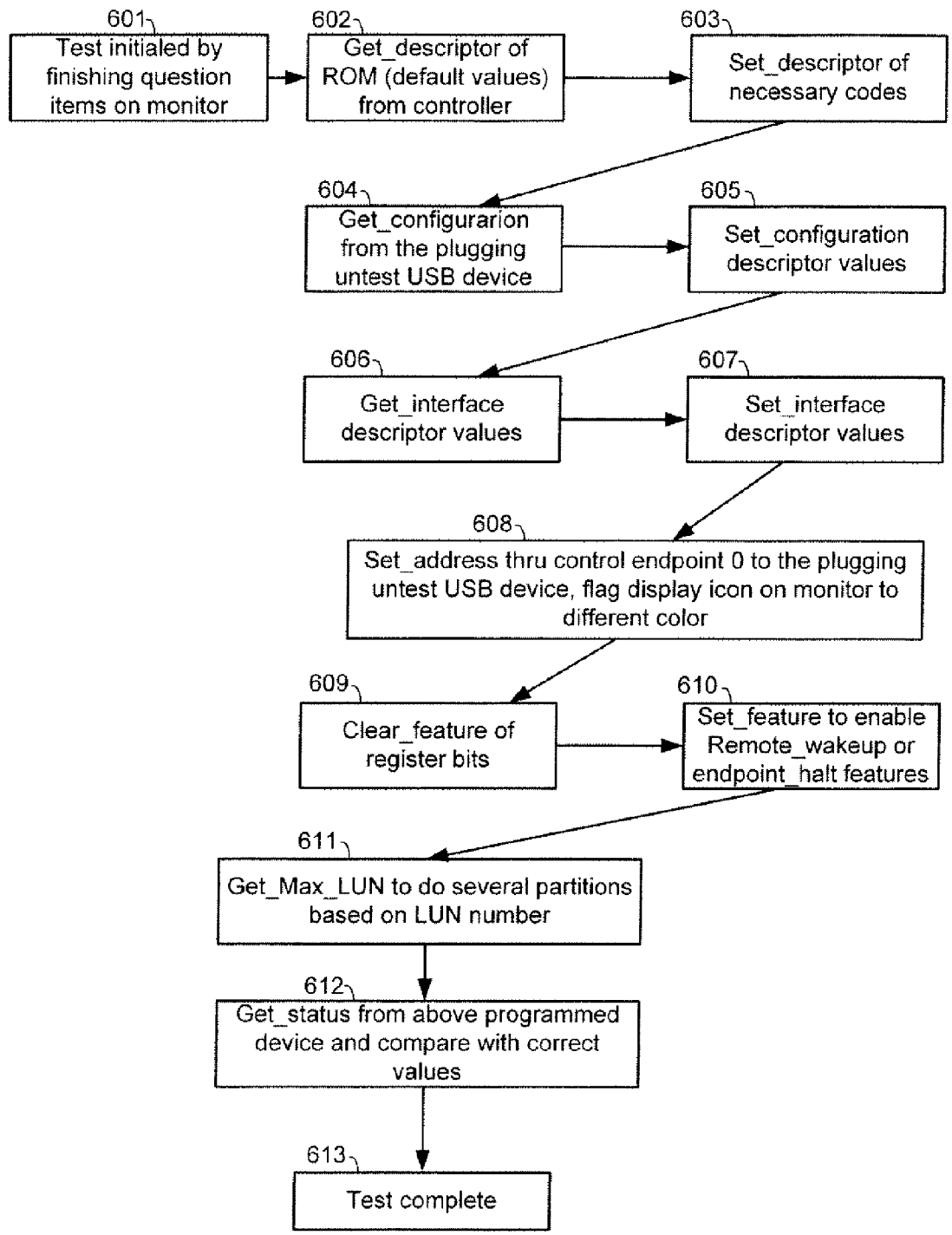
FIG. 10(A) is a flow diagram of a manufacture software algorithm for performing the testing/formatting process according to another embodiment of the present invention.

FIG. 10(A) is a flow diagram of a manufacture software algorithm for performing the testing/formatting process of a USB DUT according to another embodiment of the present invention. The test is initiated when a DUT is coupled to the test host and all parameters prompted by the test host are keyed in by an operator (block 601). The software executes a Get_descriptor (read) process that transmits instructions to read controller internal hard-coded descriptor values (block 602), and then a Set_descriptor command is executed by the software to set correct values, and to add or change descriptors other than those stored in the controller RAM registry. Initial configuration values are then read by software as a Get_configuration command is issued (block 604), then each different configuration value is loaded by Set_Configuration software (block 605). An interface descriptor value is then read by software in response to a Get_interface command (block 606), and correct values are loaded by the software using Set_interface command (block 607). Device fixed addresses are then loaded to the USB device in response to software Set_address command and, when successful, an associated color flag will change to reflect plug-in status (block 608). Device register values are then reset in response to a Clear_feature command (block 609), and some special features like remote_wakeup or endpoint_halt capability are set_feature by software (block 610). As USB devices can be in many different classes, mass storage class as example, can be issued by different class-specific command like get_max_lun (block 611) to read in partition numbers supported by software, for unformatted devices, software will issue command to set default supported partition number to flash devices. A Get_status command is then used for checking if the programming is successful or not (block 612), and if successful, the color of individual icon on the test host monitor is changed to reflect the successfully programmed status (block 613).

Figure 10B:
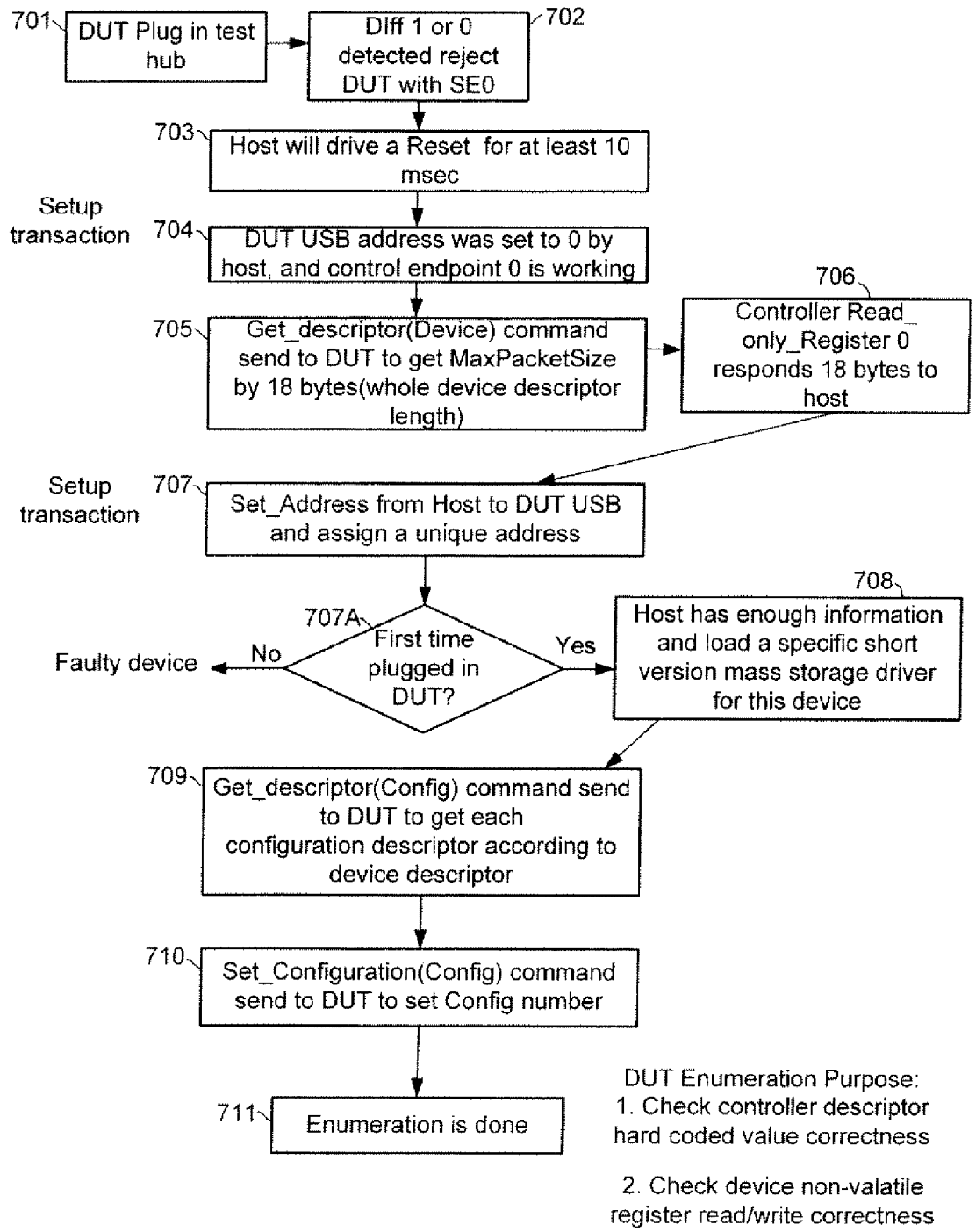
FIG. 10(B) is a flow diagram of a manufacture software algorithm for performing enumeration of a USB device according to another embodiment of the present invention.

FIG. 10(B) is a flow diagram of a manufacture software algorithm for performing enumeration of a USB DUT according to another embodiment of the present invention. The enumeration process begins when the DUT is plugged into the test hub, which in turn connects to the test host (e.g., a normal PC). Because the DUT is untested, either D+ or D− pins should have a 1.5K ohm pull up resister attach to it for full speed or low speed identification (block 702), if resistor values is not correct or not even connected, color flag will indicate it is a faulty device and should be rejected. Once the test host PC recognizes the DUT, the test host drives a Reset command to the DUT for at least 10 msec (block 703). If the DUT responds properly to the reset command and indicates a successful reset status, the test host addresses the DUT using the default control endpoint 0 (block 704). The test host PC then sends the Get_descriptor to the DUT controller hard-coded value to get MaxPacketSize parameter (block 705), and the DUT responds by sending its transfer packet size (block 706). The test host PC then sends the Set_Address to the DUT to assign a unique address. If all communication between the test host PC and the DUT are successful to this point (YES branch in block 707A), a short version mass storage driver is then sent to the DUT and is utilized for later communications (block 708). The test host then sends a Get_descriptor command to the DUT, and compares the device descriptor with default values already set by the program; any inconsistencies are reflected on the test host PC that alert the operator to reject the DUT (block 709). If the device descriptor value is correct, the test host PC sends a set_configuration command to set the configuration number (block 710), all necessary values are written into the DUT's flash memory, thus completing the enumeration (block 711).

Figure 11:
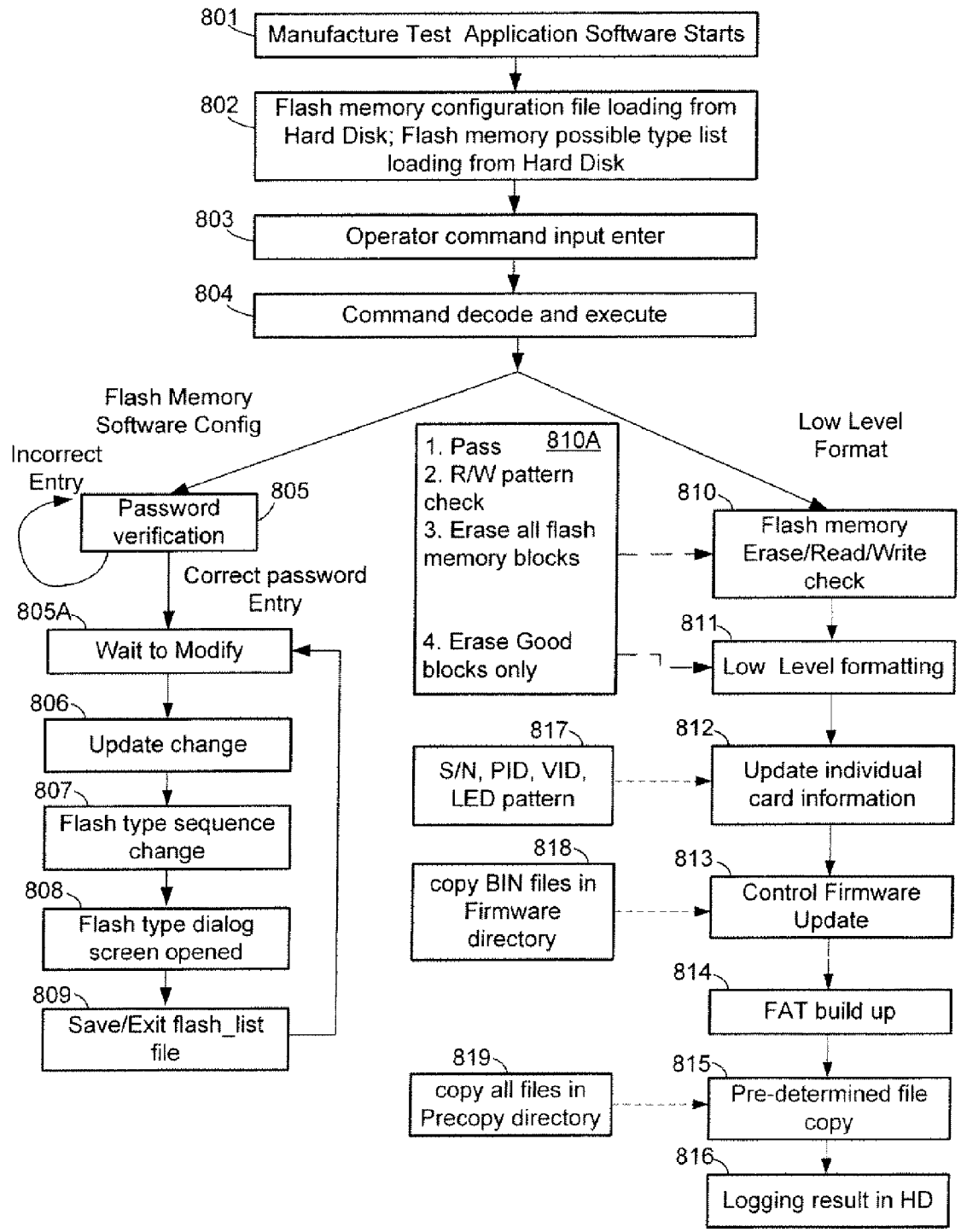
FIG. 11 is an operational flowchart showing the overall operation of the test host system with respect to USB devices according to another embodiment of the present invention.

FIG. 11 is an operational flowchart showing the overall operation of the test host system with respect to USB flash devices according to another embodiment of the present invention.

Referring to the top of FIG. 11, the operator starts up the test program (block 801), and all configuration and possible types of flash memories characteristic values are loaded into the program (block 802), those files are stored in the hard disk before loading the program. The program then waits for the operator key in correct parameters relating to the desired test (block 803), for example, the starting serial number of the selected DUT, or even a password to enable the running of this program. As shown below block 804, there are two major paths that command will be decoded and executed: low level formatting (on the rightside branch below block 804), and flash memory software configuration (on the leftside branch below block 804).

Referring the lower right portion of FIG. 11, low level formatting includes performing a flash memory erase/read/write check for all flash memory blocks (block 810), during which test read/write (R/W) patterns are written into the flash memory for all flash memory blocks (as shown in block 810A) because the flash memory may be previously used by other controller vendor and they generally have different algorithm to mark user bad blocks. Each R/W pattern is then read back and compared with expected values. Next, depending on either all the blocks are erased despite of the fact some blocks already marked bad. Low level formatting is then performed during which only good blocks are erased to all binary "1" values (block 811). However since flash memory might be dirty due to previous use, a total scan of bad block is possible through parameter scan type selection entry.

Individual information of each card is then written into the flash memory to updated individual card information (block 812). In one embodiment the information includes serial number, product ID, vendor ID, and LED light pattern (block 817). The control firmware is then written into the flash memory (block 813), for example, by copying Binary (image) files to flash memory (block 818). In addition, the firmware entry point address is recorded in the non-volatile registers of the flash memory. The File allocation table (FAT) of the flash device is then updated (block 814) according to customer request by software loading into pre-programmed file at OS entry point address stored in non-volatile registers. All initial files are then copied into the flash memory as requested by customers (block 815). These files may include auto-executing images or executable files for applications that are stored in a Precopy directory of the test host (block 819). The stored data is then read back from the DUT and stored in the test host hard drive for testing and future reference (block 816).

The left side of FIG. 11 includes an optional procedure for updating, e.g., flash timing stored in the dynamic control code. Initially, and in case some parameters are changed, for instance, due to a change in flash memory types in the test procedure, it may become necessary to, for example, verify the test operator password is correctly entered, and also to verify the updated correct flash timing is entered. However, if the process of FIG. 11 is used continuously to test the DUTs having the same flash devices, then there may be no need to perform the optional process shown on the left side of FIG. 11, since the program maintains correct parameters for testing. Referring to the left side of FIG. 11, the flash memory software configuration, which is used after low level formatting is performed, begins with a check of a pre-stored password entered by an operator (block 805). Flash memory software configuration is restricted to authorized personnel (e.g., the device manufacturer), and unauthorized persons not having the password are denied access to the program. Once the correct password is verified, the software will wait for operator enter the commands (block 805A). Flash memory is produced by many different vendors, and has many different parameter settings as the memory capacity from each vendor continually increases. The first step of the software configuration is to identify the particular flash memory used in the target DUT (block 806). To make the configuration program robust, a sequence of flash memory types is pre-programmed for flexibility purposes. The operator can update this sequence (block 807), and all update information displayed on the device monitor for easy correction (block 808), and then changes are stored into files for future reference (block 809).

Figure 12A:
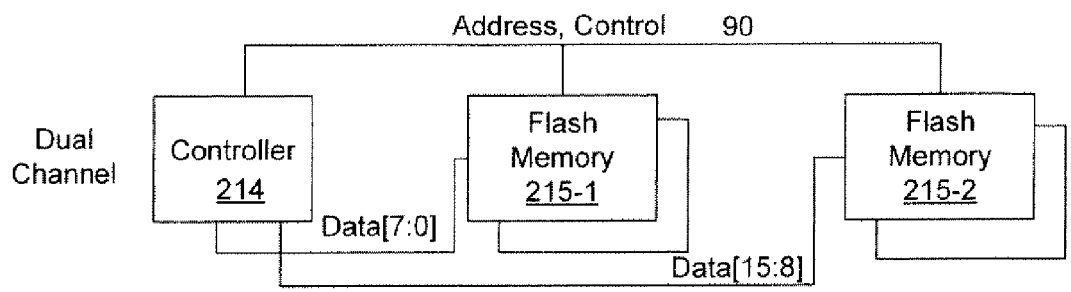
FIGS. 12(A) and 12(B) are simplified diagrams showing dual channel and single channel defect flash chip operations, respectively, according to another embodiment of the present invention.
Figure 12B:
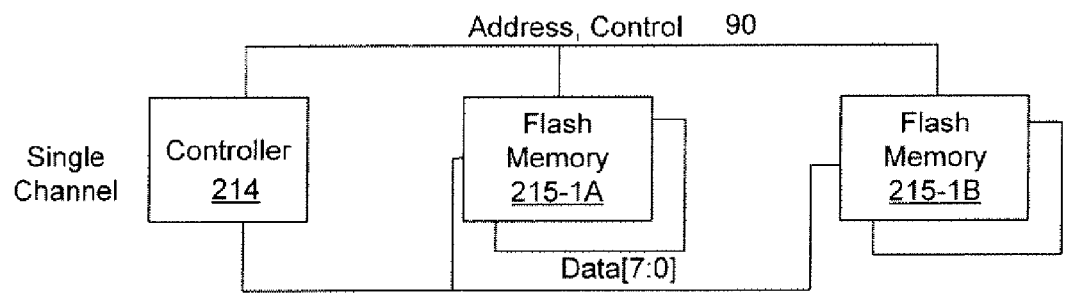
Figure 13:
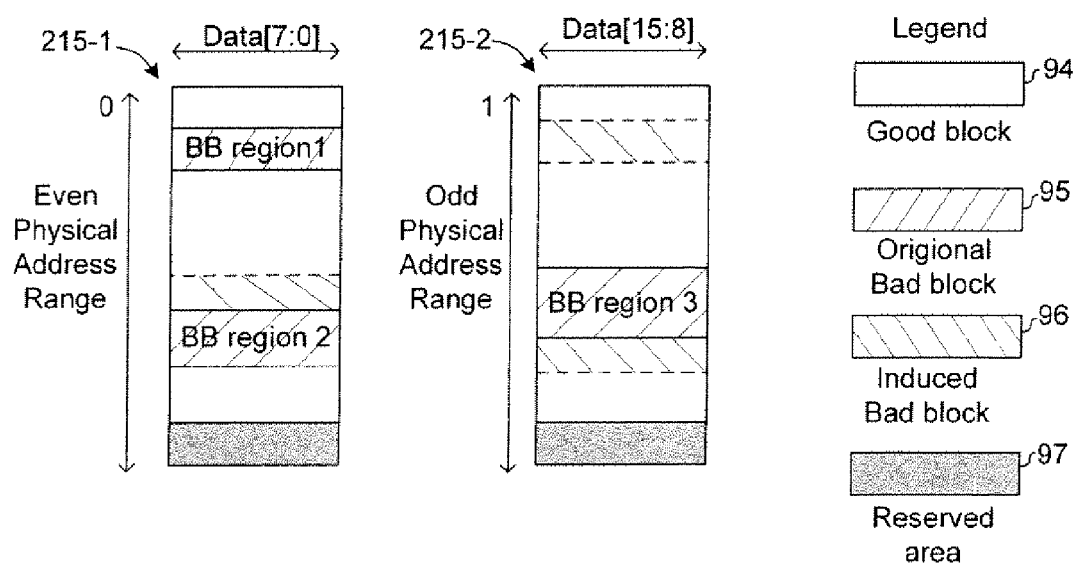
FIGS. 13 and 14 are block diagrams depicting the flash memory configurations associated with the dual channel and single channel defect flash chip operations of FIGS. 12(A) and 12(B), respectively.
Figure 14:
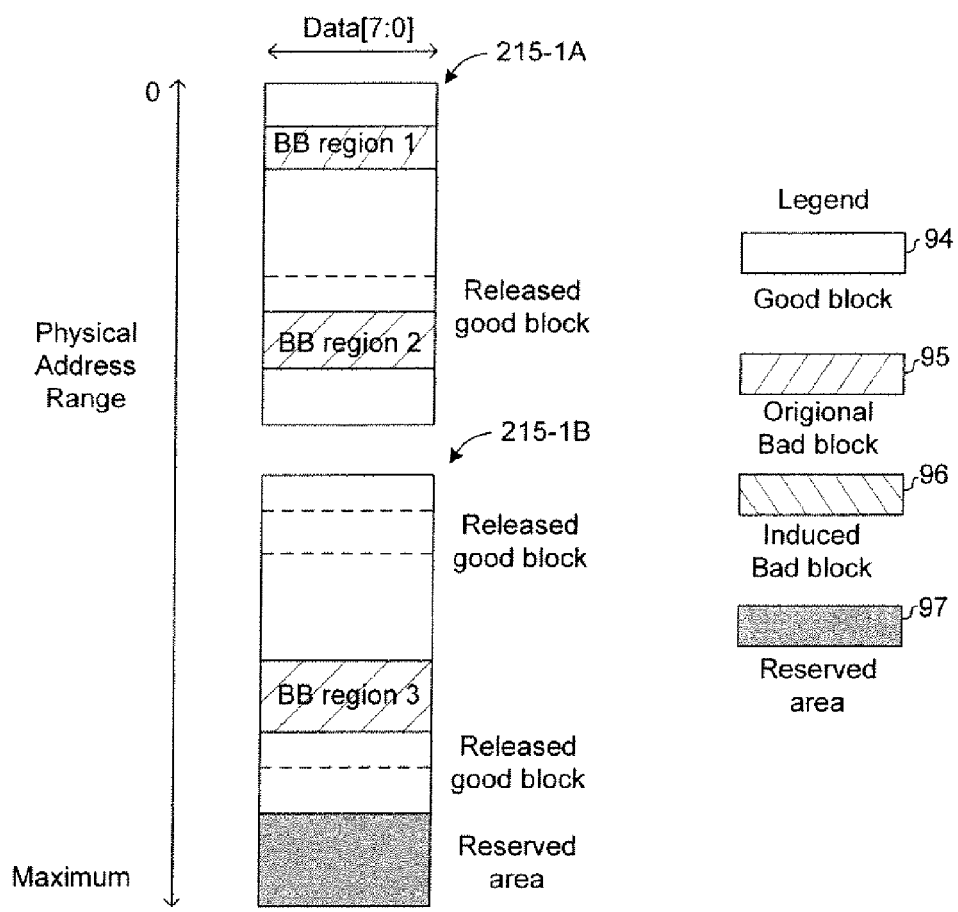

FIGS. 12(A) and 12(B) are simplified diagrams showing dual channel and single channel defect flash chip operations, respectively, and FIGS. 13 and 14 are block diagrams depicting the associated flash memory configuration. When an even number of flash chips are integrated in the device, two options can be applied: single channel and dual channel operation.

In dual channel operation, which is shown in FIG. 12(A), the data buss from controller 214 is separated into two parts: data lines data[7:0] are connected to flash memory chip set 215-1, and data lines data[15:8] are connected to flash memory chip set 215-2, where both memory share the same controller address and control bus 90. An advantage of the dual channel operation shown in FIG. 12(A) is speed performance, since data bus access is doubled. A disadvantage of dual channel operation is shown in 13, where the bad block (BB) regions on either side of flash chip 215-1 are normally not symmetric, but since address and control bus connected together, symmetric operation cause induce bad blocks and reduce usable good block capacity. Addresses for these two sets of flash chips are also staggered to reflect data bus connection.

FIG. 12(B) depicts single channel operation, wherein both memory sets 215-1A and 215-1B are connected to data bus lines data[7:0]. In single channel operation, the physical address ranges are sequential, as shown in FIG. 14, and do not have induced bad block situation of the dual channel operation depicted in FIG. 13. Accordingly, the usable capacity of single channel operation is increased compared to dual channel operation, and the reserved area is enlarged to ease tension caused by bad block reservation purpose. However, a disadvantage of single channel operation is operating speed, which is lower because only eight bus lines data[7:0] are used, instead of the sixteen data bus lines utilized in dual channel operation. However, because of higher bad block ratio flash chips, as introduced by recent mass volume flash production, single channel operation is preferred.

According to one embodiment, all parameters can be changed by an operator, and are divided into two categories: device information and configuration information, as described in the above-incorporated by reference U.S. patent application Ser. No. 11/626,347 (herein after the '347 application).

The device information stored in each device 10B is depicted in the blocks (fields) located in the upper section of FIG. 10. As shown in FIG. 14 of the '347 application, block 905 includes maximum device capacity (e.g., 256 MB). Block 901 includes effective device capacity as established by the device manufacturer (e.g., for a device having a 256 MB maximum capacity, the effective device capacity may be set at 250 MB, with 6 MB reserved for bad block management). Block 902 includes the flash memory part used, for example, the manufacturer's part number established by Samsung or Infineon (e.g., K9K8G08U0M for Samsung 1 Gbyte flash memory device). Block 903 includes the flash memory ID information read through flash initial command address 90H, and is used to determine whether the device flash memory is correct or not, because some flash memory have different timing properties but sharing same ID code. This feature is provided to facilitate adjustment of the flash-id in order to allow the end customer to easily enter different NAND flash timing specifications. Block 904 includes the number of flash chips used in the particular device 10B. Blocks 905A, 905B and 905C store various passwords that used during formatting/testing and subsequent modification of the USB devices. Because the operator passwords are very crucial for controlling manufacturing process, password modify (block 905B) and confirm (block 905C) are key to the MIS of plant to control official access of the test procedure in order to maintain test quality and responsibilities.

The configuration information of device 10B is depicted in the blocks located below the device information in FIG. 10. Block 906 includes production line number information or operator ID number for production control information. Block 907 includes pre-scan flash type information, including the different ways to scan (erase/write/read) the flash memory, a skip back block check value (block 907A), a full scan of all blocks value (block 907B), a scan only the good blocks and bypass those bad blocks marked by manufacture plant (block 907C). For those devices implementing used flash memory parts, a full scan is recommended that rebuilds the bad_block_list (block 907B). Block 908 includes the general serial number (S/N), block 908A includes an initial S/N of this particular device, with block 908B including updated serial number information, and whether the serial number is generated using a predetermined sequence, or is generated randomly (i.e., the serial numbers can be generated incremently or decremently, and also can be randomly generated as operator entered (e.g., the software calls a random number generator and a seed value (e.g., host tester time/date) to make sure its randomness)—the basic principle is that the serial number needs to be different for every device according to USB specifications. Block 909 includes device current specifications and limitations (i.e., maximum current consumption of the device), where device currents exceeding this number are an indication of device failure (e.g., 500 ma is maximum specified current listed in USB devices). Block 910 includes a time interval and brightness value for the device's LED light under various conditions, and is used to notify the operator of operational status (for example, when a test is stalled (hanging), or successful, or the device is idling or in use). Block 917 includes the correct controller vendor/product ID numbers, and is used to authorize the testing/formatting process (i.e., devices having non-matching vendor/product numbers stored in this field are rejected at the beginning of the testing/formatting program). Block 911 includes vendor name and product text coding information, and block 912A includes product string name and revision information. Block 913 stores a statistical value indicating a number of pass/fail tests associated devices tested on the test production line (block 913A is used to reset this value), and block 915 includes a maximum test number of the test production line since testing is initiated by a particular operator—this information is used to provide an operator with useful statistical information. Block 919 includes a maximum reserved ratio of the flash memory (i.e., the amount of reserved memory that is required for bad block allocations for future operation purposes). Block 921 contains a write protection toggle (on or off). Block 920A includes a volume partition number that is recorded for flash memory, where storage can be partitioned into many different areas for data categorization purposes. Block 920 stores the beginning volume label, for example D: (E:, F: follows). Finally, Block 920 includes BIN numbers of each device corresponding to each slot, and this information is used to reveal error codes when a device fails the testing/formatting process.

Multi-level-cell (MLC) flash memory is becoming more popular since MLC flash memory can store a higher density than single-level cell flash for the same cell size. According to certain embodiments of the invention, the techniques described above can be applied to mass production or manufacturing testing for MLC flash memory. Further detailed information regarding MLC flash memory can be found in the above incorporated-by-reference U.S. patent application Ser. No. 11/737,336, which has been assigned to a common assignee of the present application.

Figure 15:
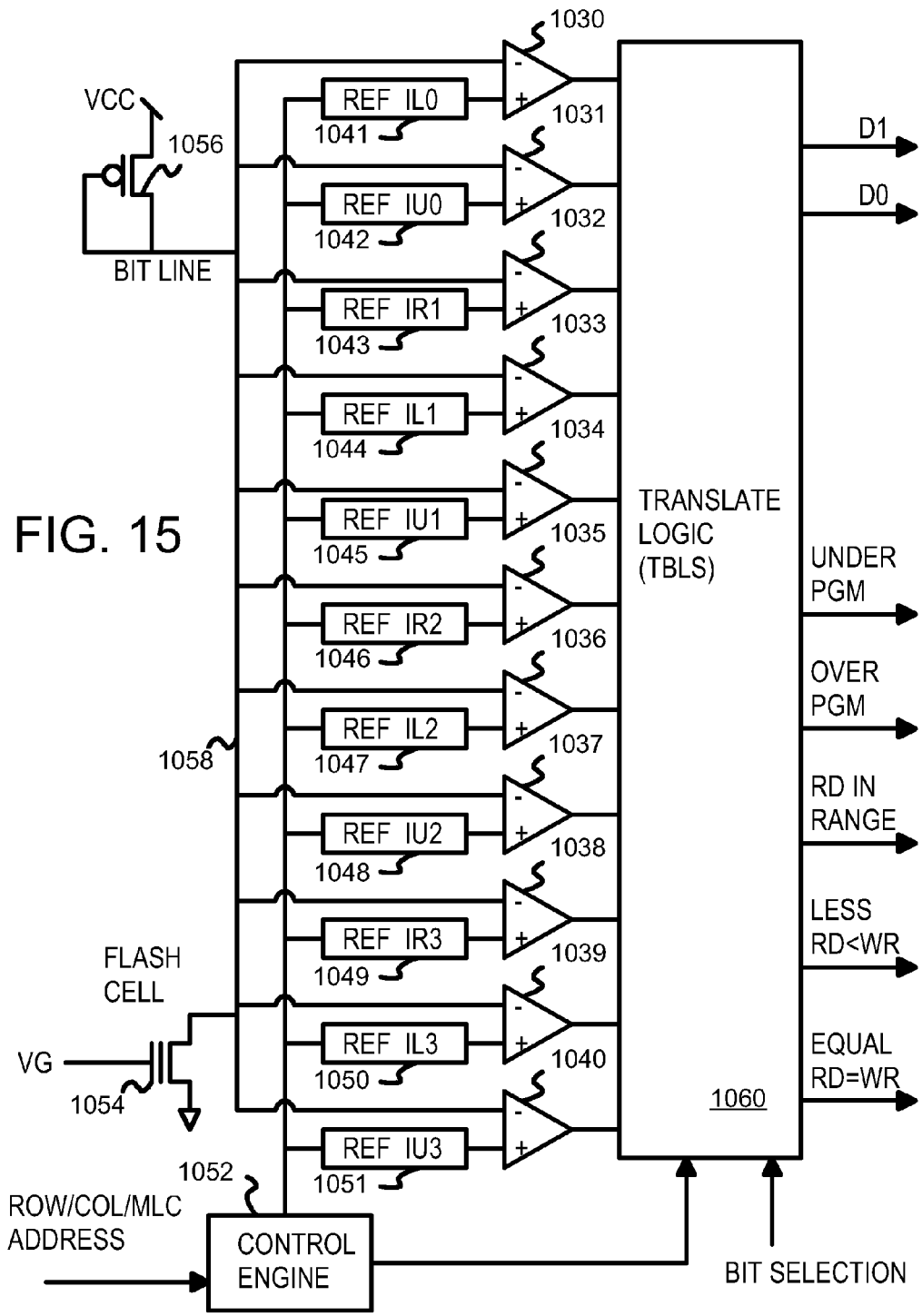
FIG. 15 shows multi-level voltage sensing of a MLC cell according to one embodiment of the invention.

FIG. 15 shows multi-level voltage sensing of a MLC cell according to one embodiment of the invention. The system as shown in FIG. 15 may be used with the techniques described above. A flash-memory chip has an array of flash cells arranged in rows and columns that are selectable by a row portion of an address and a column portion of an address. The address may be generated internally by a sequencer from a block or page address that is input to the flash-memory chip. A third part of the address effectively selects the bit within a MLC cell.

Referring to FIG. 15, control engine 1052 receives the address and selects one or more flash cells at an intersection of the selected row and column. The MLC address is sent to translation logic 1060, which generates multiple bits per cell. One or more of the bits per cell output by translation logic

1060 is selected by the MLC address from control engine 1052. Typically, 8 or more flash cells are read and sensed in parallel on 8 or more bit lines by 8 or more copies of translation logic 1060, but only bit slice is shown.

Bit line 1058 is pre-charged by pull-up transistor 1056. Selected flash cell 1054 is at the intersection of the selected row and column, and has a gate voltage VG applied that may turn on its channel, depending on the state of selected flash cell 1054. The different states that may be programmed into selected flash cell 1054 each store a different amount of charge on the floating gate of selected flash cell 1054, and each state thus causes a different amount of channel current to pass through selected flash cell 1054, from bit line 1058 to ground. The variable current through selected flash cell 1054, combined with the pull-up current from pull-up transistor 1056 forms a voltage divider. The voltage on bit line 1058 thus varies with the state that was programmed into selected flash cell 1054.

Bit line 1058 is applied to the inverting inputs of comparators 1030-1040. The non-inverting inputs to comparators 1030-1040 are reference voltages that are generated by reference-current generators 1041-1051. The voltages generated by reference-current generators 1041-1051 are controlled by control engine 1052 and correspond to the reference, upper, and lower state voltages for sensing the four cell states.

The voltages generated by reference-voltage generators 1041-1051 are successively higher voltages, so that the bit-line voltage exceeds the lower references, clearing the outputs of the lower-state comparators, while the bit-line voltage does not exceed the higher references, causing the outputs of higher-state references to remain set. The location of the transition from comparators 30-40 outputting a 0 to comparators 1030-1040 outputting a 1 indicates the sensed voltage of bit line 1058. For example, when comparators 1030-1037 output a 0 and comparators 38-40 output a 1, the transition from 0 to 1 occurs between comparators 1037, 1038. Voltage IU2 is applied to comparator 1037 while voltage IR3 is applied to comparator 1038. The voltage of bit line 1038 is between IU2 and IR3, which is read as state 3 (01).

Translation logic 1060 receives 11 comparator outputs from comparators 1030-1040 and detects the location of the transition from 0 to 1. Translation logic 1060 generates several outputs, such as read data D1, D0, which are 2 binary bits that encode the state read from the cell. A 4-bit MLC would have a translation logic that outputs four read-data bits D3, D2, D1, D0.

Other outputs from translation logic 1060 are useful during cell programming. As the cell is slowly charged or discharged during programmed, the voltage on bit line 1058 changes. Programming stops once the desired data is read from data-read outputs D1, D0. However, to ensure a sufficient noise margin, the bit-line voltage should be between the upper and lower state voltages, such as VL2, VU2, rather than just between the adjacent read-reference voltages, such as VR2, VR3. The under-program output is activated when the bit-line voltage is between VR2 and VL2, while the over-program output is activated when the bit-line voltage is between VU2 and VR3. When the bit-lien voltage is between the target of VL2, VU2, neither the under-program nor the over-program outputs are activated. The read-in-range output can then be activated.

The less and equal outputs can also be activated to indicate when a desired cell value has been reached. Bit selection inputs can supply the write data to translation logic 1060 to allow the less and equal outputs to target one logic state. Translation logic 1060 may be implemented as a truth table.

Reference-current generators 1041-1051 can generate reference currents or reference voltages when comparators 1030-1040 are current comparators, since the reference current sent through a resistance generates a reference voltage.

Figure 16:
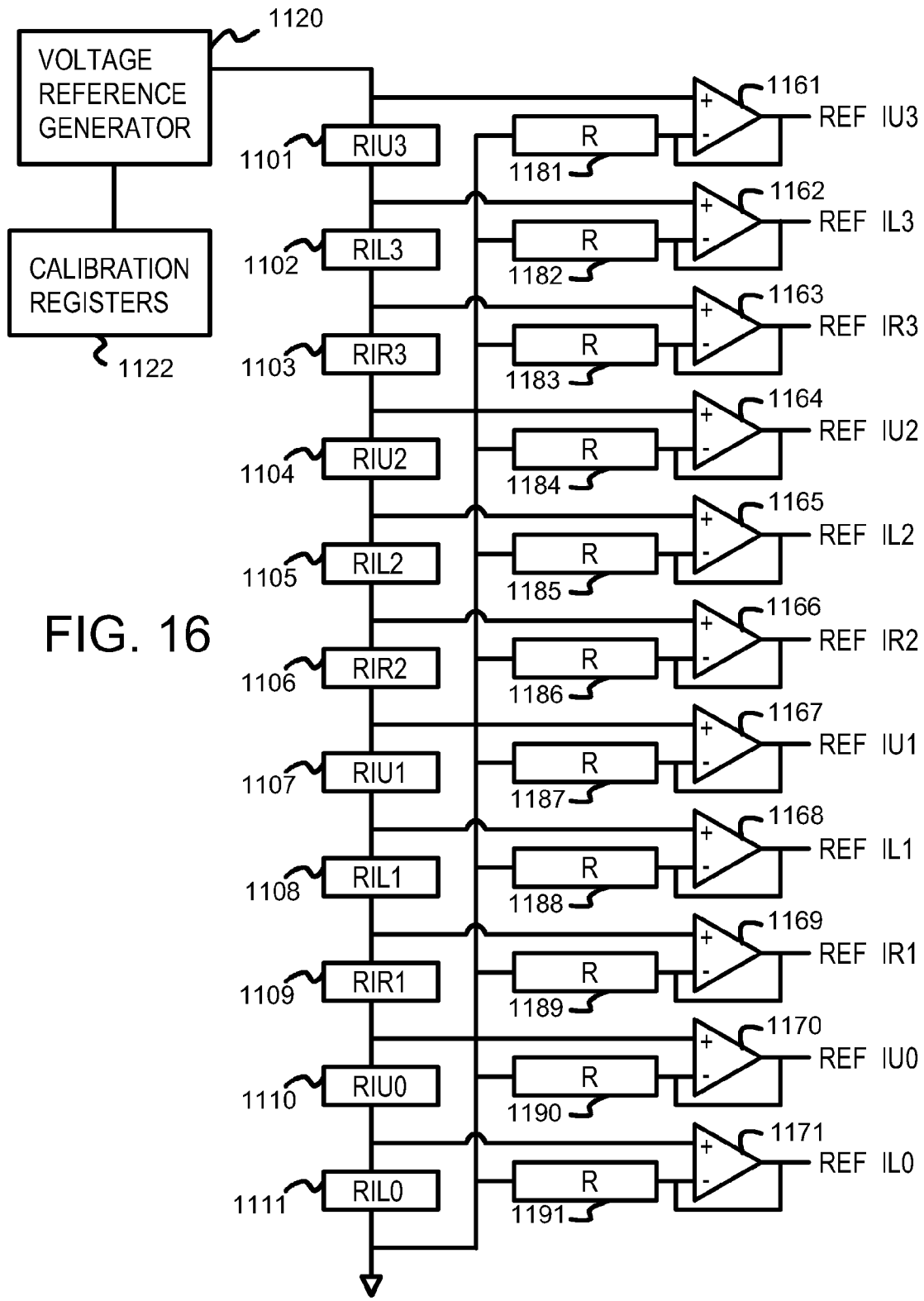
FIG. 16 shows a programmable series of reference generators and comparators according to one embodiment of the invention.

FIG. 16 shows a programmable series of reference generators and operational amplifiers. Voltage reference generator 1120 generates an upper reference voltage that is applied to upper operational amplifier 1161 and to upper resistor 1101. Calibration registers 1122 can be programmed to different values to adjust the value of the upper reference voltage generated by voltage reference generator 1120.

The upper reference voltage is applied to a chain of resistors 1101-1111, forming a voltage divider to ground. The resistance values of each resistor 1101-1111 can be the same, so that the voltage difference between the upper reference voltage and ground can be split into 11 equal voltage segments, producing 11 divider voltages. Alternately, each resistor 1101-1111 can have a different programmable value to provide more voltage control.

Each of the divider voltages from resistors 1101-1111 is applied to the non-inverting (+) input of one of operational amplifiers 1161-1171. The output and inverting (−) input of each of operational amplifiers 1161-1171 are connected together for very high gain. The inverting inputs are connected to ground through grounding resistors 1181-1191, which can all have the same resistance values. Each of operational amplifiers 1161-1171 produces a reference voltage that is equal to the divider voltage applied to its non-inverting input. Thus 11 reference voltages are produced that have voltage values that steadily increase. These reference currents correspond to those produced by reference-voltage generators 1041-1051 of FIG. 15.

When data errors occur during reading of flash cells, the reference voltages that are compared to the bit-line voltage can be adjusted to try to recover the data in the flash cell. For example, leakage may have reduced the charge stored in the floating gate of the flash cell, causing too much current to be drawn through the channel of selected flash cell 1054 (FIG. 15). The bit-line voltage is thus lowered. Calibration registers 1122 can be re-programmed to reduced the upper reference voltage that voltage reference generator 1120 creates, lowering all of the reference voltages applied to operational amplifiers 1161-1171. The bit-line voltage may now fall within the correct reference values, allowing the data to be read without exceeding the maximum allowable ECC errors.

Calibration registers 1122 could be gradually changed until the data read has no errors. The ECC bytes can be used to detect errors, so when the ECC checker reports few or no errors, then the reference-voltage adjustment can stop and the data read. The block can be relocated.

Figure 17:
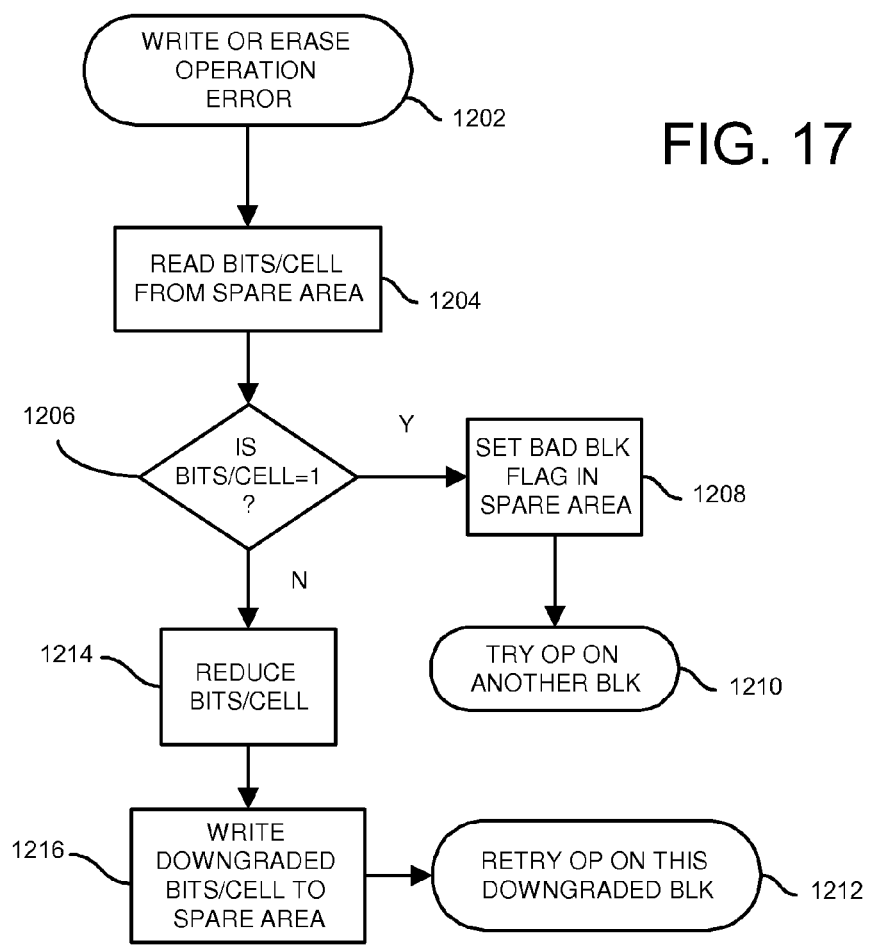
FIG. 17 is a flowchart of MLC downgrading during write or erase operations according to one embodiment of the invention.

FIG. 17 is a flowchart of MLC downgrading during write or erase operations. When an error occurs during a write or erase operation, step 1202, when the ECC checker flagged that too many errors occurred during reading, or during low-activity periods, this downgrading routine is activated. The bits-per-cell indicator is read from the spare area for the block or from the special block, step 1204. When the bits-per-cell indicator is already 1 bit per cell, step 1206, the cell has been previously downgraded to the minimum density, yet errors are still occurring. Downgrading was unsuccessful. The block is marked as a bad block by clearing bits in the bad block byte in the spare area, step 1208. This block is now removed from future usage. Another block can be chosen for this operation if necessary, step 1210.

When the block has its bits-per-cell indicator set to 2 or more bits per cell, step 1206, then the block can be downgraded. The number of bits/cell read from the bits-per-cell indicator in the spare areas of the block is reduced to the next-lower level, such as from 4 bits/cell to 3 bits/cell, step 1214. The size of the block may decrease, or the arrangement of block may change to accommodate the reduced number of bits per cell. For example, the block size can be cut in half on a downgrade from 4 bits/cell to 3 bits/cell. Pages in the block can have half the number of logical sectors after the downgrade.

The reduced bits/cell is written to the bits-per-cell indicator for the downgraded block, step 1216. The write or erase operation can then be re-executed on the downgraded block, step 1212. When the downgrade routine was activated by an excess of read errors, the block can be erased once the data has been read and relocate to another block.

Figure 18:
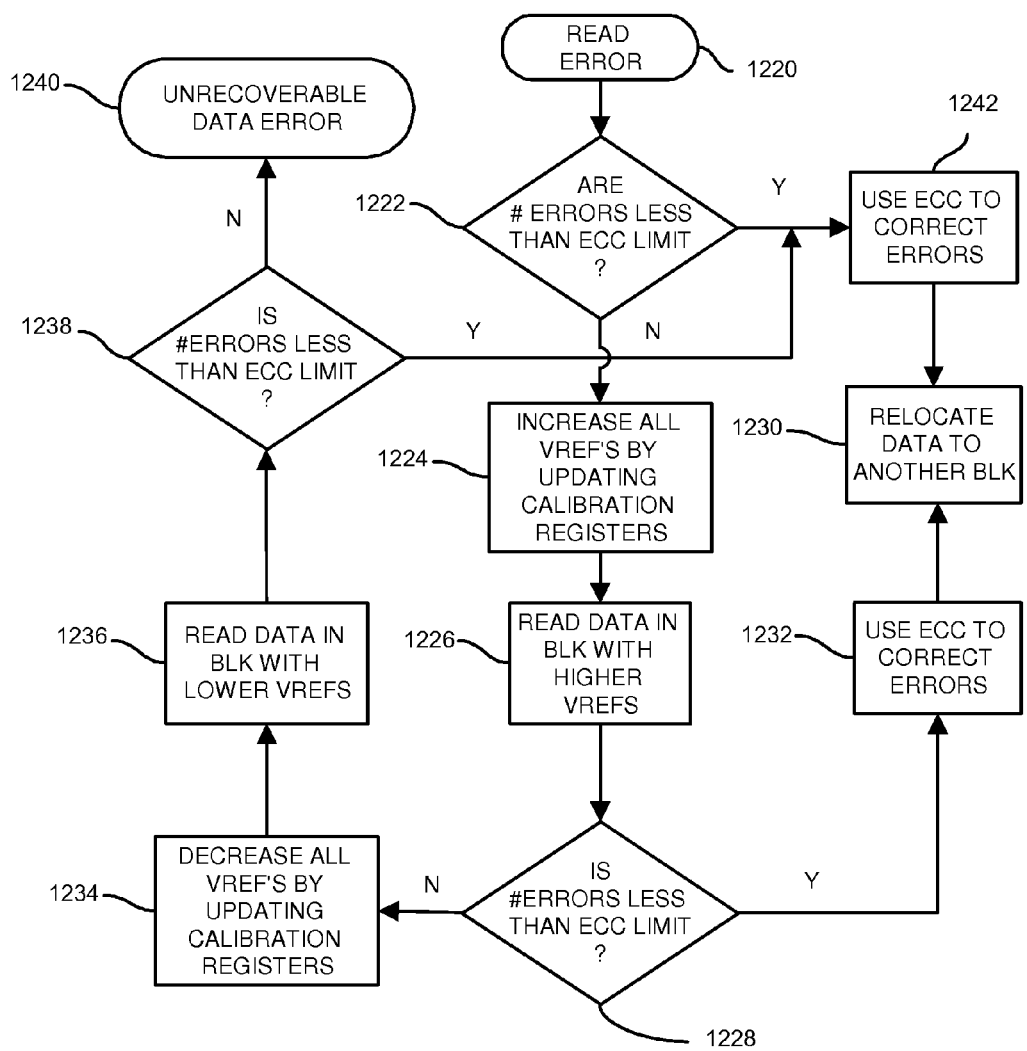
FIG. 18 is a flowchart of read error correction using ECC bytes and by adjusting voltage references according to one embodiment of the invention.

FIG. 18 is a flowchart of read error correction using ECC bytes and by adjusting voltage references. Read errors can be detected by checking the data read to the ECC bytes. For example, a non-zero syndrome generated from the data and the ECC bytes can signal that an error occurred, and may signal the bit-location of the error and the correction for the error.

When a read error is detected, step 1220, this routine is activated. When the number and location of the errors allows the errors to be corrected using the ECC bytes, step 1222, then the ECC bytes can be used to correct the read errors, step 1242. The data can be re-located to another block, step 1230, and the block erased and optionally downgraded with the bits-per-cell indicator.

The number of fixable errors can be a fixed number, such as an ECC limit, or can vary with the locations of the errors, such as any 3 bits in a byte, or any string of 4 bad bits. The ECC limit could also be arbitrarily set, or could be set to a lower value that is correctable, but still undesirable and indicative of a block that should be downgraded even though its errors were correctable.

When the number of errors exceeds the ECC limit, step 1222, then the ECC mechanism cannot correct all the errors. Data may be lost. An attempt is made to recover the lost data by adjusting the voltage reference levels that are compared to the bit-line voltage. Calibration registers 1122 are written to with new values to cause voltage reference generator 1120 to generate a higher upper reference voltage, step 1224. This causes all reference voltages in the chain to be increased slightly. The data in the block is read using these higher references, step 1226. The data can then be checked for errors using the ECC bytes. When the number of errors decreases to below the ECC limit, step 1228, raising the references was successful. The lost data was recovered. The ECC bytes can be used to correct all the remaining errors, step 1232, and the data re-located to another block, step 1230. This block can be downgraded by calling the downgrade routine of FIG. 17.

Increasing the reference voltages is sometimes successful when the amount of negative charge stored in the floating gate of flash cells increases. Negative charge can increase due to cell disturbance from reading or programming adjacent cells. The excess negative charge requires a higher gate voltage to compensate, so raising references can be effective.

When the number of errors is still above the ECC limit, step 1228, then raising the reference voltages was not successful. The references could be raised further by repeating steps 224-228 (not shown) some number of times.

When raising the references fails to recover data, the references can be lowered. Calibration registers 1122 (FIG. 16) are written with new values to cause voltage reference generator 1120 to generate a lower upper reference voltage, step 1234. This causes all reference voltages in the chain to be decreased slightly. The data in the block is read using these lower references, step 1236. The data can then be checked for errors using the ECC bytes. When the number of errors decreases to below the ECC limit, step 1238, lowering the references was successful. The lost data was recovered. The ECC bytes can be used to correct all the remaining errors, step 1242, and the data re-located to another block, step 1230. This block can be downgraded by calling the downgrade routine of FIG. 17.

Decreasing the reference voltages is sometimes successful when the amount of negative charge stored in the floating gate of flash cells decreases. Leakage can cause negative charge to decrease. The reduced negative charge causes extra channel current to flow through the selected flash cell in response to a fixed gate voltage. The extra channel current causes the bit-line voltage to be lower than usual. Thus the references must be lowered to compensate for the cell leakage.

When the number of errors is still above the ECC limit, step 1238, then lowering the reference voltages was not successful. The references could be lowered further by repeating steps 1234-1238 (not shown) some number of times. However, when the number of data errors does not fall below the ECC limit, the data is lost. An unrecoverable data error is signaled, step 1240. Further detailed information of the above processes can be found in the above incorporated-by-reference U.S. patent application Ser. No. 11/737,336.

According to certain embodiments, the MLC flash memory may be implemented on a USB device having a dual personality USB plug that support multiple communication interfaces, also referred to as dual personality.

Figure 19A:
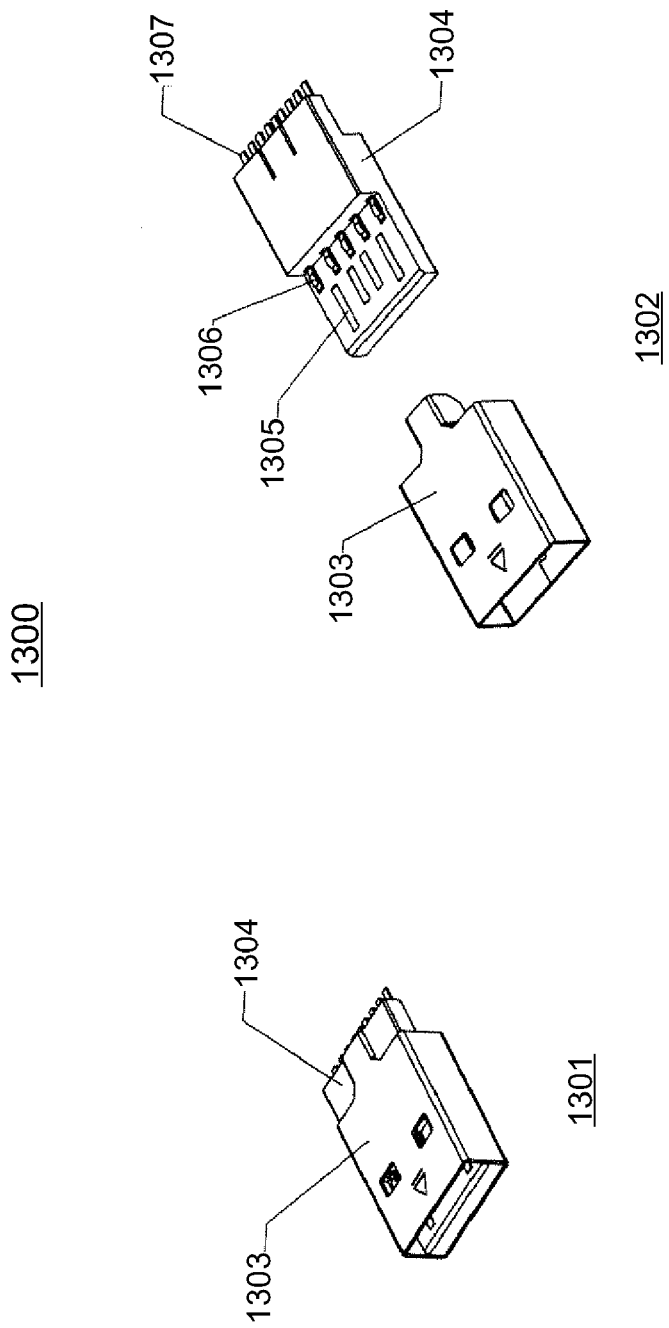
FIGS. 19A-19C are block diagrams illustrating an extended USB device configuration according to one embodiment of the invention.
Figure 19B:
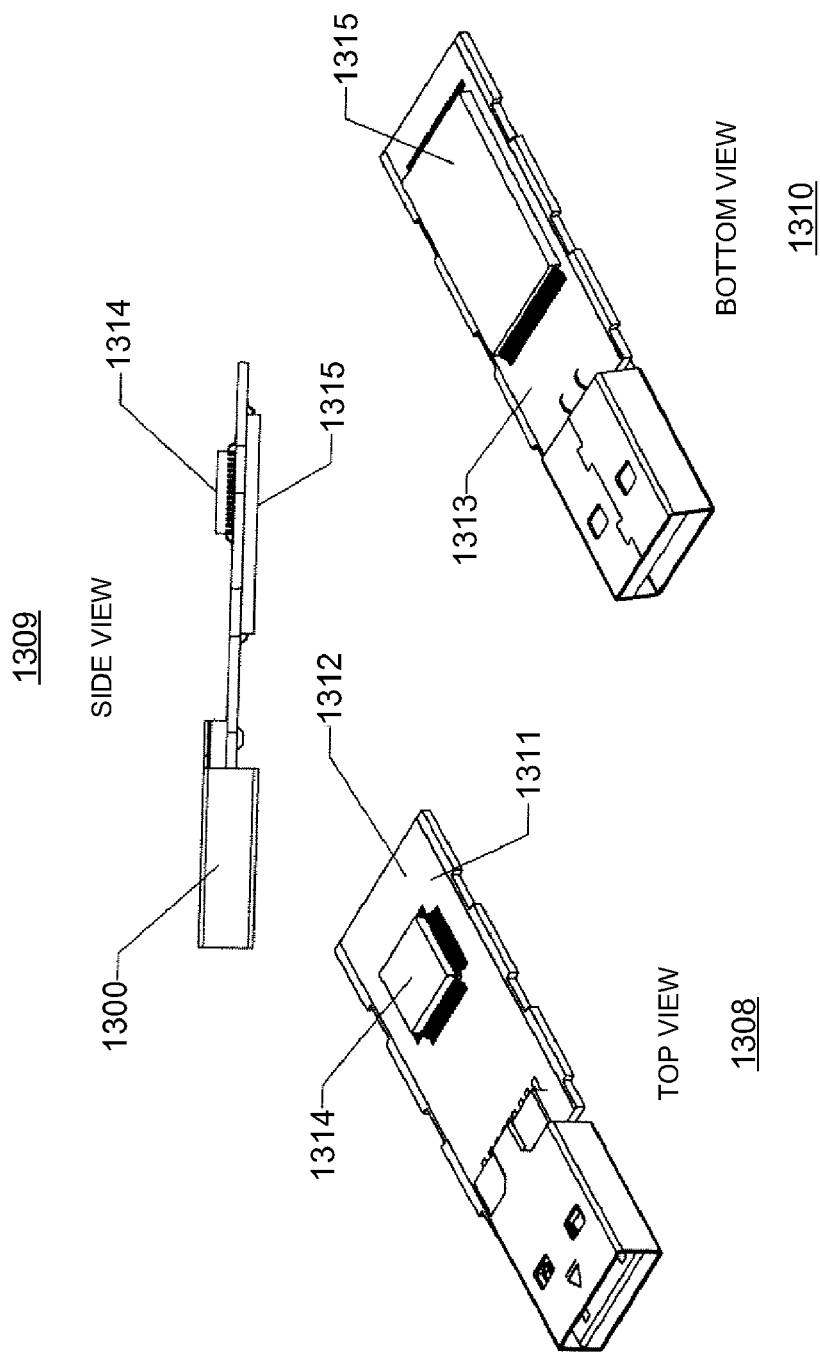
Figure 19C:
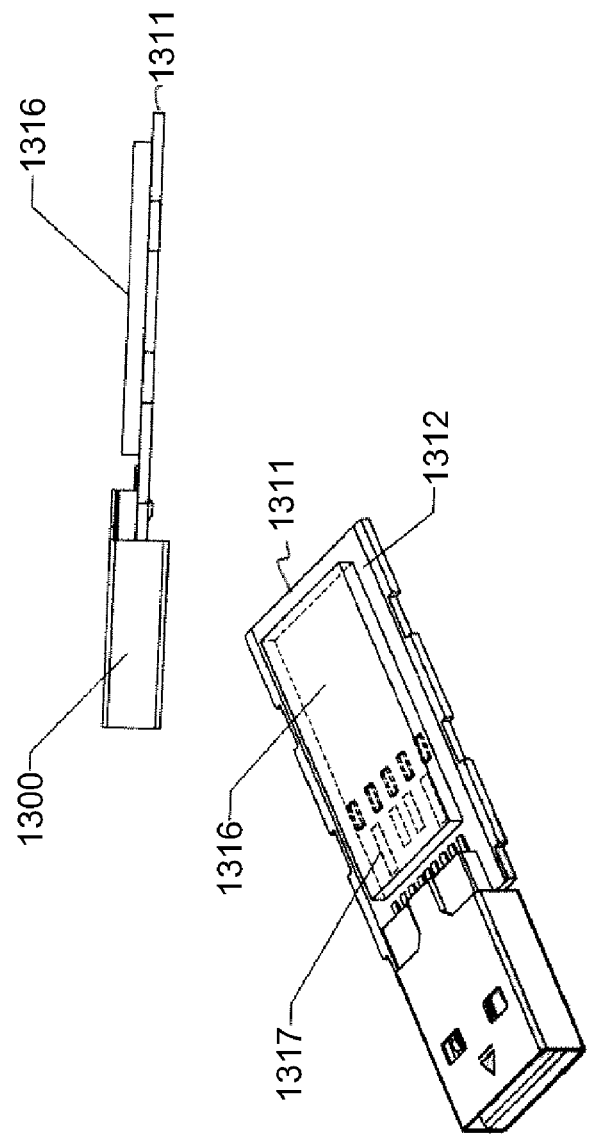

FIGS. 19A-19C are diagrams illustrating perspective views of a USB extended plug having multiple personalities according to one embodiment of the invention. Referring to FIG. 19A, a USB extended plug is showed in a complete view 1301 and an exploded view 1302. In one embodiment, USB extended plug 400 includes a casing or housing 1303 and a USB connector substrate 1304, where the connector substrate 1304 can be plugged into the casing 1303. Casing 1303 may be made of metal, also referred to as a metal case herein. Connector substrate 1304 includes a first end having multiple electrical contact fingers or tabs 1305 and a second end having multiple electrical contact pins 1307. In a particular embodiment, pins 1307 include 9 pins. Connector substrate 1304 further includes one or more springs 1306 which may be used to provide pressure to another USB connector to have physical contact with contact fingers 1305 when the other USB connector is inserted into an opening of the extended USB plug.

In one embodiment, contact fingers 1305 may be disposed on a top surface of connector substrate 1304 and additional contact fingers (not shown) may be disposed on a bottom surface of connector substrate 1304. For example, contact fingers 1305 may be compatible with standard USB specification while the additional contact fingers may be designed compatible with other interfaces such as PCI Express or IEEE 1349 specifications. As a result, extended USB plug 1300 may be used for multiple different communication interfaces, also referred to as dual personalities. Further detailed information regarding the extended USB plug having dual personalities can be found in certain above-referenced applications and/or patents, such as, for example, U.S. Pat. No. 7,021,971 and U.S. patent application Ser. No. 11/864,696, which have been incorporated by reference.

Referring now to FIG. 19B, where extended USB plug 1300 may be attached to a PCBA having a memory device and a memory controller for controlling the memory device. As shown in FIG. 19B as top view 1308, side view 1309, and bottom view 1310, extended USB plug 1300 may be attached to PCB substrate 1311, for example, by soldering pins 1307 on the PCB substrate 1311. In addition, a memory device such as flash memory device may be disposed on a surface of the PCB substrate 1311 and a memory controller such as a flash controller may be disposed on the other surface of the PCB substrate 1311. In this example, memory device 1315 is disposed on a bottom surface 1313 of PCB substrate 1311 and memory controller 1314 is disposed on a top surface 1312 of PCB substrate 1311. In one embodiment, memory device 1315 may be an MLC compatible memory IC and controller 1314 may be an MLC compatible memory controller IC.

According to a further embodiment, techniques as described with respect to FIGS. 19A-19B may also be applied to a configuration where a flash memory and a flash controller are integrated into a single package such as a chip on board (COB) package as shown in FIG. 19C. Referring to FIG. 19C, a COB package 1316, which may an MLC package, may be disposed on a surface such as a top surface 1312 of PCB substrate 1311, where the COB package 1316 may be attached (e.g., soldered) via one or more contact fingers 1317 disposed on a surface of COB 1316.

Figure 20A:
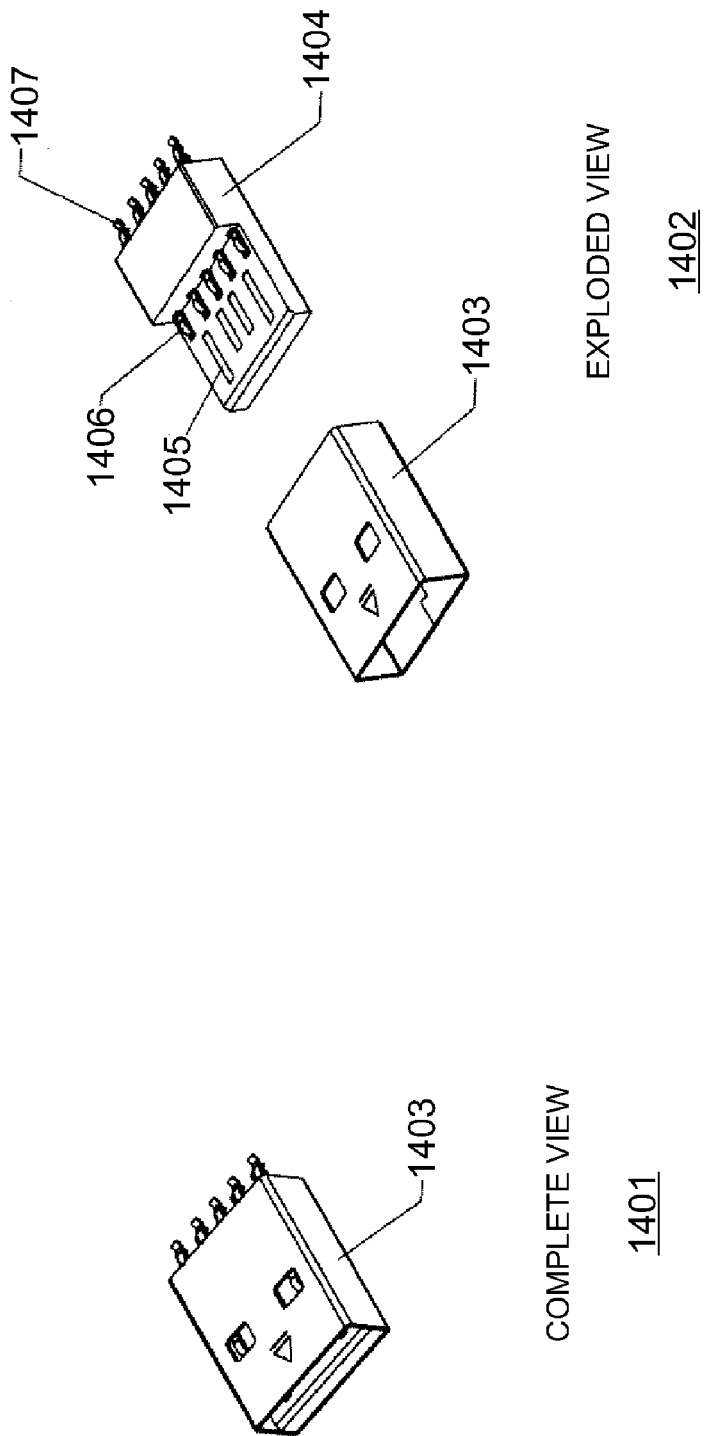
FIGS. 20A-20C are block diagrams illustrating an extended USB device configuration according to one embodiment of the invention.
Figure 20B:
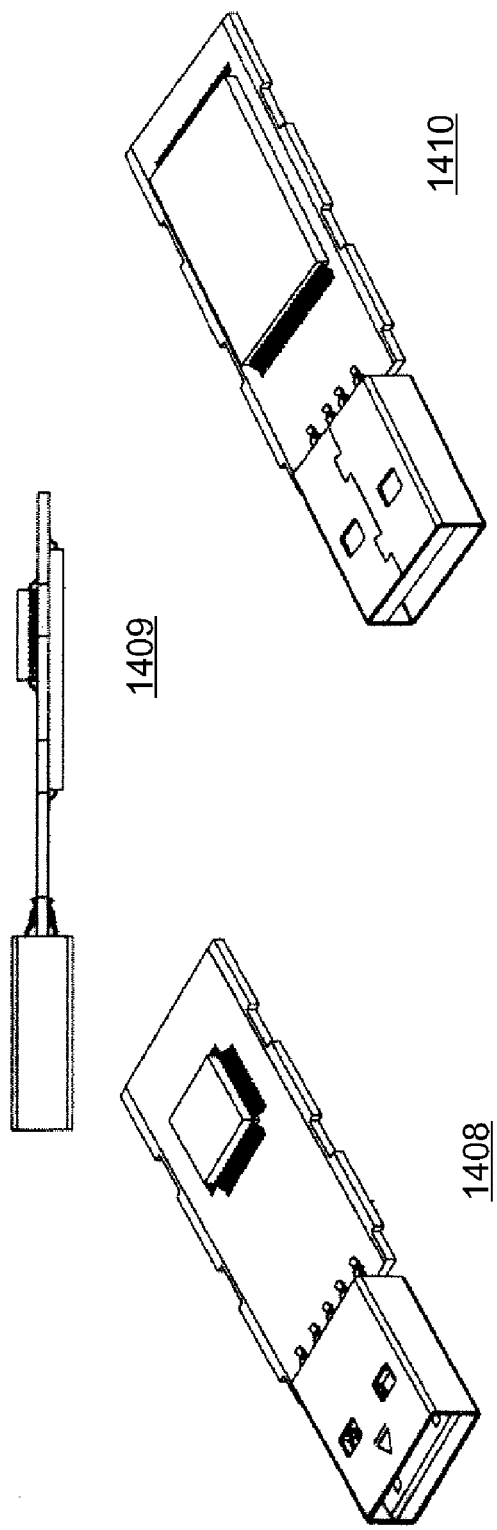

FIGS. 20A and 20B are diagrams illustrating perspective views of a USB extended plug having multiple personalities according to another embodiment of the invention. Referring to FIG. 20A, a USB extended plug is showed in a complete view 1401 and an exploded view 1402. In one embodiment, similar to extended USB plug 1300 of FIGS. 19A-19C, extended USB plug 1400 includes a casing or housing 1403 and a USB connector substrate 1404, where the connector substrate 1404 can be plugged into the casing 1403. Casing 1403 may be made of metal, also referred to as a metal case herein. Connector substrate 1404 includes a first end having multiple electrical contact fingers or tabs 1405 and a second end having multiple electrical contact pins 1407. In one embodiment, pins 1407 include multiple rows of pins, each having multiple pins. In a particular embodiment, pins 1407 include a first row and a second row, where the first row includes 5 pins and the second row includes 4 pins. Connector substrate 1404 further includes one or more springs 1406 which may be used to provide pressure to another USB connector to have physical contact with contact fingers 1405 when the other USB connector is inserted into an opening of the extended USB plug.

In one embodiment, similar to extended USB plug 1300, contact fingers 1405 may be disposed on a top surface of connector substrate 1404 and additional contact fingers (not shown) may be disposed on a bottom surface of connector substrate 1404. For example, contact fingers 1405 may be compatible with standard USB specification while the additional contact fingers may be designed compatible with other interfaces such as PCI Express or IEEE 1349 specifications. As a result, extended USB plug 1400 may be used for multiple different communication interfaces, also referred to as dual personalities.

Referring now to FIG. 20B, where extended USB plug 1400 may be attached to a PCBA having a memory device and a memory controller for controlling the memory device. As shown in FIG. 20B as top view 1408, side view 1409, and bottom view 1410, extended USB plug 1400 may be attached to PCB substrate, for example, by soldering pins 1407 on the PCB substrate. In this example as shown in side view 1409, the first row of pins 1407 may be soldered on a top surface of the PCB substrate while the second row of pins 1407 may be soldered on a bottom surface of the substrate, or vice versa. In addition, a memory device such as flash memory device may be disposed on a surface of the PCB substrate and a memory controller such as a flash controller may be disposed on the other surface of the PCB substrate. In this example, similar to the configuration as shown in FIGS. 19A-19B, a memory device is disposed on a bottom surface of PCB substrate and a memory controller is disposed on a top surface of PCB substrate. Further, the memory device may be an MLC compatible memory IC and the controller may be an MLC compatible memory controller IC.

Figure 20C:
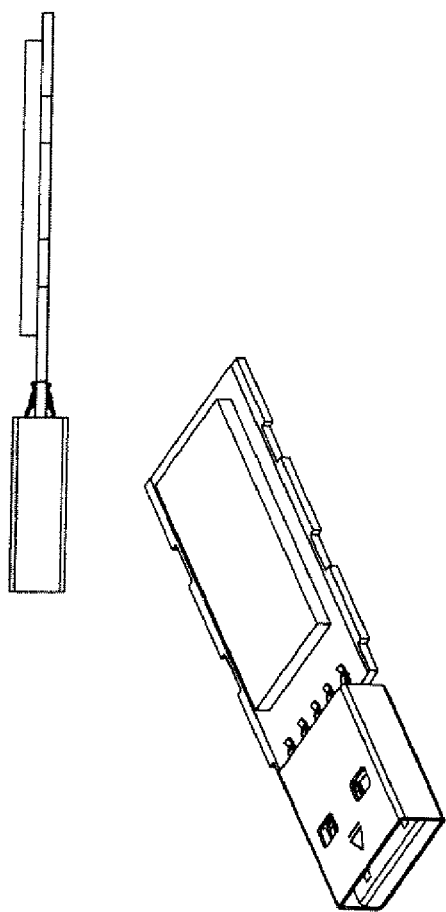

Similarly, according to a further embodiment, techniques as described with respect to FIGS. 20A-20B may also be applied to a configuration where a flash memory and a flash controller are integrated into a single package such as a chip on board (COB) package as shown in FIG. 20C. Other configurations may also exist.

Figure 21E:
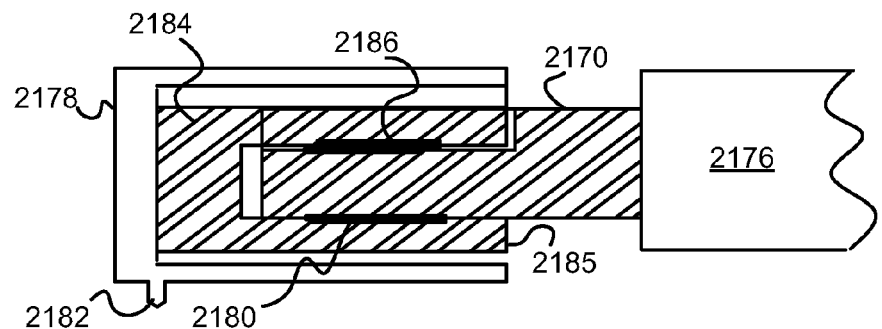

FIGS. 21A-21G show one embodiment of extended USB connectors and sockets having metal contact pins on both top and bottom surfaces of the pin substrates. Note that the embodiments as shown in FIGS. 21A-21G may be used in conjunction with any of the embodiments described above. Referring to FIG. 21A, the extended connector has plastic housing 2176 that the user can grip when inserting the connector plug into a socket. Pin substrate 2170 supports four metal contact pins 2188 on the top surface. Pin substrate 2170 is an insulator such as ceramic, plastic, or other material. Metal leads or wires can pass through pin substrate 2170 to connect metal contact pins 2188 to wires inside plastic housing 2176 that connect to the peripheral device.

Five reverse-side metal contact pins 2172 are placed in a recess in the bottom side of pin substrate 2170 near the tip of the connector plug. Reverse-side metal contact pins 2172 are additional pins for extended signals, such as for PCI-Express signals. Metal leads or wires can pass through pin substrate 2170 to connect reverse-side metal contact pins 2172 to wires inside plastic housing 2176 that connect to the peripheral device.

In some embodiments, metal cover 2173 is a rectangular tube that surrounds pin substrate 2170 and has an open end. An opening in metal cover 2173 on the bottom of pin substrate 2170 allows reverse-side metal contact pins 2172 to be exposed.

FIG. 21B shows an extended-USB socket having four metal contact pads on top surface and five metal contact pads on bottom surface of the pin substrate. Pin substrate 2184 has four metal contact pads 2186 formed on a bottom surface facing a cavity that pin substrate 2170 of the connector fits into. Pin substrate 2184 also has lower substrate extension 2185 that is not present on the prior-art USB socket, which has an L-shaped pin substrate.

Five metal contact pads 2180 are mounted on lower substrate extension 2185 near the open-end of the cavity. A bump or spring can be formed on extension metal contact pads 2180, such as by bending flat metal pads. This bump allows extension metal contact pads 2180 to reach reverse-side metal contact pins 2172 which are recessed in pin substrate 2170 of the connector.

A cavity is formed by the bottom surface of pin substrate 2184 and the top surface of lower substrate extension 2185 and the back of pin substrate 2184 then connects to lower substrate extension 2185. Metal cover 2178 is a metal tube that covers pin substrate 2184 and lower substrate extension 2185. Metal cover 2173 of the USB connector fits in gaps 2181 between metal cover 2178 and the top and sides of pin substrate 2184. Mounting pin 2182 can be formed on metal cover 2178 for mounting the extended USB socket to a PCB or chassis.

FIG. 21C shows the bottom surface of pin substrate 2184, which supports metal contact pins 2186. These four pins carry the prior-art USB differential signals, power, and ground, and make contact with metal contact pins 2188 of the extended USB connector on the top surface of pin substrate 2170, shown in FIG. 21D.

The extended USB connector has 5 reverse-side metal contact pins 2172 on the bottom surface of pin substrate 2170, arranged as shown in FIG. 21D. These make contact with extension metal contact pins 2180, arranged as shown in FIG. 21C on lower substrate extension 2185. These 5 extension pins carry extended signals, such as for PCI-Express.

FIG. 21E shows the extended 9-pin USB connector plug inserted into the 9-pin USB socket. When fully inserted, the tip of pin substrate 2170 fits into the cavity between pin substrate 2184 and lower substrate extension 2185 of the extended USB socket. On the upper surface of connector pin substrate 2170, metal contact pins 2188 make contact with the four metal contact pins 2186 of socket pin substrate 2184, while reverse-side metal contact pins 2172 on the bottom surface of pin substrate 2170 make contact with extension metal contact pins 2180 on the top surface of lower substrate extension 2185.

Figure 21F:
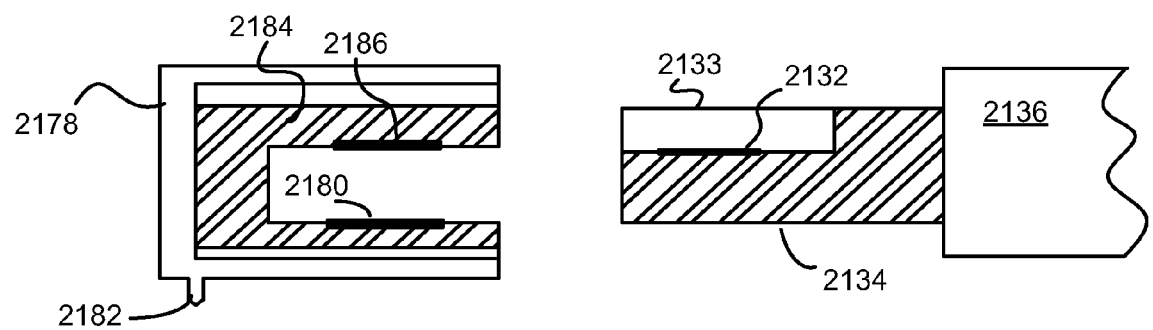
Figure 21G:
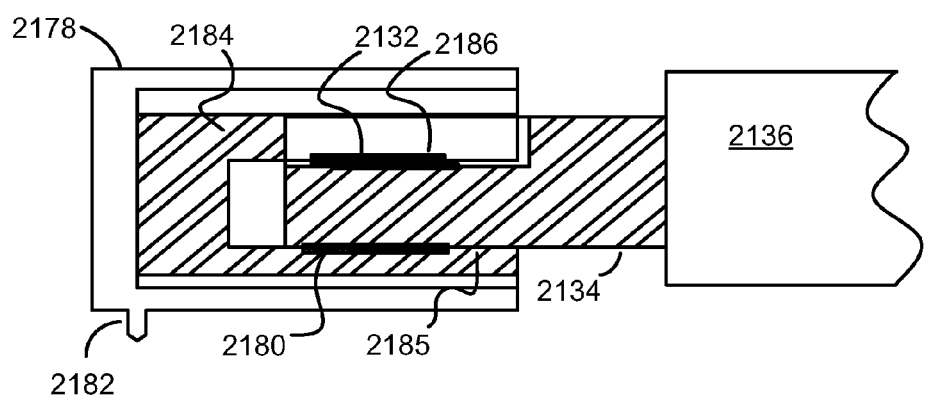

Since reverse-side metal contact pins 2172 are recessed, they do not make contact with metal cover 2138 of the prior-art USB socket. FIG. 21F shows a standard 4-pin USB connector and the extended 9-pin USB socket, just before insertion of the USB connector into the extended USB socket. When fully inserted, as shown in FIG. 21G, the tip of connector pin substrate 2134 fits under socket pin substrate 2184, but does not reach the back of the cavity. On the upper surface of connector pin substrate 2134, metal contact pins 2132 make contact with the four metal contact pins 2186 of socket pin substrate 2184. Since the standard 4-pin USB connector has 4 pins 2132 only, the contact pads on the upper surface of socket pin substrate 2185 makes no electrical contact with the USB connector.

Figure 22A:
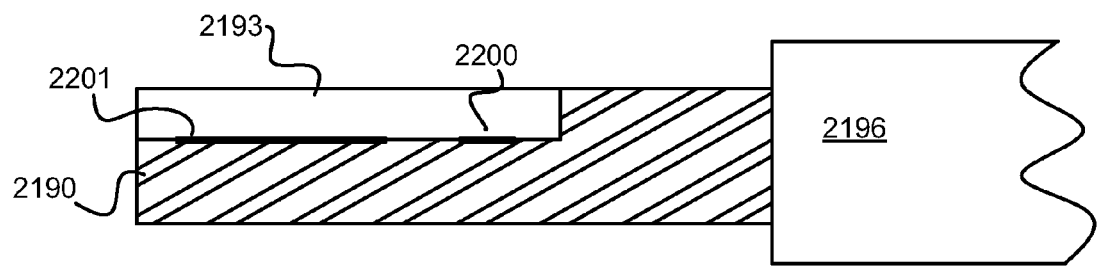
FIGS. 22A-22I show a second embodiment of extended USB connectors and sockets having metal contact pins on just one of the surfaces of the pin substrates.

FIGS. 22A-I show a second embodiment of extended USB connectors and sockets having metal contact pins on just one of the surfaces of the pin substrates. FIG. 22A illustrates an extended 9-pin USB connector plug having four metal pins and five extended metal pins on a top surface of pin substrate. In FIG. 22A, the extended connector has plastic housing 2196 that the user can grip when inserting the connector plug into a socket. Pin substrate 2190 supports metal contact pins 2200, 2201 on the top surface. Pin substrate 2190 is an insulator such as ceramic, plastic, or other material. Metal leads or wires can pass through pin substrate 2190 to connect metal contact pins 2200, 2201 to wires inside plastic housing 2196 that connect to the peripheral device.

The length of pin substrate 2190 is longer than the length L2 of pin substrate 2134 in the prior-art USB connector. The extension in length can be 2-5 millimeters. Tip-end metal contact pins 2201 are located mostly in the extension region beyond L2. Metal cover 2193 is a rectangular tube that surrounds pin substrate 2190 and has an open end.

Figure 22B:
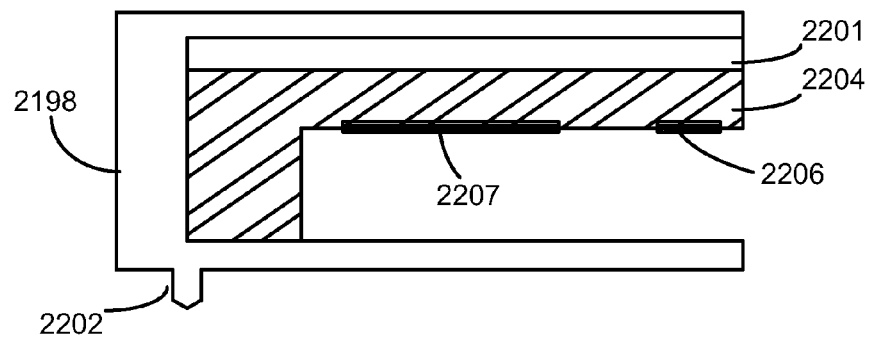

FIG. 22B shows an extended-USB socket having 4 metal contact pins and 5 extended metal pins on just one of the surfaces of the pin substrate. Pin substrate 2204 has metal contact pins 2206, 2207 formed on a bottom surface facing a cavity that pin substrate 2190 of the connector fits into. Pin substrate 2204 does not need the lower substrate extension of FIGS. 21B, but can have the L-shape as shown.

Metal cover 2198 is a metal tube that covers pin substrate 2204 and the opening underneath. Metal cover 2193 of the USB connector fits in gaps 2201 between metal cover 2198 and the top and sides of pin substrate 2204. Mounting pin 2202 can be formed on metal cover 2198 for mounting the extended USB socket to a PCB or chassis.

Figure 22C:
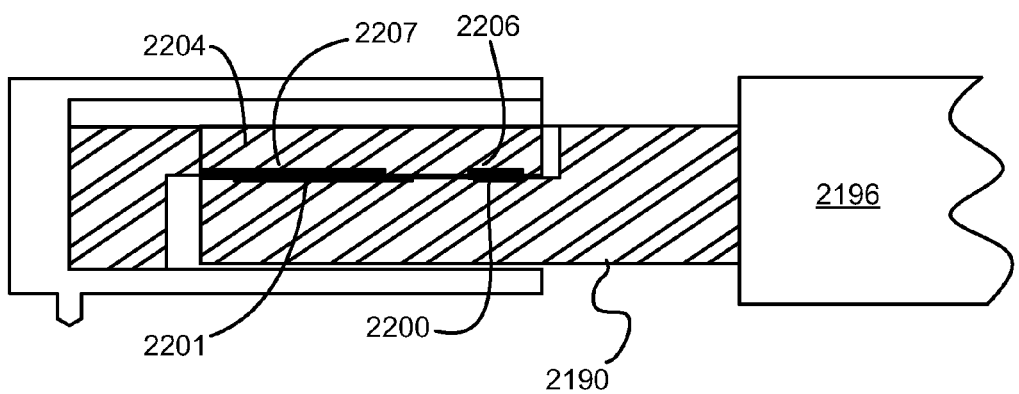

FIG. 22C shows an extended 9-pin USB connector plug inserted into the 9-pin USB socket. The metal contact pins 2207 and 2206 formed on the bottom surface of the pin substrate 2204 of the socket are in contact with the metal pins 2201 and 2200, respectively, on the pin substrate 2190.

Figures 22D, 22E:
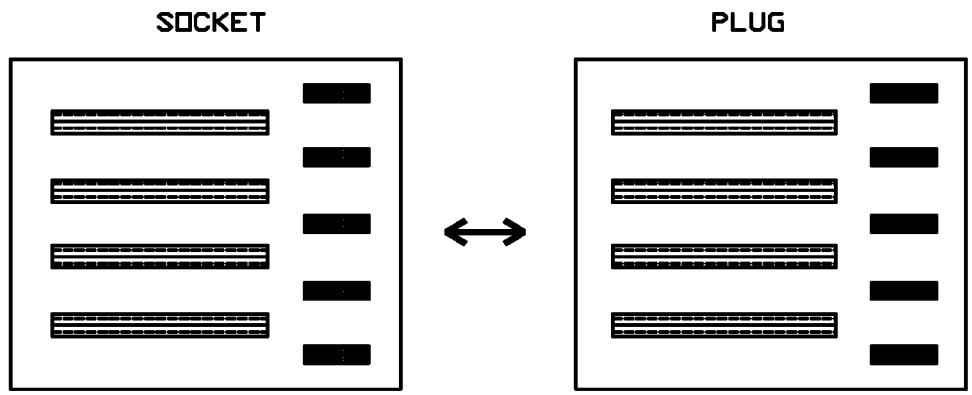

FIG. 22D shows the bottom surface of socket pin substrate 2204, which supports metal contact pins 2206, 2207. Primary metal contact pins 2206 are in a first row of 5 pins that are closest to the socket opening. Secondary metal contact pins 2207 are in a second row of 4 pins that are farthest from the socket opening. FIG. 22E shows a bottom surface of a connector plug corresponding to the socket as shown in FIG. 22D.

Secondary metal contact pins 2207 include the four USB pins. The primary metal contact pins 2206 include extension pins for supporting other interface standards, such as PCI-Express.

When the extended USB connector is fully inserted into the extended USB socket, the tip of pin substrate 2190 fits into the cavity under pin substrate 2204 of the extended USB socket. On the upper surface of connector pin substrate 90, metal contact pins 2200 make contact with the six primary metal contact pins 2206 of socket pin substrate 2204, and metal contact pins 2201 at the tip of the top surface of pin substrate 2190 make contact with secondary extension metal contact pins 2207 on the downward-facing surface of pin substrate 2204.

Figure 22F:
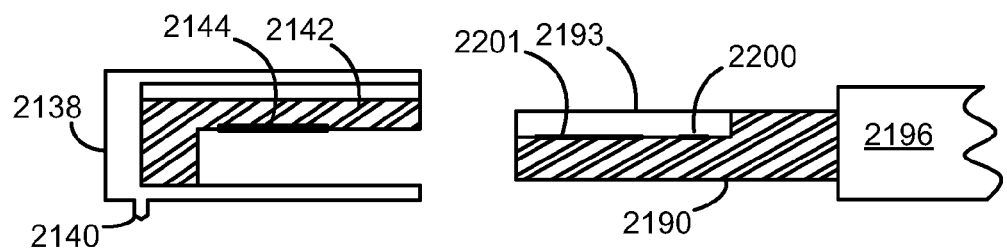
Figure 22G:
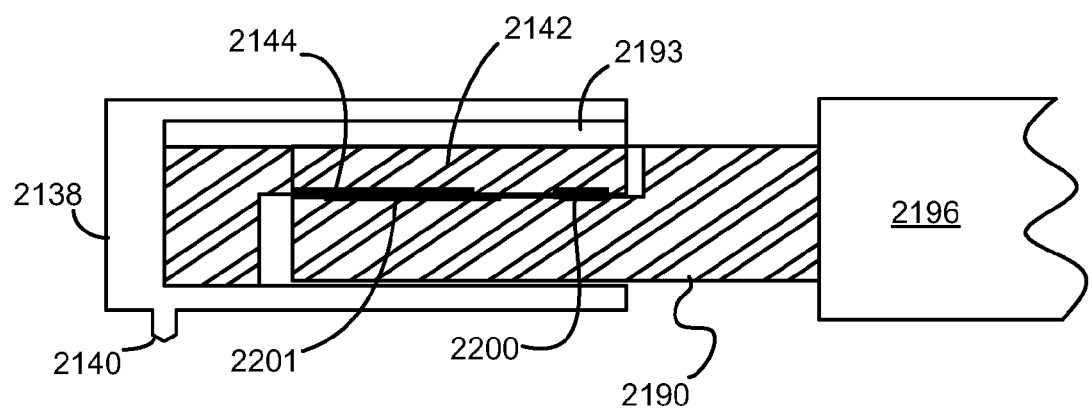

FIG. 22F shows an extended 9-pin USB connector plug just before insertion into a standard 4-pin USB socket. When fully inserted, as shown in FIG. 22G, the tip of pin substrate 2190 fits under socket pin substrate 2142. On the upper surface of connector pin substrate 2190, the 1st, 3rd, 4th, and 6th of tip-end metal contact pins 2201 make contact with the four USB metal contact pins 2144 of socket pin substrate 2142. The back-end row of metal contact pins 2200 on the top surface of pin substrate 2190 do not make contact with socket metal cover 2138 or any metal contacts since they are too far back on connector pin substrate 2190. Thus only the four standard USB pins (metal contact pins 2144, 2201) are electrically contacted.

Figure 22H:
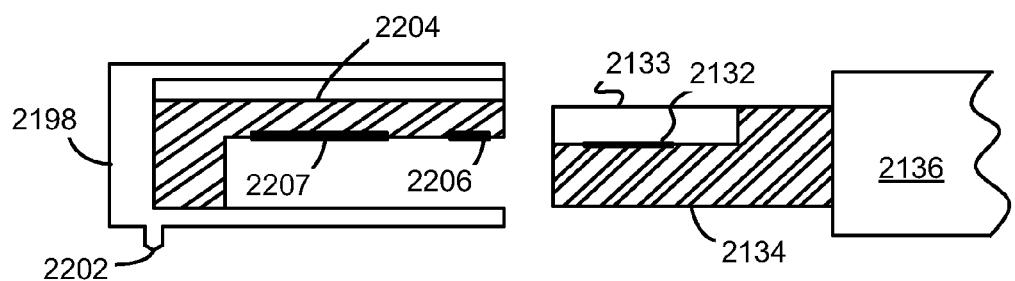
Figure 22I:
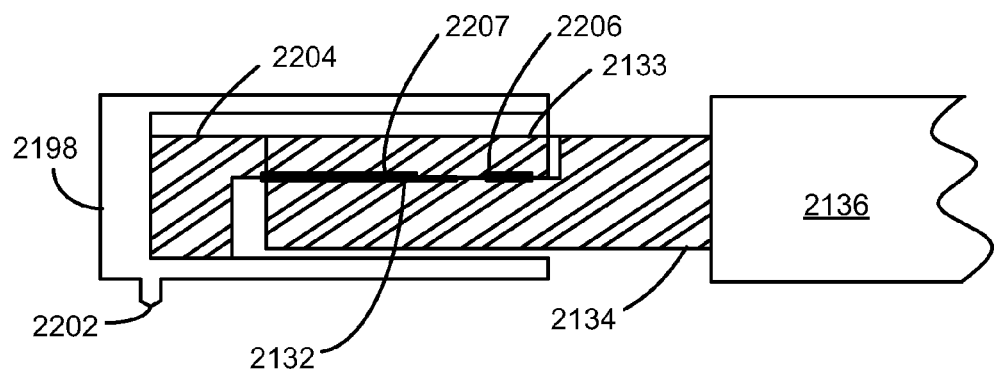

FIG. 22H shows a standard 4-pin USB connector plug just before insertion into an extended 9-pin USB socket. When fully inserted, as shown in FIG. 22I, the tip of connector pin substrate 2134 fits under socket pin substrate 2204, but does not reach the back of the socket cavity. On the upper surface of connector pin substrate 2134, metal contact pins 2132 make contact with the 1st, 3rd, 4th, and 6th of the four primary metal contact pins 2206 of socket pin substrate 2204. Secondary metal contact pins 2207 on substrate 2204 do not touch connector metal cover 2133 since the depth of the extended USB socket is greater than the length of the prior-art USB connector. Thus only the four standard USB pins (metal contact pins 2132, 2206) are electrically contacted. As illustrated in FIGS. 22F-22I, the extended 9-pin USB connector plugs and socket are electrically and mechanically compatible with standard prior-art 4-pin USB sockets and connector plugs.

Although the present invention has been described with respect to certain specific embodiments, it will be clear to those skilled in the art that the inventive features of the present invention are applicable to other embodiments as well, all of which are intended to fall within the scope of the present invention. For example, while the systems and methods described herein are specifically directed to USB devices, the spirit and scope of the present invention is intended to cover different interface bus types, which may include one or more of PCI Express, Secure Digital (SD), Memory Stick (MS), Compact Flash (CF), IDE and SATA.

The invention claimed is:

1. A method for formatting/testing universal serial bus (USB) devices using a test host by standard commands of a bulk-only-transport (BOT) protocol from a computing system, the method comprising:

coupling a plurality of USB devices to the test host, each USB device including a flash controller and one or more flash memory devices, wherein each USB device includes an extended USB connector plug attached to a printed circuit board (PCB) assembly (PCBA) or a chip-on-board (COB) having the one or more flash memory devices and the flash controller attached, wherein the extended USB connector plug includes a plurality of plug standard metal contact pins disposed on the pin substrate, wherein when the standard pin substrate of the extended USB connector plug is inserted into a cavity of the standard USB socket, the standard metal contact pins make physical and electrical contact with plug standard metal contact pins on a plug pin substrate, and a plurality of plug extended metal contact pins on the extended pin substrate, wherein when the extended pin substrate of the extended USB connector plug is inserted into a cavity of the extended USB socket, the plug extended metal contact pins on the extended pin substrate make physical and electrical contact with socket extended metal contact pins on the extended USB socket, reading at least one controller endpoint descriptor value from each of the plurality of USB devices based on a BOT protocol read command, and verifying that the controller endpoint descriptor values of each of the plurality of USB devices matches stored descriptor values stored in the test host through the BOT protocol read command;

performing one of testing and formatting operations on each of the USB devices having a valid endpoint descriptor value by writing predetermined data into the flash memory devices according to a BOT protocol write command in a pipelined manner, and then reading the predetermined data from the flash memory devices and comparing the read predetermined data with known good data stored in the test host according to the BOT protocol; and erasing content of one or more memory cells from the flash memory devices according to the BOT protocol write command using arbitration logic and predetermined data that is stored in the flash memory devices.

2. The method according to claim 1, further comprising installing a USB driver into the test host that directs the computing system to block standard USB registration procedures upon detecting the plurality of USB devices.

3. The method according to claim 1, further comprising fabricating the plurality of USB devices such that the plurality of USB devices are connected to a panel.

4. The method according to claim 3, further comprising singulating the panel before said coupling said USB devices to said test host.

5. The method according to claim 4, wherein coupling all of said plurality of USB devices comprises plugging each of the plurality of USB devices into a corresponding port of a card reader, wherein the card reader is connected by a USB cable to the test host.

6. The method according to claim 3, further comprising singulating the panel after sequentially testing/formatting all of said plurality of USB devices.

7. The method according to claim 6, wherein coupling all of said plurality of USB devices to the test host comprises mounting a probe fixture onto the panel such that pins of each of the plurality of USB devices are contacted by corresponding probes of the probe fixture.

8. The method according to claim 1, wherein said reading said controller endpoint descriptor values from each of the plurality of USB devices comprises reading at least one of a configuration descriptor value, a mass storage class code value, a vendor identification value, and a product identification value.

9. The method according to claim 1, further comprising asserting a corresponding color flag displayed on a monitor of the test host upon verifying that the controller endpoint descriptor value stored in each of the plurality of USB devices matches said stored descriptor value.

10. The method according to claim 1, wherein said testing/formatting comprises scanning bad block data stored in the flash memory devices, and verifying that reserved storage capacity of each flash memory device is equal to a predetermined amount.

11. The method according to claim 1, wherein said testing/formatting comprises writing at least two copies of bad block data identifying bad blocks on the flash memory devices into predetermined blocks of the flash memory device.

12. The method according to claim 1, wherein the flash memory device comprises a plurality of non-volatile memory cells which can be an SLC (single level cell) type or an MLC (multi-level cell) type.

13. The method according to claim 12, wherein the SLC memory cells include 2 KByte per page type memory cells and 4 KByte per page type memory cells.

14. The method according to claim 1, wherein said testing/formatting comprises writing at least one of control code data and boot code data into predetermined blocks of the flash memory devices.

15. The method according to claim 1, wherein said sequentially testing/formatting comprises writing customer-provided data into predetermined blocks of the flash memory device according to the BOT protocol write command.

16. The method according to claim 1, wherein said sequentially testing/formatting comprises writing updated serial number, date code, and produce version code values into predetermined write-protected portions of the flash memory devices according to the BOT protocol write command.

17. A method for formatting/testing universal serial bus (USB) device using a test host by standard commands of a bulk-only-transport (BOT) protocol from a computing system, the method comprising:

coupling the USB device to the test host, the USB device including a flash controller and one or more flash memory devices, wherein the USB device includes an extended USB connector plug attached to a printed circuit board (PCB) assembly (PCBA) or a chip-on-board (COB) having the one or more flash memory devices and the flash controller attached, wherein the extended USB connector plug includes a plug extended metal contact pins on the extended pin substrate, wherein when the extended pin substrate of the extended USB connector plug is inserted into a cavity of the extended USB socket, the plug extended metal contact pins on the extended pin substrate make physical and electrical contact with socket extended metal contact pins on the extended USB socket, reading at least one controller endpoint descriptor value from the USB device based on a BOT protocol read command, and verifying that the controller endpoint descriptor values of the USB device matches stored descriptor values stored in the test host through Bulk Only Transport protocol;

performing one of testing and formatting operations on the USB device having a valid endpoint descriptor value by writing predetermined data into the flash memory devices according to a BOT protocol write command in a pipelined manner, and then reading the predetermined data from the flash memory devices and comparing the read predetermined data with known good data stored in the test host also according to the BOT protocol read command; and erasing contents of one or more memory cells from flash memory devices according to the BOT protocol write command using arbitration logic and predetermined data that is stored in the flash memory devices, wherein the USB device comprises SLC or MLC flash memory cells, and wherein the SLC type memory cells include at least one of SSLC (Small Block SLC), LSLC (Large Block SLC) or a combination thereof, and wherein the MLC type memory cells include SMLC (Small Block MLC) and LSLC (Large Block MLC).

18. The method according to claim 17, wherein a small block includes 512+16 bytes per page and a large block includes 2048+64 bytes per page, wherein the 16 bytes of the small block and the 64 bytes of the large block are corresponding page spare areas.

19. The method according to claim 18, wherein the page is a unit for data read and data write, wherein a data write speed of the large block is four times faster than a corresponding one of the small block due to a page size difference.

* * * * *